(12) United States Patent
Bianco et al.

(10) Patent No.: US 9,457,674 B2
(45) Date of Patent: Oct. 4, 2016

(54) OVERHEAD POWER CABLE MANAGEMENT SYSTEM

(75) Inventors: James S. Bianco, Suffield, CT (US); John Fahy, Longmeadow, MA (US)

(73) Assignee: Control Module, Inc., Enfield, CT (US)

( * ) Notice: Subject to any disclaimer, the term of this patent is extended or adjusted under 35 U.S.C. 154(b) by 497 days.

(21) Appl. No.: 13/238,578

(22) Filed: Sep. 21, 2011

(65) Prior Publication Data

US 2012/0048983 A1 Mar. 1, 2012

Related U.S. Application Data

(63) Continuation-in-part of application No. 12/889,756, filed on Sep. 24, 2010.

(60) Provisional application No. 61/277,508, filed on Sep. 25, 2009, provisional application No. 61/278,807, filed on Oct. 13, 2009, provisional application No. 61/372,232, filed on Aug. 10, 2010.

(51) Int. Cl.
| | |
|---|---|
| H02J 7/00 | (2006.01) |
| B65H 75/30 | (2006.01) |
| B65H 75/38 | (2006.01) |
| B65H 75/48 | (2006.01) |
| B60L 11/18 | (2006.01) |
| G07F 15/00 | (2006.01) |

(52) U.S. Cl.
CPC ........ *B60L 11/1818* (2013.01); *B60L 11/1825* (2013.01); *B60L 11/1846* (2013.01); *B60L 11/1848* (2013.01); *G07F 15/005* (2013.01); *B60L 2230/12* (2013.01); *B60L 2230/16* (2013.01); *B60L 2240/28* (2013.01); *B60L 2240/32* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
USPC .............. 242/155 R, 388.9, 389, 390, 390.1, 242/390.2, 417, 417.1, 417.2, 417.3; 226/4, 226/12; 191/8, 12 R, 23 A; 222/538; 254/208, 242, 265; 320/109, 111; 439/1, 6, 32, 131, 527, 531, 445, 544, 439/545
See application file for complete search history.

(56) References Cited

U.S. PATENT DOCUMENTS

| | | | | |
|---|---|---|---|---|
| 3,080,133 | A * | 3/1963 | Muller | .................. B65H 59/10 242/155 R |
| 3,589,243 | A * | 6/1971 | Bowman | ............... F03C 1/0531 91/180 |

(Continued)

*Primary Examiner* — Richard Isla Rodas
*Assistant Examiner* — Michael Dibenedetto
(74) *Attorney, Agent, or Firm* — Alix, Yale & Ristas, LLP

(57) ABSTRACT

A power cable which connects to charge the battery power supply of an electric vehicle is suspended at a height generally above the vehicle and is automatically retractable. The operation of the power cable is automatically managed to provide a slack-free condition of the cable when the cable is moved in the extending and the retracting directions. The cable connector is easily accessible and the connector is positionable for ease of connection with the vehicle battery charging terminal. The cable management system for extending and retracting the overhead power cable employs a drive mechanism and a clutch assembly which are electronically controlled.

30 Claims, 75 Drawing Sheets

(56) References Cited

U.S. PATENT DOCUMENTS

| | | | |
|---|---|---|---|
| 3,797,703 A * | 3/1974 | Yamawaki et al. | 222/26 |
| 4,082,065 A * | 4/1978 | Baxter | F02B 47/04 |
| | | | 123/219 |
| 4,089,445 A * | 5/1978 | Tatsuno | B67D 7/40 |
| | | | 137/355.17 |
| 4,138,042 A * | 2/1979 | Okada | 222/529 |
| 4,746,826 A * | 5/1988 | Burney | 310/78 |
| 4,984,341 A * | 1/1991 | Hagewood et al. | 28/185 |
| 5,406,327 A * | 4/1995 | Guarnotta | 348/143 |
| 5,556,195 A * | 9/1996 | Glebe | 362/386 |
| 6,338,450 B1 * | 1/2002 | Schwendinger | B60L 11/1825 |
| | | | 191/12 R |
| 6,523,195 B1 * | 2/2003 | Rodier | A61G 7/1015 |
| | | | 104/89 |
| 8,058,841 B2 * | 11/2011 | Chander et al. | 320/115 |
| 8,117,946 B2 * | 2/2012 | Haugeberg | F16H 48/142 |
| | | | 475/240 |
| 8,373,389 B2 * | 2/2013 | Badger | 320/109 |
| 2002/0100653 A1 * | 8/2002 | Ouchi | F16D 41/00 |
| | | | 192/45.008 |
| 2010/0201206 A1 * | 8/2010 | Chilvers | 307/116 |

* cited by examiner

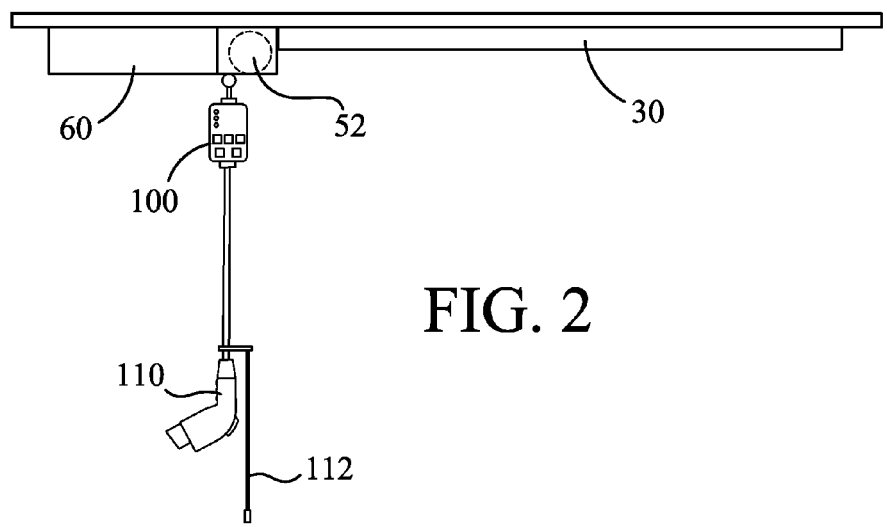
FIG. 2
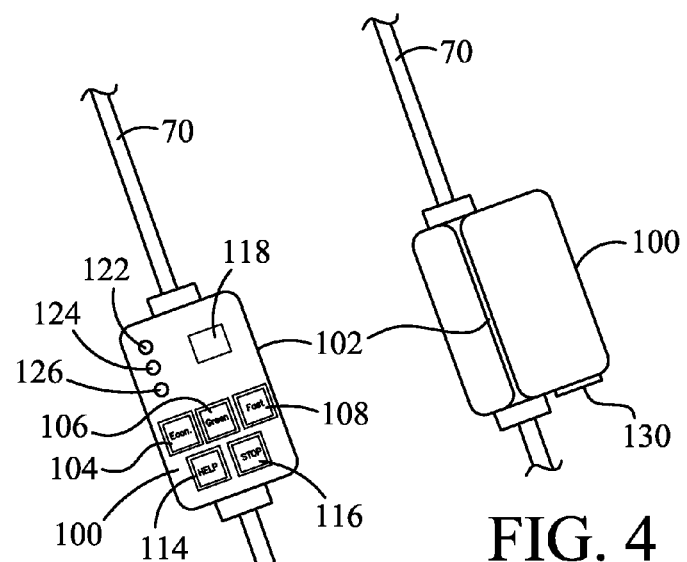
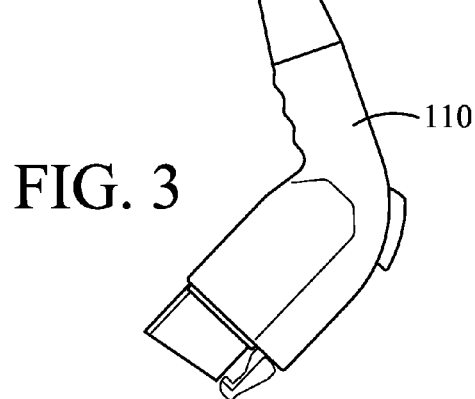
FIG. 3
FIG. 4

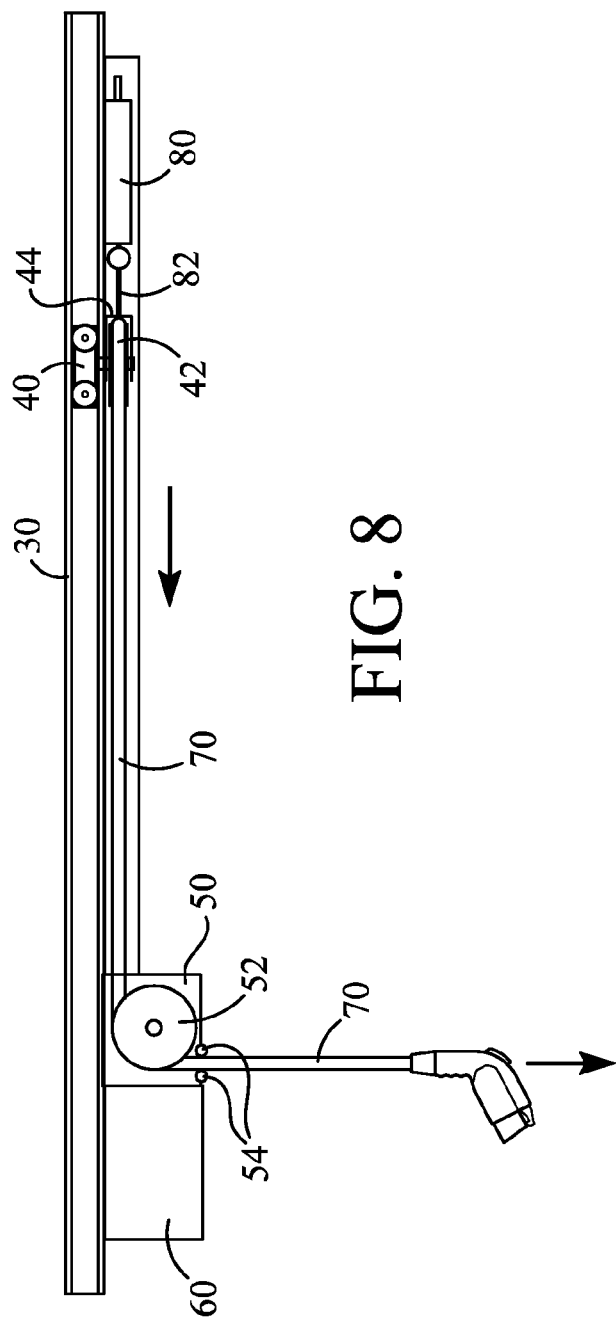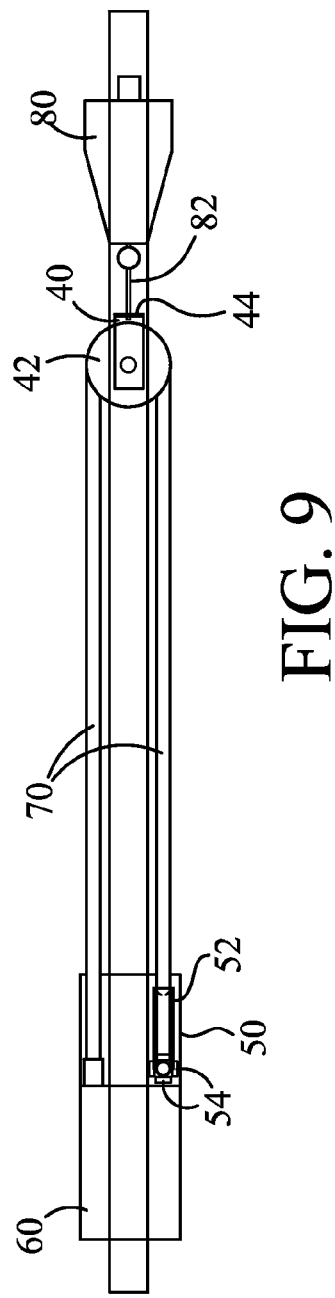

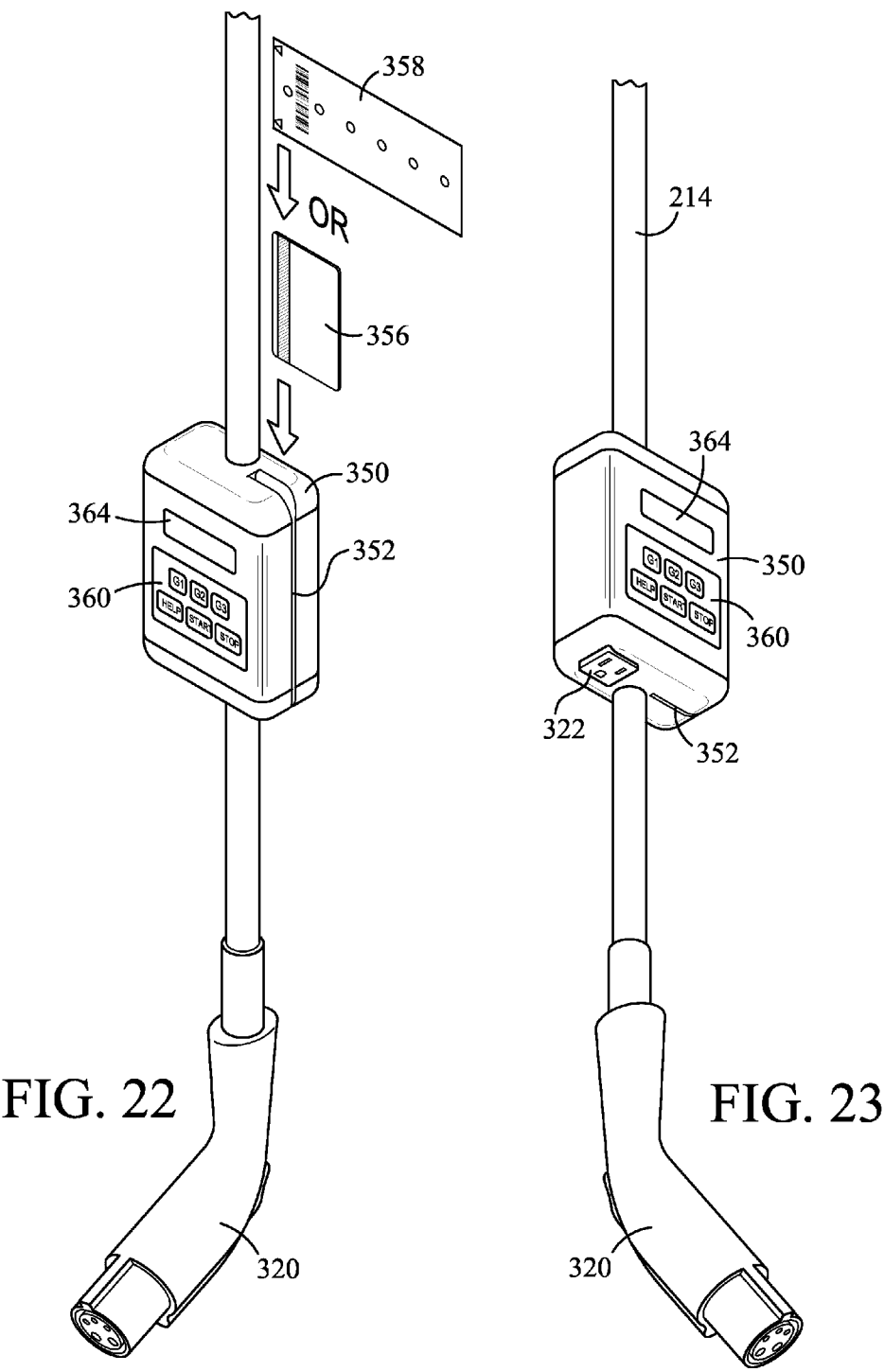

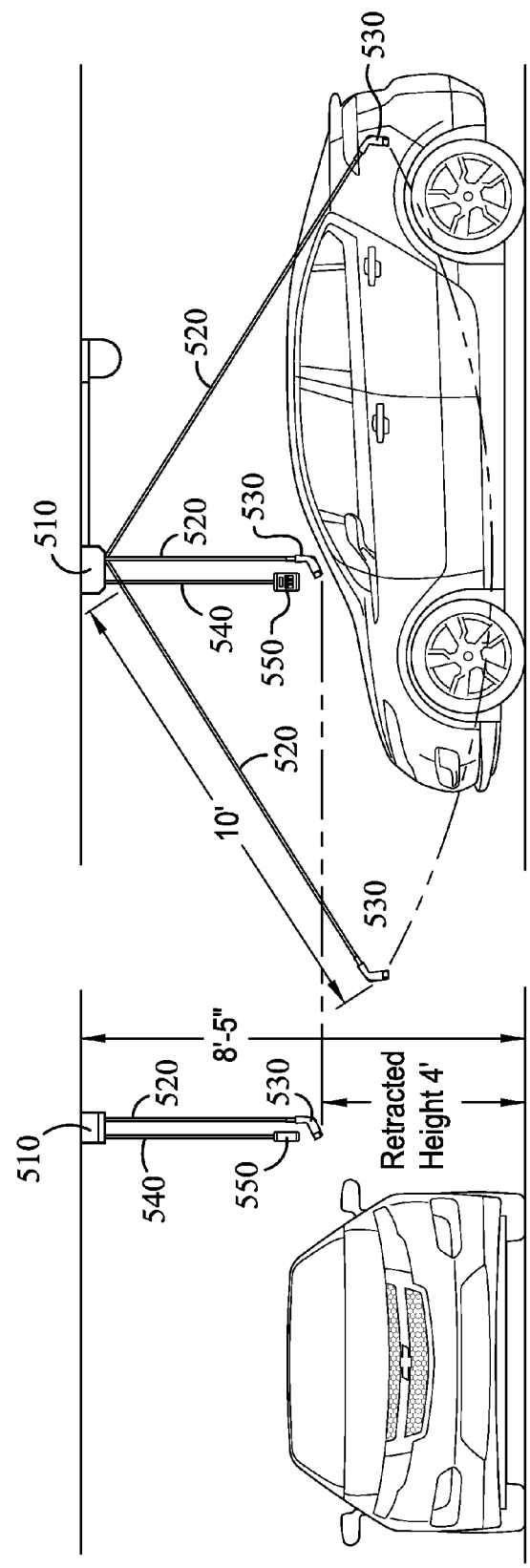

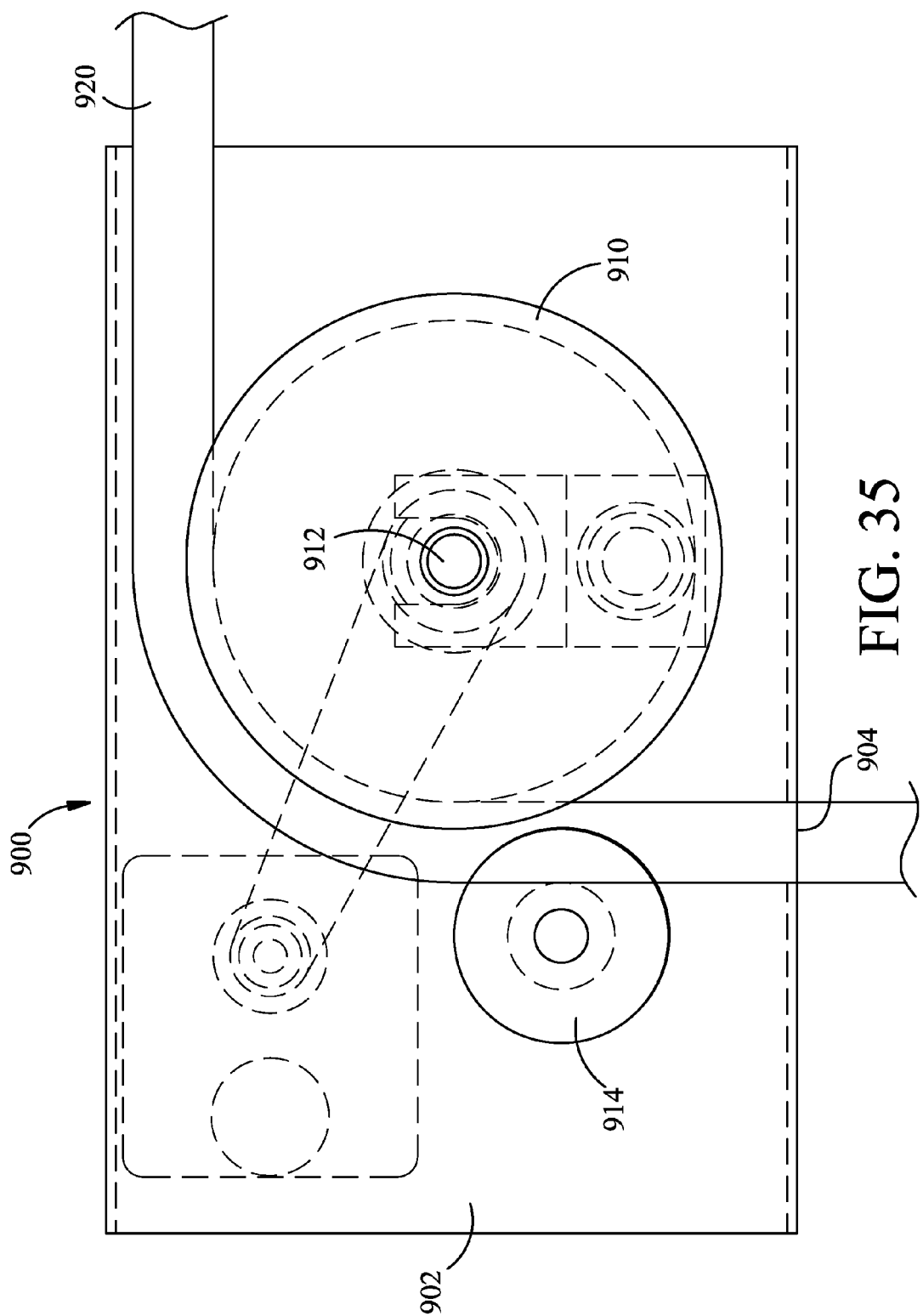

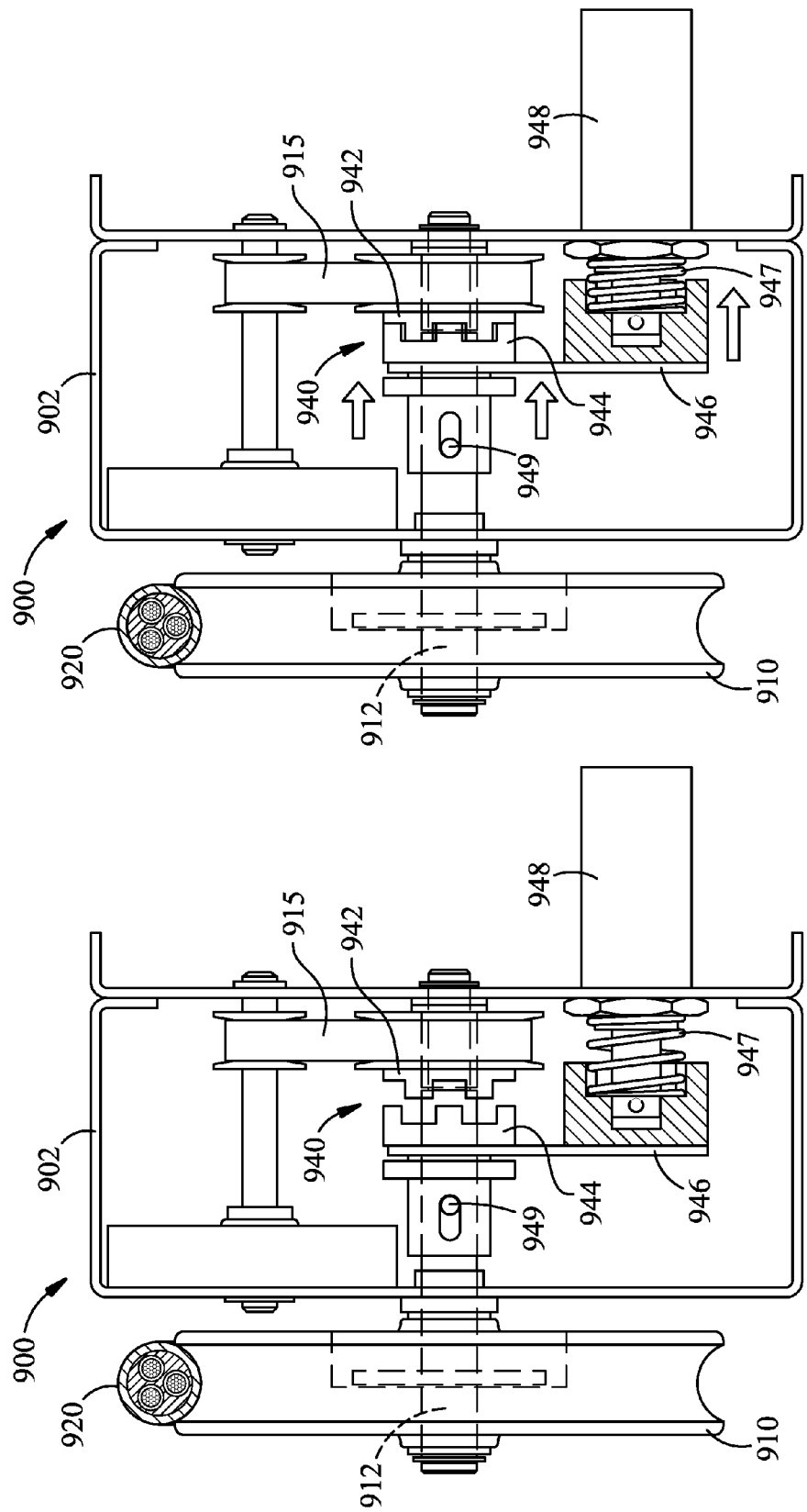

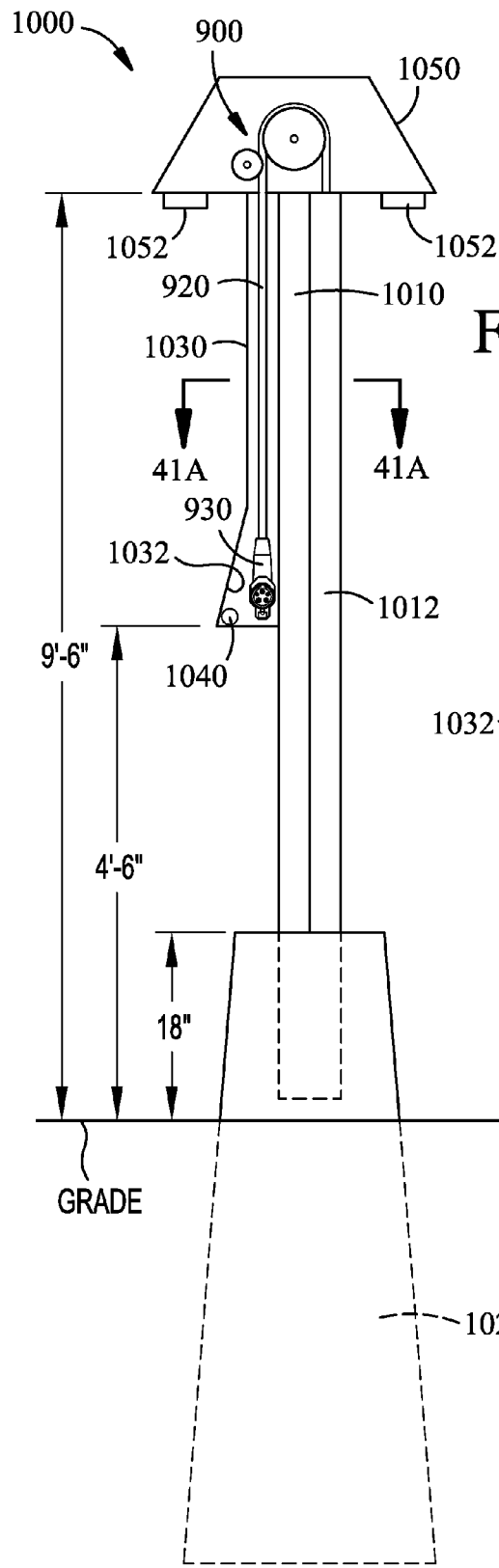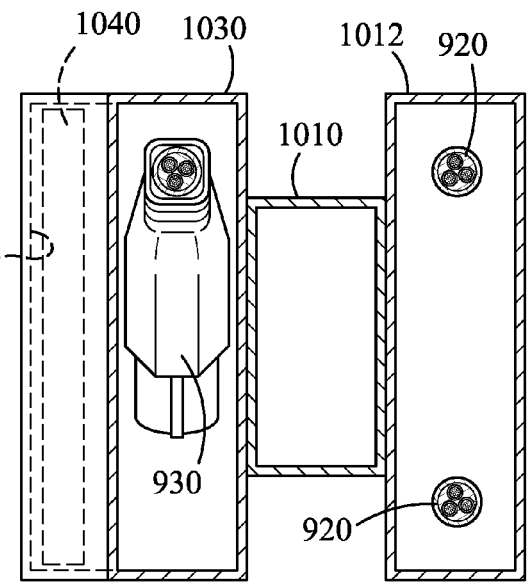
FIG. 41
FIG. 41A

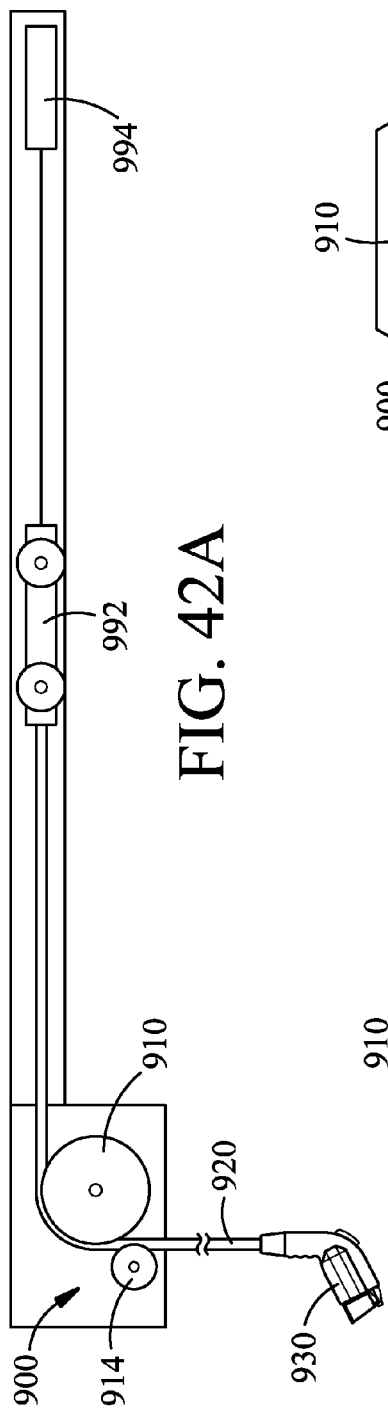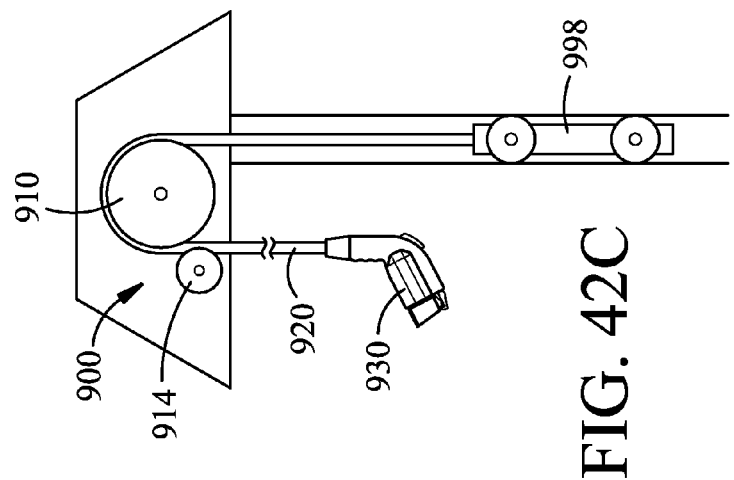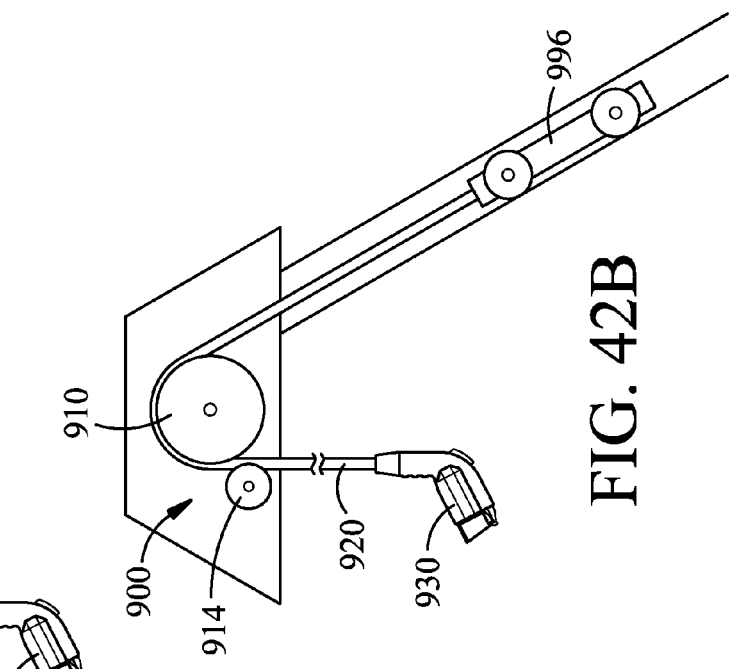
FIG. 42A
FIG. 42B
FIG. 42C

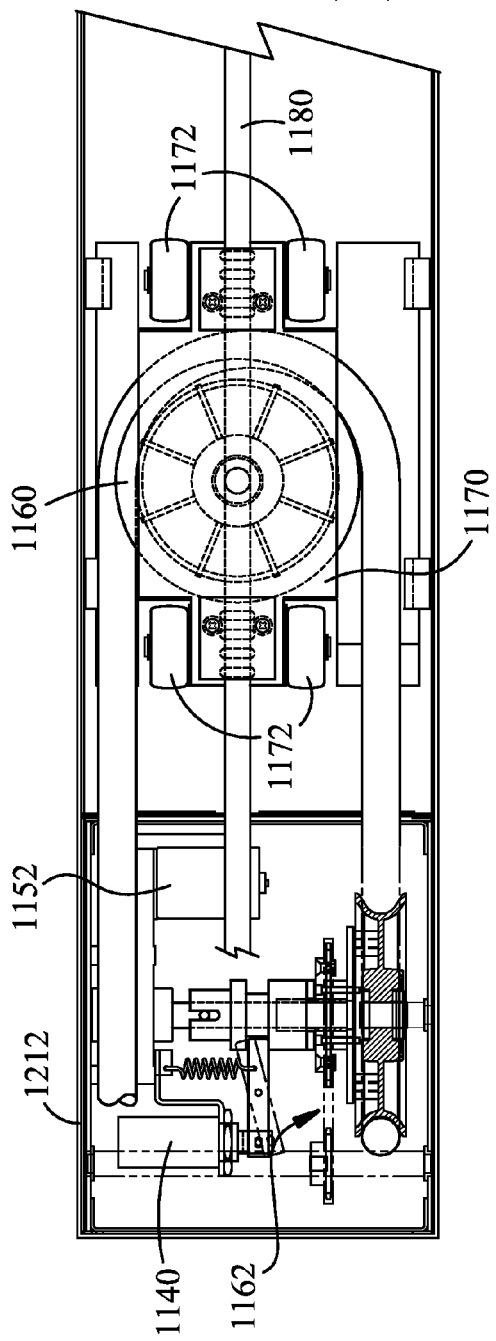
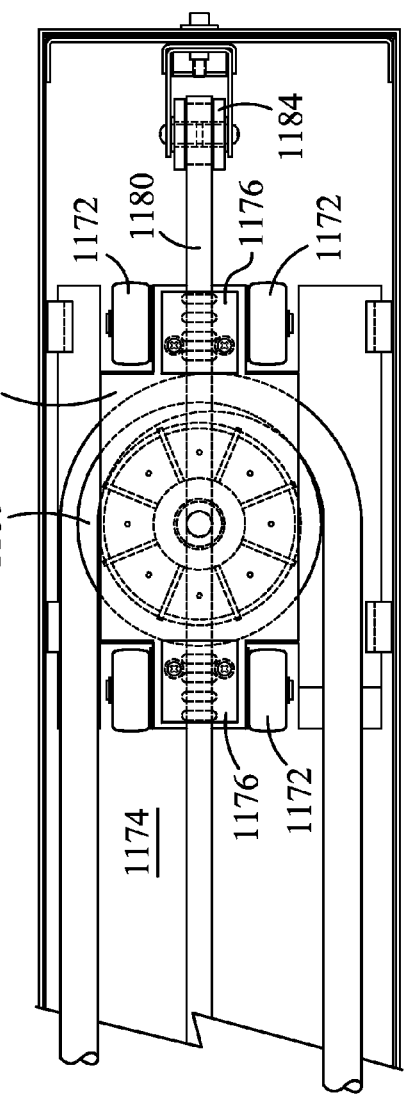
FIG. 45A
FIG. 45B

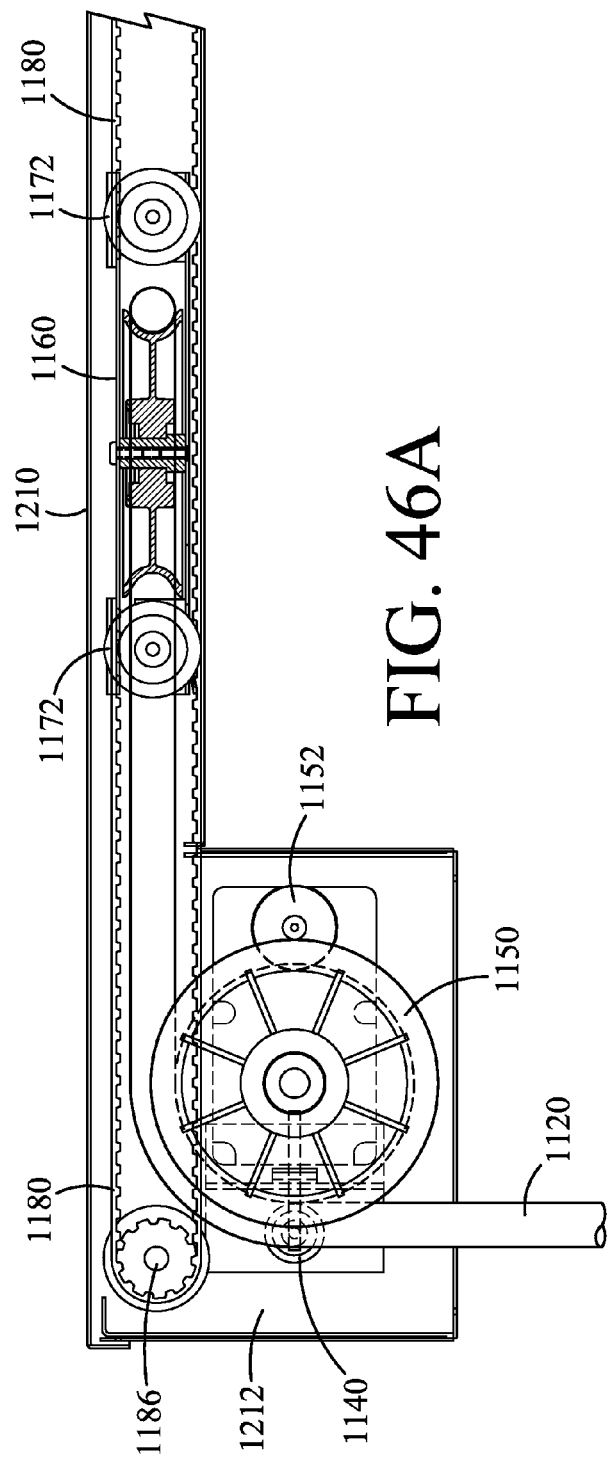
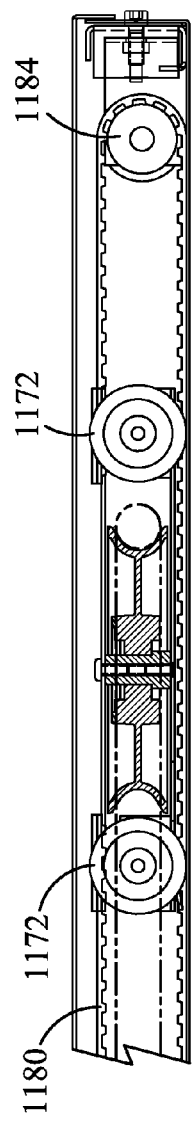
FIG. 46A
FIG. 46B

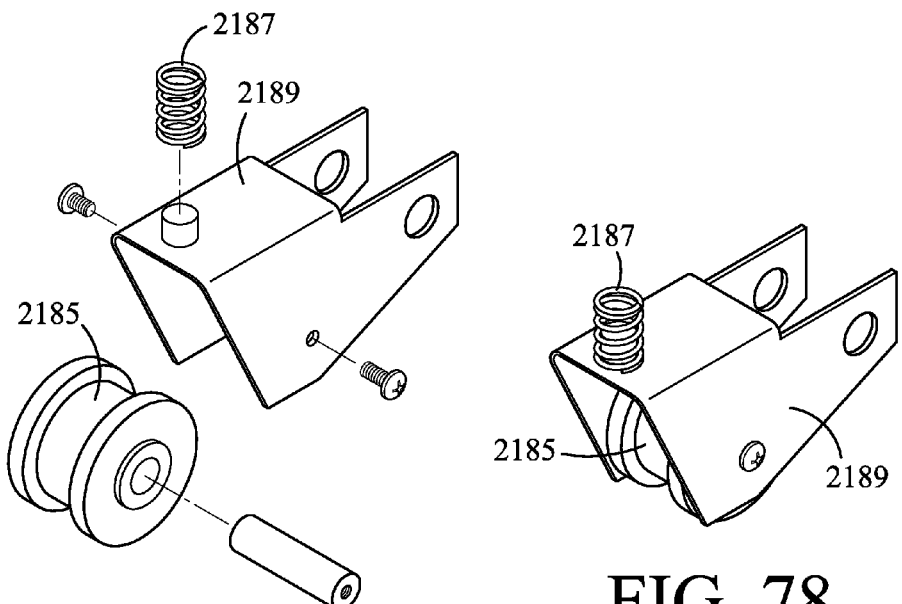
FIG. 77
FIG. 78
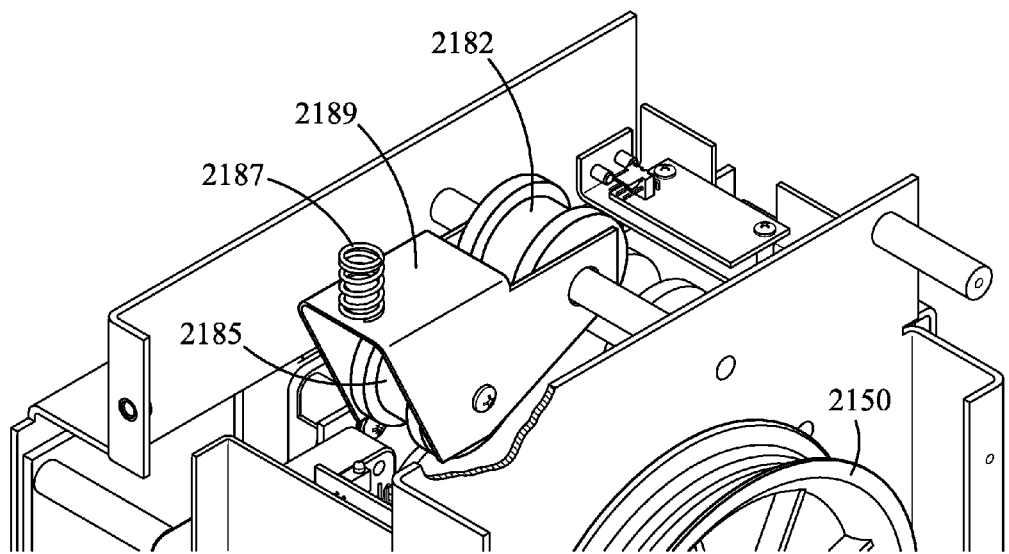
FIG. 79

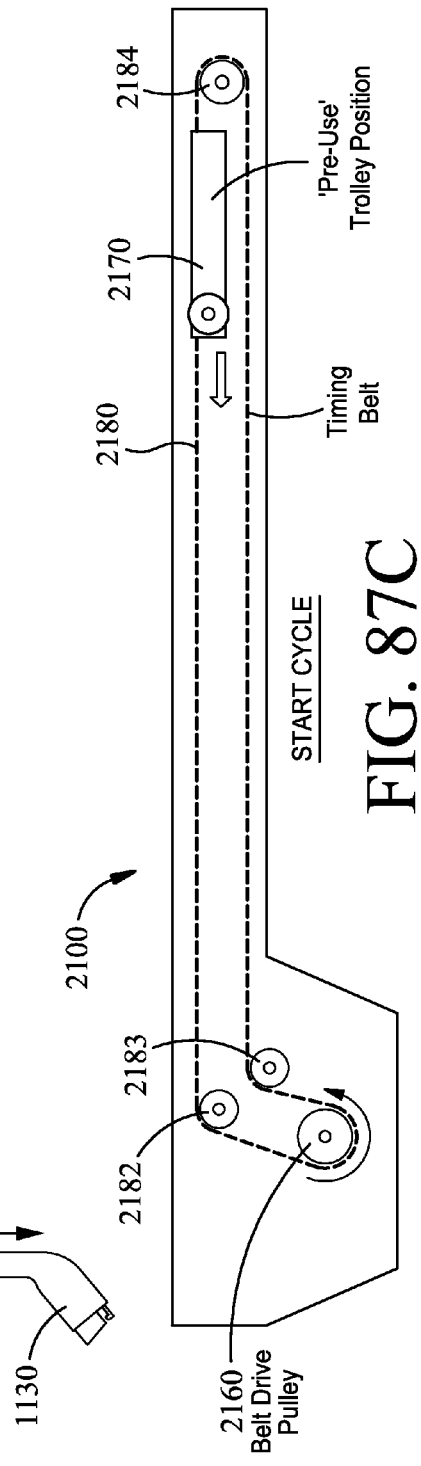

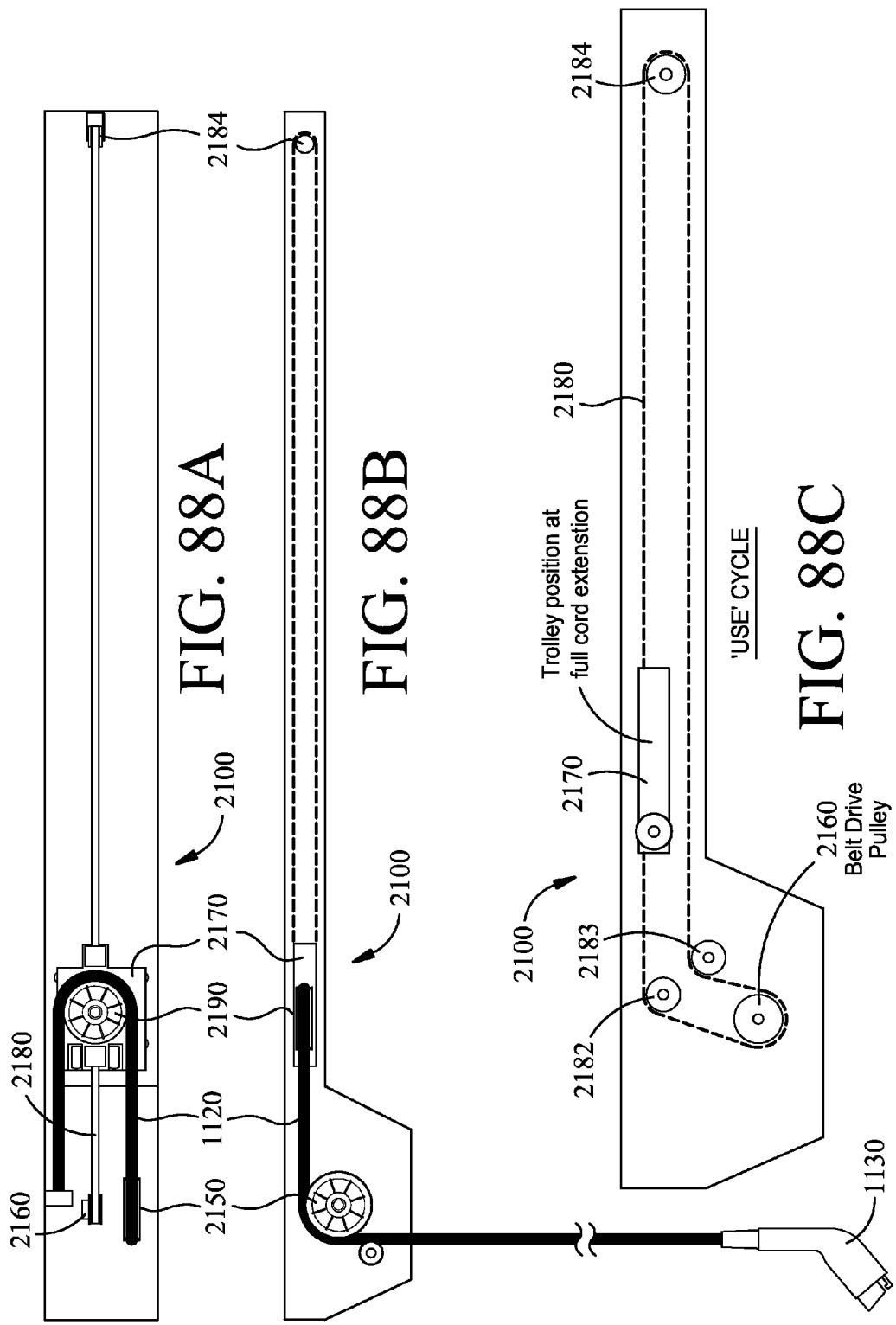

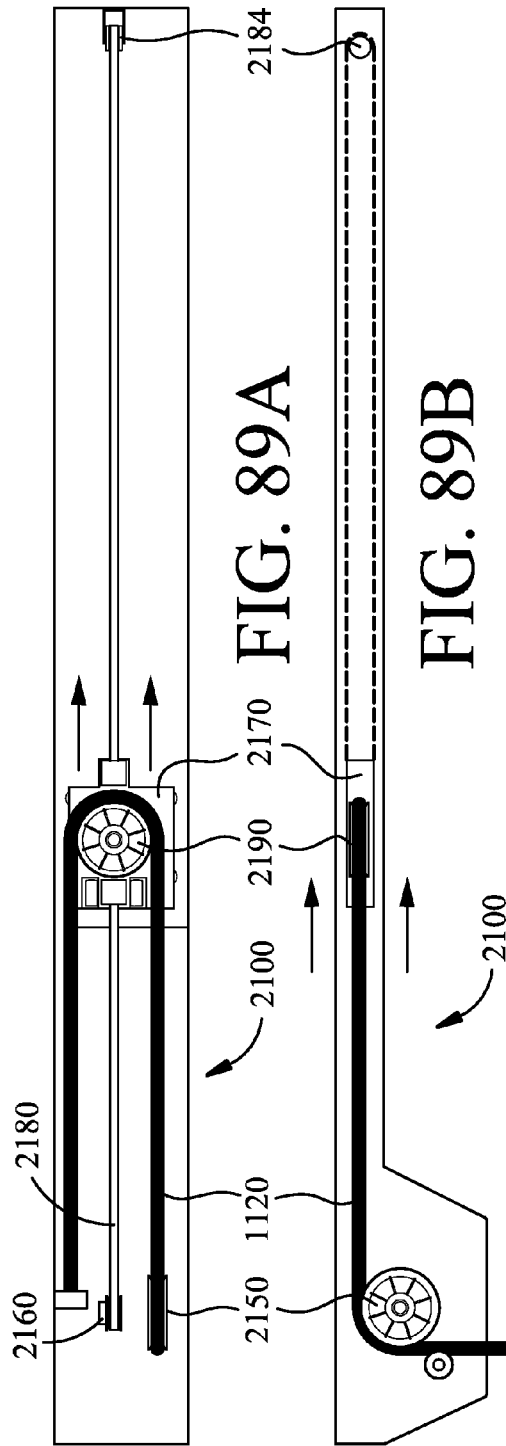
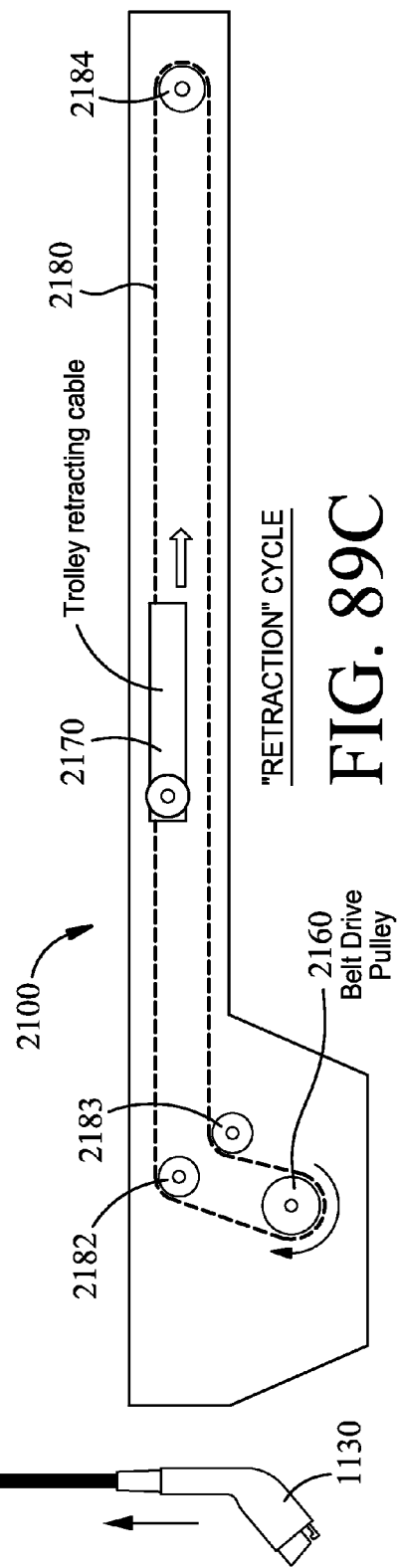

OVERHEAD POWER CABLE MANAGEMENT SYSTEM

CROSS-REFERENCE TO RELATED APPLICATION

This application is a continuation-in-part of U.S. Patent Application Ser. No. 12/889,756 filed Sep. 24, 2010, which application claims the priority of U.S. Provisional Application No. 61/277,508 filed Sep. 25, 2009, U.S. Provisional Application No. 61/278,807 filed Oct. 13, 2009 and U.S. Provisional Application No. 61/372,232 filed Aug. 10, 2010, the entirety of which applications are incorporated herein by reference.

BACKGROUND

This disclosure relates generally to installations which are adapted to charge batteries of electric vehicles. More particularly, this disclosure relates to electric charging station installations which are accessible to the public for charging a battery of an electric vehicle.

Numerous installations have been proposed for supplying electric power to charge the battery of an electric vehicle. Such installations may employ wall, pole or pedestal-type structures having a power cable with a terminal which connects with the charging terminal of the electric vehicle.

For installations which are adapted for use by the public, a number of problems are presented. First, it is necessary to provide a system for obtaining and limiting access to the power supply. Second, there are safety factors associated with supplying power—especially 220 volt/high amperage power to a battery. Third, there are issues concerning the conditions and method of payment for the consumed power. There are also additional problems associated with improper usage of the installation equipment or electric vehicles accidentally leaving the site with the cable connected to the vehicle power supply. Additional deficiencies of some prior installations involve the lack of efficient and user-friendly operation of the charging installation.

In parking garages which may house numerous vehicles, a number of proposals have been made to configure at least some of the parking spaces with installations to charge an electric vehicle while it is parked in the garage. The placement and access of the power cable and the ensuring of proper usage by the vehicle operator are important considerations. In addition, there are issues as to how, if at all, the usage of the power is to be charged and paid for by the vehicle owner.

A high usage parking garage or parking facility presents other unique challenges. It is highly disadvantageous if the cables, in particular, the terminal connectors, are left on the garage deck or pavement where they can be easily obscured and/or damaged by vehicles. In addition, because electric vehicles may have electric terminal points at various vehicle locations depending on the vehicle, it is desirable to provide an electric connection which easily accommodates all the various possible connection points and yet provides a placement of the cable/connector in an advantageous and prominent position when the power cable is not in use.

SUMMARY

Briefly stated, a system for charging an electric vehicle is especially adaptable for use in a parking garage. A station for the charging system in one embodiment employs a rail disposed at a height generally above a vehicle to be charged. A trolley is moveable along the rail, and the trolley mounts a moveable pulley. A fixed pulley is mounted at a fixed position relative to the rail. A power cable communicates at one end with a power module and at an opposed second end with a vehicle terminal connector. The cable loops around the moveable and fixed pulleys so that the connector is suspended below the rail. A spring return device connects with the moveable pulley to urge the pulley to a retracted position.

A pull cord may be attached to the power cable. A point of sale (POS) module is positioned adjacent the connector. The POS module is connected to break away from the connector. The POS module has a reader and also may incorporate a level 1 vehicle outlet connector. The POS module further preferably comprises a plurality of switches for selectively implementing a charging parameter from several possible power charge parameters. A vehicle detector may also be employed. A transceiver preferably communicates data indicative of the power charge to a payment interface unit.

In one preferred application, a parking garage comprises a multiplicity of parking spaces disposed on a deck with a plurality of spaces having an electric vehicle charging station. An entrance gate is controlled by a ticket dispenser or a reader. An exit gate is controlled by a payment station. The electric charging station has a retractable power cord and a control module positioned above the deck. The power cord communicates with the power source and a POS module and a connector adapted to connect with the electric vehicle charging terminal. For usage, the connector is connected to the vehicle terminal. Power is accessed via the POS module, and the electric vehicle battery is charged. Information concerning the amount of power used and the identity of the vehicle for the charging function is transmitted from the control module to the payment station.

The POS module preferably includes a reader. A ticket issued by the ticket dispenser is read by the reader to access power. In one garage application, a plurality of exit gates are each controlled by a payment station. The control module transmits information concerning the charging of the vehicle and the vehicle identity to each of the payment stations. The connector connects with the POS module in a breakaway-type connection. The POS module preferably includes a plurality of buttons for selecting various power parameters for charging the vehicle battery.

Each charging station employs a ground fault detection for preventing the delivery of power upon detection of a ground fault. The charging installation preferably includes a level 1 vehicle terminal connector and a level 2 vehicle terminal connector. The cost incurred for charging the electric vehicle is automatically added to the parking charge at the payment station. The POS module may further comprise a button which is activatable for summoning help at the charging station. Upon disconnecting the connector from the vehicle terminal and releasing the connector, the power cord automatically retracts to a height suspended generally above the vehicle and is readily accessible for usage.

A facility for charging an electric vehicle in another embodiment comprises a plurality of stanchion units. Each of the stanchion units comprises an upright support and a projecting member extending from the support in an elevated position. A retractable power cable has a terminal for connecting with the power charge terminal of the battery system and electric vehicle. The cable terminal is suspended from the projecting member. A control module is mounted to the support. The control module provides an input interface for controlling access to the power supply to the cable. A canopy is mounted above and supported by the stanchion units. Upon disconnection from the power charge terminal of the vehicle, the cable is automatically urged to an overhead location.

An overhead retractor system, which may be electronically controlled, functions to retract, extend and release the power cable for use in charging an electric vehicle. The retractor system employs a power cable with an electrical connector for an electric vehicle. The retraction mechanism for the power cable is disposed in overhead relationship. The retraction mechanism comprises a motor, a drive wheel and a clutch interposed between the motor and the drive wheel to provide an engaged first position wherein the motor drives the drive wheel in an unengaged second position wherein the drive wheel is in a rotatable free state. When the motor is activated and the clutch is in the first position, the cable is extendably lowered. When the drive wheel is driven in a first direction and the cable is retracted when the drive wheel is driven in a second direction. The cable may be manually extended when the clutch is in the second position.

The clutch is mounted to an arm for axial positioning and the axial position is governed by a solenoid. The position of the power cable is sensed by means of at least one magnetic sensor. In a retracted position, the connector is fully received within an enclosure. A portion of the cable is looped around a weight trolley. In one embodiment, a portion of the cable around a member which is connected to a spring turn mechanism. The traction mechanism further comprises a pressure wheel cooperative position with the drive wheel so that said pressure wheel and the drive wheel engage opposing portions of the power cable. A magnetic member is rotatably fixed with the pressure wheel and a sensor detects angular positions of the member to produce pulsing. The number of pulses is compared to a pre-established pulse number to determine whether the retraction mechanism is properly operating.

In another embodiment, the retraction mechanism comprises a pair of idlers disposed in spaced overhead relationship. The power cable is moveable across the idlers to suspend the electrical connector. The clutch comprises an arm mounting a roller disposed above the drive wheel which is positioned between the idlers. The arm is positionable on a first position which allows the cable to be freely pulled across the idlers and a second position which forces the cable against the drive wheel. The arm is mounted for pivotal positioning and the pivotal position is governed by a solenoid.

A power cable management system for a power cable employs a drive pulley receiving the cable. A motor drives a shaft. A clutch assembly is operatively engageable with the shaft and the pulley and transformable between a drive mode and a release mode. A controller selectively controls the mode of the clutch assembly. A belt is driven by the shaft. A trolley attached to the belt mounts an idler pulley also receiving the power cable. When the clutch assembly is in a drive mode, the power cable is moved in an either extending or a retracting direction and the trolley is correspondingly displaced to maintain a substantially slack-free condition of the power cable. When the clutch assembly is in a release mode, the power cable can be pulled for extension.

The clutch assembly further comprises a pair of angularly spaced members which have axially extending teeth. The teeth define grooves and axially mesh in the drive mode. The teeth and grooves have substantially arcuate angular widths. The widths of the grooves are larger than the widths of the teeth.

The belt drive shaft is driven by the pulley drive shaft when the clutch is in a drive mode. The belt drive shaft and pulley drive shaft are parallel. In one embodiment, the shafts are rotatably coupled by a chain sprocket assembly. The clutch assembly employs a solenoid having an arm which pivotally moves a lever. The lever has an end portion which engages a drive flange mounted to the pulley drive shaft. The lever is engageable with the flange for transforming the clutch to a release mode.

The belt is connected between a belt drive wheel and an idler pulley. The trolley moves in a longitudinal direction and comprises a platform supported by rollers. The idler pulley rotates about an axis orthogonal to the longitudinal direction. The trolley is fastened to the belt so that movement of the belt moves the trolley. A magnet is mounted at a selected position of the belt. A Hall effect sensor senses the position of the magnet and defines the home position of the power cable. The controller is activated to retract the cable to the home position. Upon activation of the controller, the power cable is driven to a usage position and the clutch is transformed to a release mode to allow the cable to be manually pulled to an extended position.

The housing encloses a portion of the power cable, the pulley motor, the clutch assembly, the controller belt and the trolley. The cable is maintained in a substantially slack-free condition within the housing regardless of the extension or retraction state of the power cable. The cable extends through an opening in the housing. The housing further has a bottom panel. A smoke detector is mounted to the bottom panel. Circuitry is provided for terminating power to the power cable in the event of detection of smoke by the smoke detector.

In another embodiment, a power cable management system employs a drive pulley mounted to a motor driven shaft. The drive pulley receives the power cable. A clutch assembly is operatively engageable with the shaft and a drive wheel and is transformable between a drive mode and a release mode. A controller selectively controls a mode of the clutch assembly. A belt is driven by the drive wheel. A trolley is attached to the belt. The trolley mounts an idler pulley which receives the power cable. The power cable is moved in either an extending or a retracting direction. When the clutch assembly is in a drive mode, the trolley is correspondingly displaced to maintain a substantial slack-free condition of the power cable, and when the clutch assembly is in a release mode, the power cable can be pulled for extension.

The clutch assembly comprises a pair of members. One member has a receiver defining a plurality of angularly spaced openings. The other member mounts a plurality of angularly spaced pins which are inserted into the openings in the drive mode. The pins are spring biased. The clutch assembly also comprises a pivotal yoke which engages one of the members and is movable via a motor for axially displacing said one member. A drive wheel drives a belt secured to the trolley. The drive wheel is driven by the shaft when the clutch assembly is in a drive mode. The drive wheel is mounted to the shaft by a one-way clutch bearing. The belt is a timing belt with a plurality of teeth and the drive wheel has a surface generally complementary with the teeth. A tensioner maintains tension on the belt. The drive pulley for the cable is also mounted to the shaft by a one-way clutch bearing. The clutch assembly is transformable by means of a motor which is controlled by a controller mounted in the housing. The housing is mounted in an overhead orientation and the cable is lowered to a first type and manually further extendable from the opening.

BRIEF DESCRIPTION OF THE DRAWINGS

FIG. 2 is a side elevational view of a station of the vehicle charging system;

FIG. 3 is an enlarged frontal view of a portion of a power cable, a module and a connector of the vehicle charging station of FIG. 2;

FIG. 4 is a side view of a portion of the power cable and the module of FIG. 3;

FIG. 8 is an enlarged side elevational view, portions removed and partly in diagram form, of a station of the vehicle charging system;

FIG. 9 is a bottom plan view, portions removed, of the vehicle charging station of FIG. 8;

FIG. 22 is a perspective view of an end portion of the power cable of FIG. 20 including a terminal connector and a reader and further illustrated in schematic to show the reader function;

FIG. 23 is a second perspective view of the cable, reader and connector of FIG. 22 taken from a different viewing angle;

FIG. 29A is a front elevational view, partly in diagram form, of an electric vehicle and an overhead electric charging station illustrating dimensional parameters for a representative electric vehicle charging station;

FIG. 29B is a side elevational view, partly in diagram form, of the vehicle and charging station of FIG. 29A;

FIG. 35 is a front elevational view, partly in phantom, of another embodiment of a retractor mechanism for an overhead power cable which is partially illustrated;

FIG. 36A is a cross-sectional view, partly in phantom, of the retractor mechanism of FIG. 35 and a portion of a power cable, illustrated in a release mode;

FIG. 36B is a cross-sectional view, partly in phantom and partly in diagram form, of the retractor mechanism of FIG. 35 and a portion of a power cable, illustrated in a retracting/extending mode;

FIG. 41 is an elevated side view, partly in phantom and partly in diagram form, of a vertical post installation for an overhead retractable power cable;

FIG. 41A is an enlarged sectional view, partly in phantom, taken along the lines A-A of the vertical post installation of FIG. 41;

FIGS. 42A-42C are fragmentary interior views, partly in schematic, illustrating the retractor mechanism of FIG. 35 incorporated into a horizontal overhead, a stanchion and a vertical post electrical charging installation, respectively;

FIGS. 45A and 45B are together a top interior view, intermediate portions removed and portions in phantom, of the installation of FIG. 43 and further illustrating multiple operational positions;

FIGS. 46A and 46B are together a side interior view, intermediate portions removed and portions in phantom, of the installation of FIG. 43 and further illustrating multiple operational positions;

FIGS. 58-64 together constitute a flow diagram for a kiosk-controlled cable management system wherein:

FIG. 58 is principally a flow diagram for a power on self test;

FIG. 59 is principally a flow diagram for an EVSE self test;

FIG. 60 is principally a flow diagram for the cable management;

FIG. 61 is principally a flow diagram for a pilot test and communication;

FIG. 62 is principally a flow diagram for an EVSE service current test;

FIG. 63 is principally a flow diagram for the EVSE ground fault service test;

FIG. 64 is principally a flow diagram for an EVSE service voltage test;

FIGS. 65-72 constitute a flow diagram for a cable management system which is subject to local control wherein:

FIG. 65 is principally a flow diagram for a power on self test;

FIG. 66 is principally a flow diagram for an EVSE self test;

FIG. 67 is principally a flow diagram for the cable management;

FIG. 68 is principally a flow diagram for a pilot test and communication;

FIG. 69 is principally a flow diagram for an EVSE service current test;

FIG. 70 is principally a flow diagram for the EVSE ground fault service test;

FIG. 71 is principally a flow diagram for an EVSE service voltage test;

FIG. 72 is a front view of an indicator/control panel of a kiosk for the cable management system;

FIG. 77 is an exploded perspective view of the belt tensioner of FIG. 76B;

FIG. 78 is a perspective assembled view of the belt tensioner of FIG. 76A;

FIG. 79 is a perspective view of the belt tensioner installed in a portion of the cable management system;

FIG. 87A is a top schematic view illustrating the start cycle in the operation of the system of FIG. 73;

FIG. 87B is a side diagrammatic schematic view illustrating the start cycle in the operation of the system of FIG. 73;

FIG. 87C is an annotated side schematic view, partly in diagram form, illustrating the start cycle in the operation of the system of FIG. 73;

FIG. 88A is a top schematic view illustrating the use cycle in the operation of the system of FIG. 73;

FIG. 88B is a side schematic view illustrating the use cycle in the operation of the system of FIG. 73;

FIG. 88C is an annotated side schematic view illustrating the use cycle in the operation of the system of FIG. 73;

FIG. 89A is a top diagrammatic schematic view illustrating the retraction cycle in the operation of the system of FIG. 73;

FIG. 89B is a side diagrammatic schematic view illustrating the retraction cycle in the operation of the system of FIGS. 73; and FIG. 89C is annotated side schematic view, partly in diagram form, illustrating the start of the retraction cycle for the system of the operation of FIG. 73.

DETAILED DESCRIPTION

Figure 1:
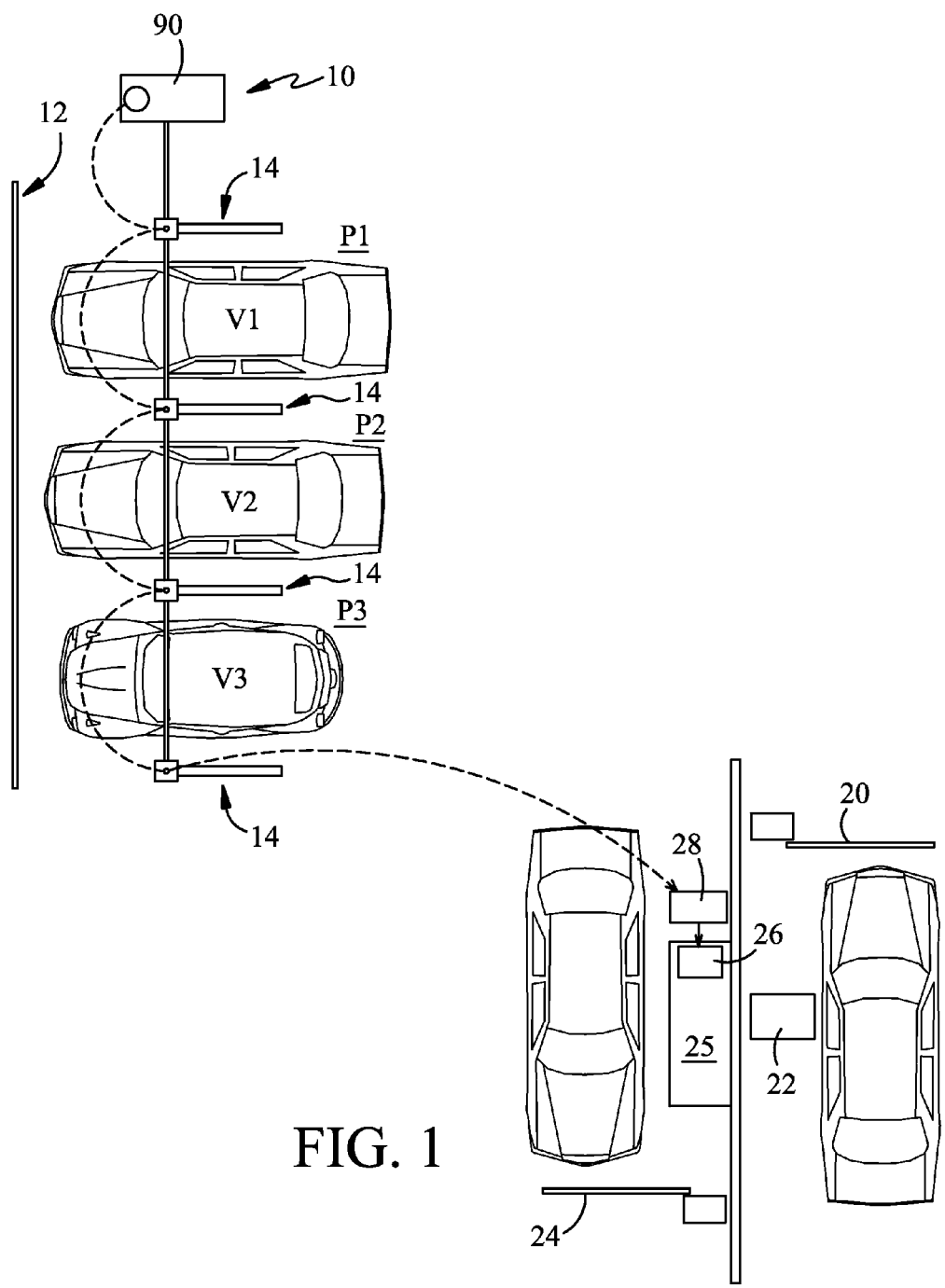
FIG. 1 is a schematic top plan view, partly in diagram form, of a representative parking garage with electric vehicles and incorporating an electric vehicle charging system.
Figure 7:
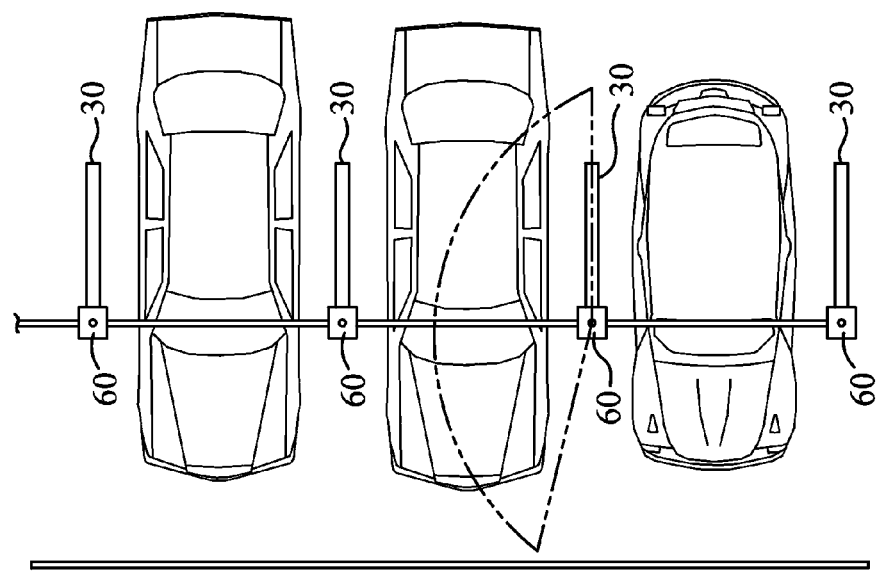
FIG. 7 is a top plan view, partly in diagram form, of associated electric vehicles in a parking garage and the vehicle charging system further illustrating the vehicle charging system.

With reference to the drawings wherein like numerals represent like parts throughout the several figures, a system for charging the battery of an electric vehicle is generally designated by the numeral 10. The system has particular applicability with a parking garage, a representative portion of which is schematically represented by the numeral 12. The garage has a number of parking spaces P1, P2, P3 . . . which have associated charging stations 14 with retractable power cables. The charging stations 14 provide an electrical power charge to the batteries of electric vehicles designated V1, V2, V3 . . . while they are parked in the garage at a charging bay.

The garage 12 preferably has an entrance gate 20 with an associated ticket dispenser 22 of conventional form and function. Upon the vehicle operator taking a ticket, the entrance gate 20 opens to allow access of the vehicle to the garage. Alternatively, access through the entrance may be obtained via an RFID tag or a proximity card or other means. The parking garage also has an exit gate 24 and an exit gate booth 25 which employs a payment system 26 and/or a card reader (not illustrated) responsive to a payment interface controller 28. Upon a manual or an automatic payment transaction, the exit gate 24 is opened to allow egress from the garage.

A rail-like track 30 which may be in the form of a steel Unistrut™ member is mounted to the ceiling of the garage or is suspended at an overhead location above the garage deck between adjacent parking spaces of the garage. With additional reference to FIGS. 8 and 9, the track 30 forms a pathway for a trolley 40. The trolley 40 mounts a movable pulley 42 and slides along the track 30 to change the linear position of the pulley. The pulley 42 rotates about a vertical axis. At an intermediate location above the parking space aisle, a bracket 50 is suspended from the track 30. The bracket 50 mounts a fixed pulley 52 at a lower position and a pair of opposed rollers 54 offset from the horizontal rotational axis of the pulley 52.

A control module 60 is disposed adjacent the bracket and provides a connection point for a power cable 70. The cable 70 loops around the movable pulley 42 and over the fixed pulley 52 and passes between the adjacent rollers 54 so that it is suspended below the ceiling in a retracted inoperative mode above the aisle between parked vehicles.

A spring return device 80, which may resemble a tool retractor or similar type mechanism, with an automatic coilable cable 82 is mounted at the underside of the track. The end of the cable 82 connects with a U-shaped bracket 44 of the movable pulley. The return device biases the movable pulley 42 and hence the trolley 40 toward a stable retracted position. Consequently, the power cable 70, which loops about the pulley 42, is also urged linearly and vertically to the retracted position.

Figure 5:
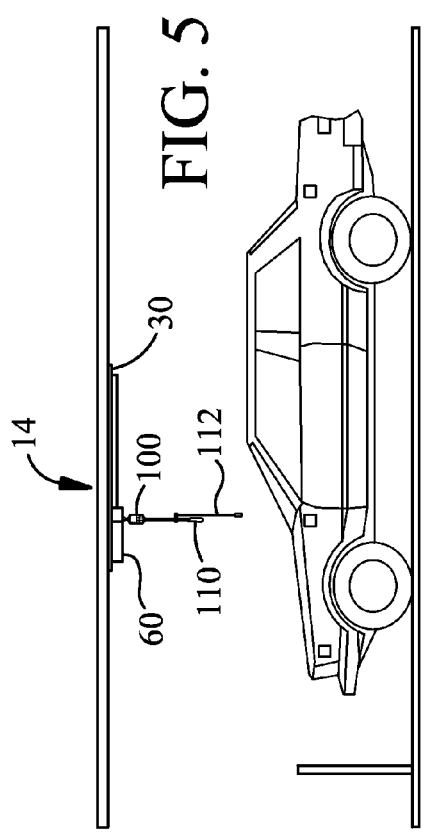
FIG. 5 is a side elevational view of an electric vehicle in a garage parking bay together with a station of the vehicle charging system.
Figure 6:
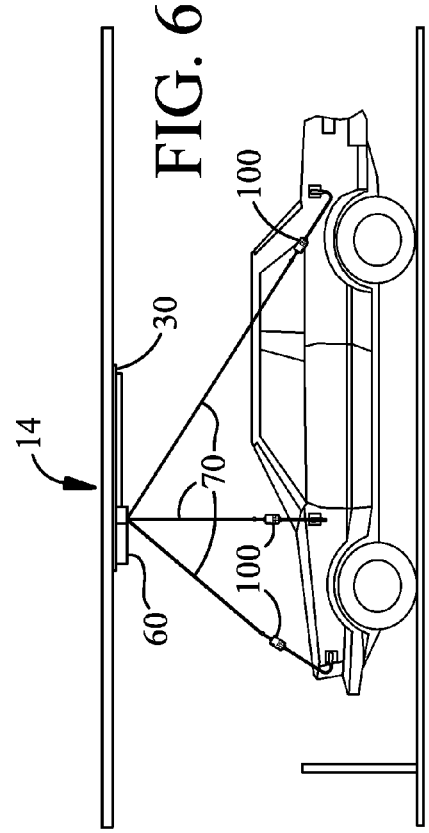
FIG. 6 is a side elevational view, partly in representative form, of the electric vehicle, the garage bay and the vehicle charging station with a power cable thereof being shown in various positions further illustrating the capability of the vehicle charging system of FIG. 5.

With additional reference to FIGS. 1 and 2, the power cable 70 connects with a control box 100 which connects in a breakaway connection with a level 2 vehicle connector 110. The vehicle connector 110 connects with the vehicle outlet terminal for supplying electric power to charge the vehicle battery. In the retracted position, the control box 100 and the connector 110 are suspended from the power cable 70 and generally positioned above the top of the vehicle. A pull cord 112 (FIGS. 2 and 5) connects with the cable adjacent the connector 110 to facilitate the vehicle operator pulling the connector and the carried control box 100 generally downwardly and into an electrically connected position with the vehicle (FIG. 6).

The spring return device 80 exerts a retracting bias on the power cable when the power cable 70 is extended to connect with the vehicle. Upon releasing the connection with the vehicle, the power cable is retracted to the non-charged position illustrated in FIG. 5. It will be appreciated that the cable may be extended to various lengths to accommodate various positions of the vehicle connecting terminal as illustrated in FIG. 6. As further illustrated in FIG. 1, a track 30 with an associated electric charging unit is preferably provided between each of the charging designated parking spaces P1, P2, P3 . . . and connected to a load center 90.

Figure 10:
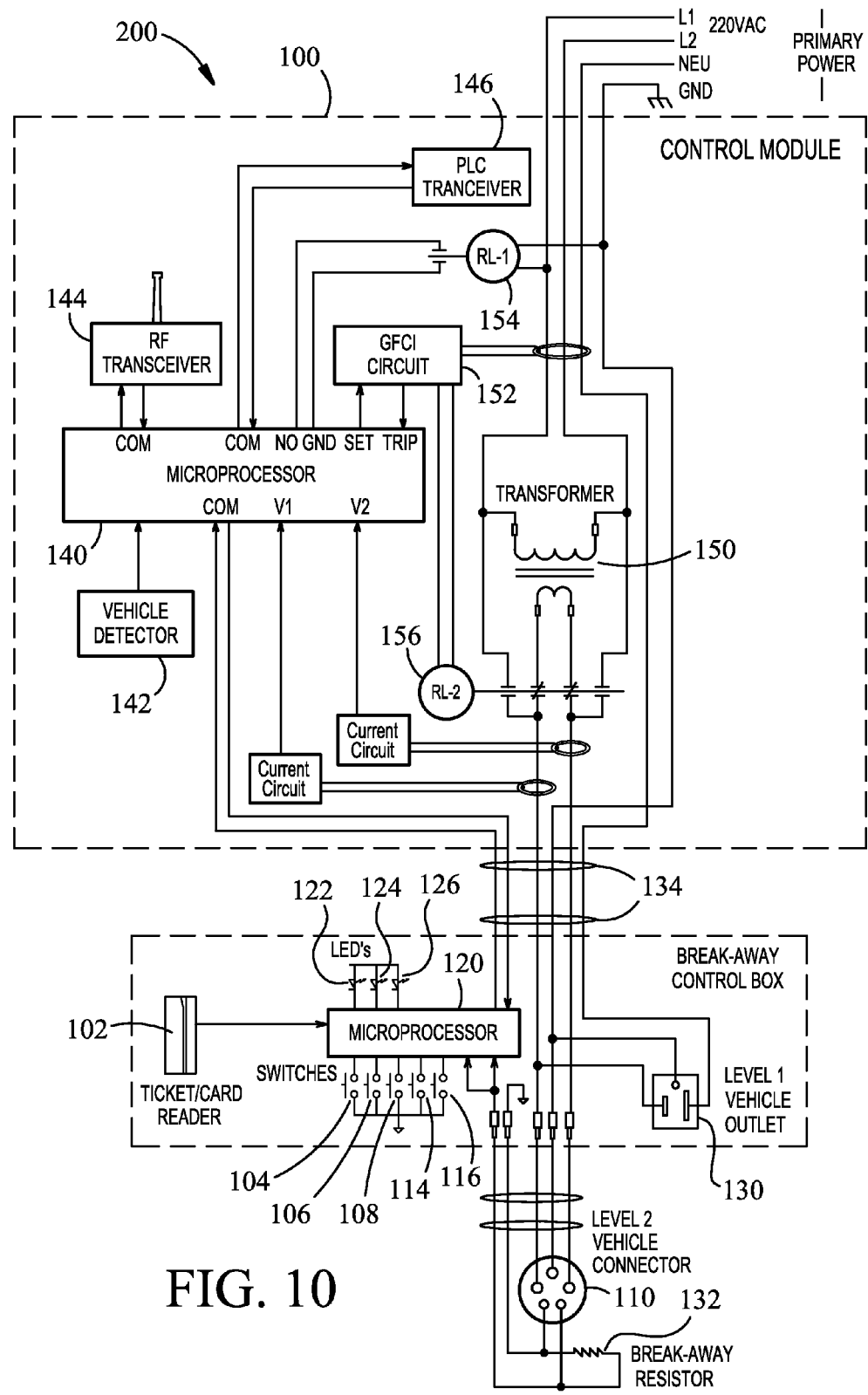
FIG. 10 is a schematic diagram for the electric vehicle charging system of FIG. 1.

With reference to FIGS. 3 and 10, the control box 100 interfaces with the operator and functions as a point of sale (POS) module. A microprocessor 120 is responsive to a ticket/card reader 102 which may take any of numerous forms, such as a magnetic strip reader, a proximity reader, an RFID reader, a chip reader or a barcode reader. In a preferred form, the operator would use the ticket that was issued upon entrance to the parking garage and swipe the ticket through the reader 102 to obtain access to power at the selected charging station 14.

The POS module 100 contains numerous switches. The switches may be activated by push buttons to select usage parameters and to provide input to the microprocessor 120, such as, for example, an economy button 104 which the user would depress to obtain the most economical energy charge, a green selection button 106 which the user would use to obtain energy from green sources, and a fast button 108 which would allow the user to obtain a charge in the fastest process available. In addition, the control box or POS module 100 preferably includes a help button 114 to immediately activate a remote help desk and a stop button 116 to allow the power charge to be terminated at any time.

Preferably, a start button 118 would also be employed to start the charging of the vehicle battery.

In addition, the control box or POS module 100 includes various LED indicator lights such as, for example, a ready LED 122 which, upon illumination, indicates that the system is ready to charge, a charging LED 124 which, upon illumination, indicates that the vehicle is charging, and a help LED 126 which, upon illumination, indicates that the system is in a waiting mode pending the provision of help. Other LEDs, of course, are also possible. In addition, the control box or POS module 100 preferably also incorporates a level 1 vehicle connector 130 so that both level 1 and level 2 connections could be provided at each of the installation bays. The microprocessor 120 also communicates via the cable 70 with the control module 60.

The control module 60 also includes a microprocessor 140. A vehicle detector 142 detects the presence of a vehicle at the parking place and provides an input signal to the microprocessor 140. The control module also includes an RF transceiver 144 unit communicating with a remote interface payment controller 28 for the garage. The communication could be ZIGBEE, WI-FI, PLC or any proprietary communication format. For one embodiment, the vehicle detector 142, via the transceiver 144, is employed to ultimately transmit and post web available information to indicate that there is an available charging bay.

In a preferred form, each of the modules 60 would communicate via RF communication, such as ZIGBEE or equivalent, with each remote interface controller 28 at the exit gate booth 25. Data concerning the power usage and the user would be incorporated into the existing payment system 26 at the exit gate booth. When the vehicle exits the gate 24, the charge for the power would automatically be incorporated into the payment processing, and the vehicle operator would be presented with the bill for both the parking and the charging service.

With additional reference to FIG. 10, a block diagram for the system is generally designated by the numeral 180. The control module includes a transformer 150 that steps the primary power supply to the 220 volt level and/or 110 volt level for the level 2 connector 110 or the level 1 connector 130. A ground fault circuit 152 is employed to detect a ground fault upon connecting the connector with the vehicle. A relay circuit RL1 154 senses the ground attachment. A low voltage is applied to determine when the power cable 70 is plugged. If properly attached, the power can be turned on and the battery charging commenced.

If there is a ground fault, a relay RL2 156 terminates power to the connectors. The help button 114 may be pushed to obtain help if the power remains tripped and cannot be restored to the connector.

The breakaway control box 100 functions as a point of sale (POS) module which is easily accessible by the vehicle operator, but is retracted to a readily visible suspended position when not in use. In summary, the POS module 100 employs a microprocessor 120 which connects with the various switches, is responsive to the ticket card reader 102 and also controls illumination of the LEDs 122, 124, 126. The level 1 vehicle outlet 130 is incorporated into the breakaway control box. The connections to the connector 110 are provided by crimp-type electrical connections 134 which easily break away. A breakaway resistor 132 is employed to determine whether the connector 110 has been disengaged from the control box. The breakaway resistor 132 would thus allow detection of the breakaway condition. The power from the control module would then be terminated. Status information and data communication is provided between the microprocessor 120 of the control box and the control module microprocessor 140 which also communicates to and from the RF transceiver 146.

The vehicle charging system may be easily incorporated into an existing parking garage to provide one or more charging bays which each function to charge the battery of an electric vehicle while the electric vehicle is parked in the garage. Preferably, several charging stations 14 are provided. Moreover, the charging can be implemented and accomplished in a user-friendly and highly efficient manner so that the payment for the charging can be assessed in a seamless manner along with the payment for use of the parking facility.

In one preferred application, the operator of the electric vehicle would enter the parking facility in a conventional manner. Typically, the operator would take a ticket from the ticket dispenser 22 which would open the gate 20 for entering the parking facility. The ticket would have an ID, for example, which would include either a magnetic strip, a proximity identifier, an RFID, a chip or a barcode, etc. The operator would then park the electric vehicle in a vacant space or bay which is equipped with a charging station 14. The operator would pull down the retracted cable 70 and the point of sale (POS) module 100 by pulling down on the cord 112. The connector 110 would be connected at the appropriate location to the electric vehicle (see FIG. 6). The operator would then swipe or otherwise cause the parking ticket to be read by the reader 102 at the POS module. The operator would select the energy source and usage. The operator would then press the start button 118. The charging of the vehicle battery would then start as indicated by the charging LED.

The ticket number on the ticket and the station location would then be sent via the transceiver 146 to the interface payment controller 28 at the parking facility. Once the charge is complete, a message would be sent to the interface controller to indicate that the charging was complete. If the cable 70 were removed, a message would be sent also to the system controller or interface payment controller 28. The interface unit would then send an "end of charge" transaction to the existing payment system 26. The existing payment system 26 would then add the additional charge to the parking fee upon exiting the parking facility and presenting the ticket. The payment amount would then incorporate the assessment for charging the battery of the vehicle.

There is a two-wire communication between the control box or POS module 100 and the control module 60. The power cable 70 also functions as a communication cable. In one form, the SAE level 2 connector 110 is a J1772 connector which is rated for 220 volts and 100 amps. Typically, the level 1 connector 130 is operated at about 16 amps and a level 2 operates at about 72 amps. The power line communication can be accomplished with an X10 protocol. Other protocols may also be suitable.

Figure 11:
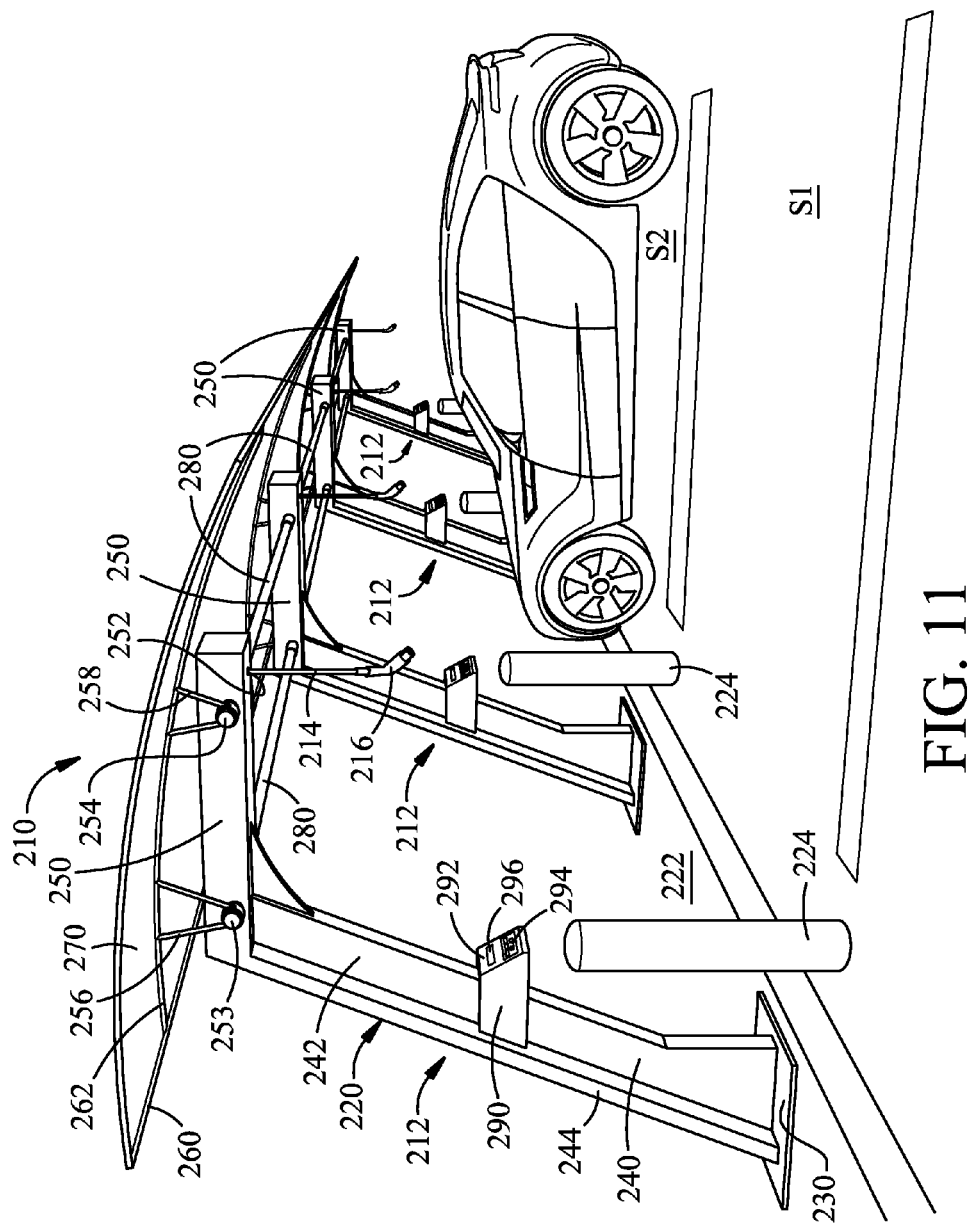
FIG. 11 is a perspective view of another embodiment of a charging facility for multiple vehicles as illustrated in conjunction with parking spaces and a representative vehicle.
Figure 12:
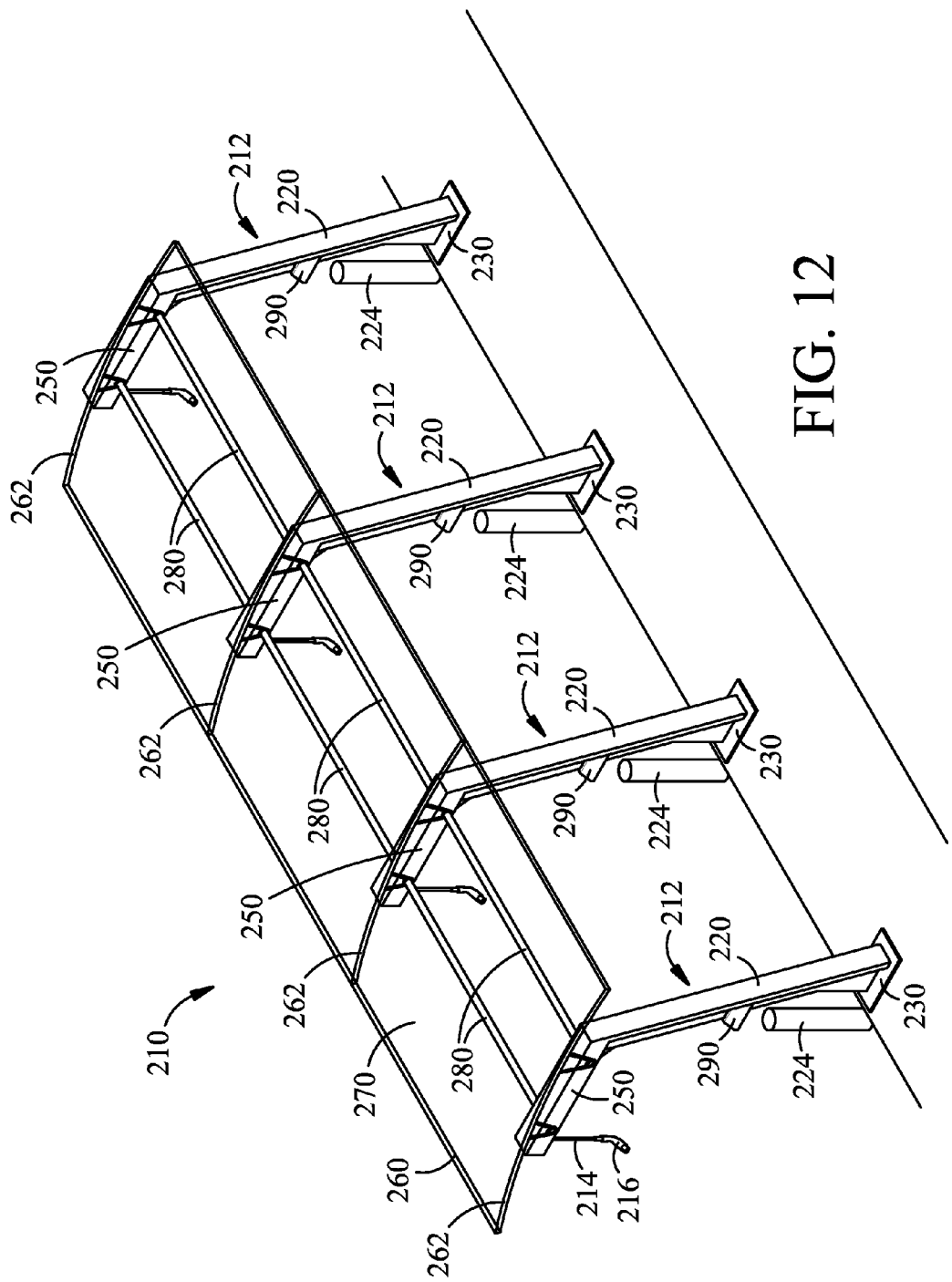
FIG. 12 is an overhead perspective view, from an opposite angle thereof, of the charging facility of FIG. 11.

With reference to FIGS. 11 and 12, another embodiment of a charging facility with an overhead retractable cable is designated generally by the numeral 210. Overhead charging facility 210 has a modular construction to provide a series of multiple stations 212, each associated with a separate parking space S1, S2, S3, S4 . . . In the illustrated embodiment, there are four charging stations 212. Each of the charging stations is adapted, via an overhead power cable 214 and a terminal connector 216, to provide a source of electric power for charging the battery system of an electric vehicle. The charging facility 210 may be expanded to provide numerous charging stations as desired and is especially adaptable for being configurable to the desired number of charging stations due to its modularity and design characteristics. The charging facility 210 is preferably a standalone outdoor installation which provides publicly accessible power for charging the batteries of electric vehicles. The charging facility 210 has a sleek efficient construction with a protective overhead cover for the vehicle while being charged.

Multiple substantially identical stanchion units 220 are preferably transversely equidistantly spaced. Each stanchion unit 220 comprises a base plate 230, an upright 240 and an overhead support member 250 which is preferably mounted in a cantilever-type arrangement with the upright. The plate 230 is preferably bolted to an elevated concrete platform 222 which extends above an adjacent parking area. A barrier post 224 is preferably disposed in front of each stanchion unit 220. The upright 240 preferably includes a slightly angled steel or metal beam 242. A rectangular tubular back cross brace 244 is preferably welded or affixed to the rear of the beam 242. The beams 242 and 244 are rigidly affixed to the base plate 230. The support member 250 is preferably a tubular steel or metal member which has a downward frontal opening 252 through which the retractable power cable 214 is suspended.

A pair of bosses 253 and 254 project transversely from the sides of the upper member 250. V-shaped struts 256 and 258 are fastened to the bosses and project upwardly to connect with an arcuate member 262 of a canopy frame 260. The frame 260 supports an overhead canopy 270 which extends transversely across each of the canopy supports of each of the stanchion units. The canopy functions as a protective roof which extends across a portion of the vehicle when parked in a parking space. The canopy 270 provides shelter for using the charging station and charging the vehicle at an outdoor location. It should be appreciated that, depending upon the specific location of the battery terminal on the given vehicle, the vehicle may be either driven forwardly or backed into the parking space to provide protection from the elements for the power cable 214 upon connection with the terminal of the vehicle charging circuit.

Tubular brackets 280 extend from stanchion unit 220 to stanchion unit 220 to provide reinforcement and also to provide conduits for a power tap-off to succeeding charging stations 212.

At a convenient intermediate location, a control console 290 projects forwardly from the upright 240. Each control console 290 preferably has a sleek side trapezoidal form with a frontal face 292 having control buttons and various input keys 294 for obtaining access to power for charging the vehicle and for billing the operator for the used power. Preferably, there is also a screen 296 to indicate the charging condition and advise the operator of the time of the charge, the power consumed and the cost of the charge. For some embodiments, a proximity sensor 298 may also be mounted to the control console as shown in FIG. 15.

Figure 13:
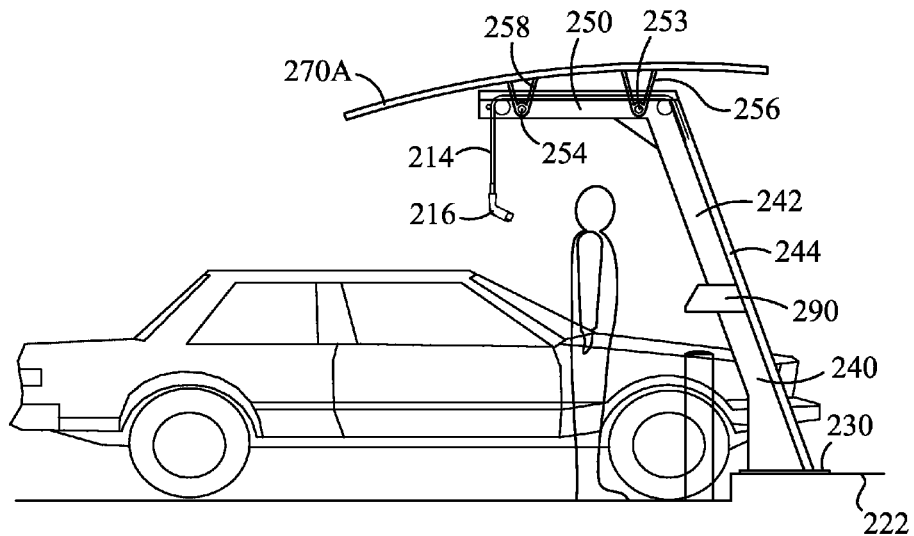
FIG. 13 is a side elevational view, portions removed, of a charging facility and a vehicle in an associated parking space together with a representative operator.
Figure 14:
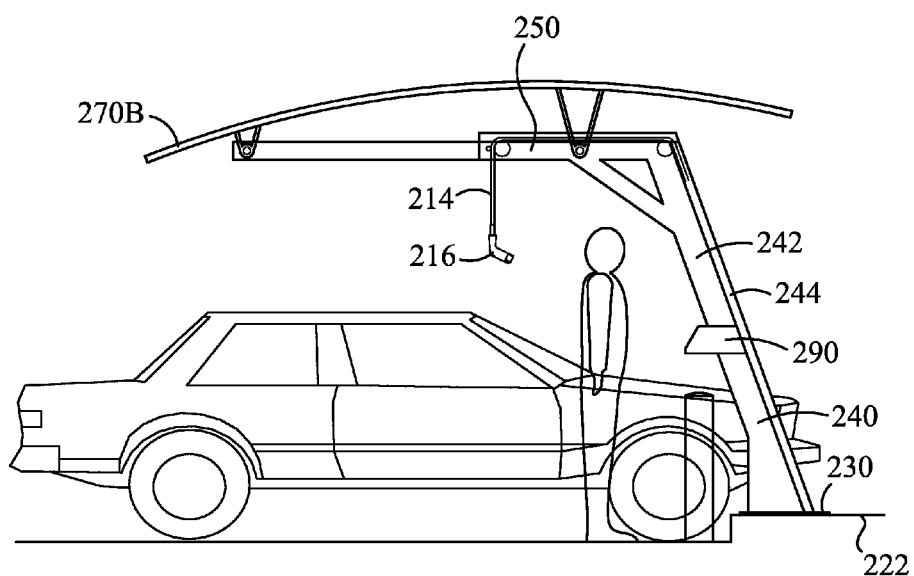
FIG. 14 is a side elevational view, portions removed, of an alternative construction of a charging facility, parking space, vehicle and representative operator.

FIGS. 13 and 14 illustrate two alternative configurations for the overhead canopy. In FIG. 13, the canopy 270A extends only a portion over the vehicle. In FIG. 14 the canopy 270B extends for a greater proportion over the vehicle. This type of canopy is more suitable for northerly climates where extensive snow loading on the canopy may occur.

It will be appreciated that the charging facility has a construction wherein an additional charging station may be efficiently provided by merely providing an additional stanchion unit 220 and extending the canopy 260. In addition, tubular brackets 280 bridge the stanchion units 220 and function as conductor conduits for the power supply for the additional charging station 212.

Figure 15:
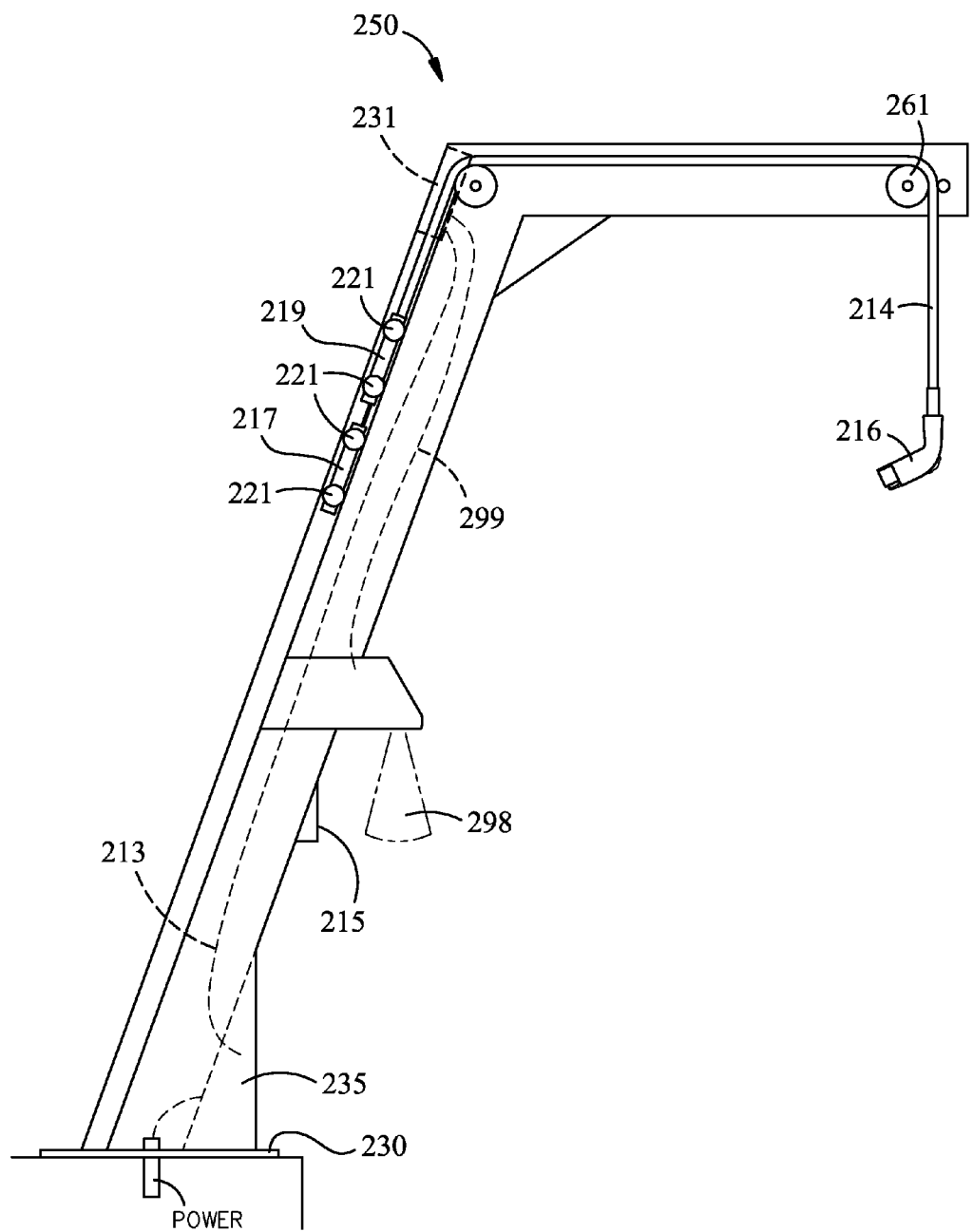
FIG. 15 is a side elevational view, partly broken away, partly annotated, and partly in phantom, to show detail of a retractable cable feature of the charging facility.
Figure 16:
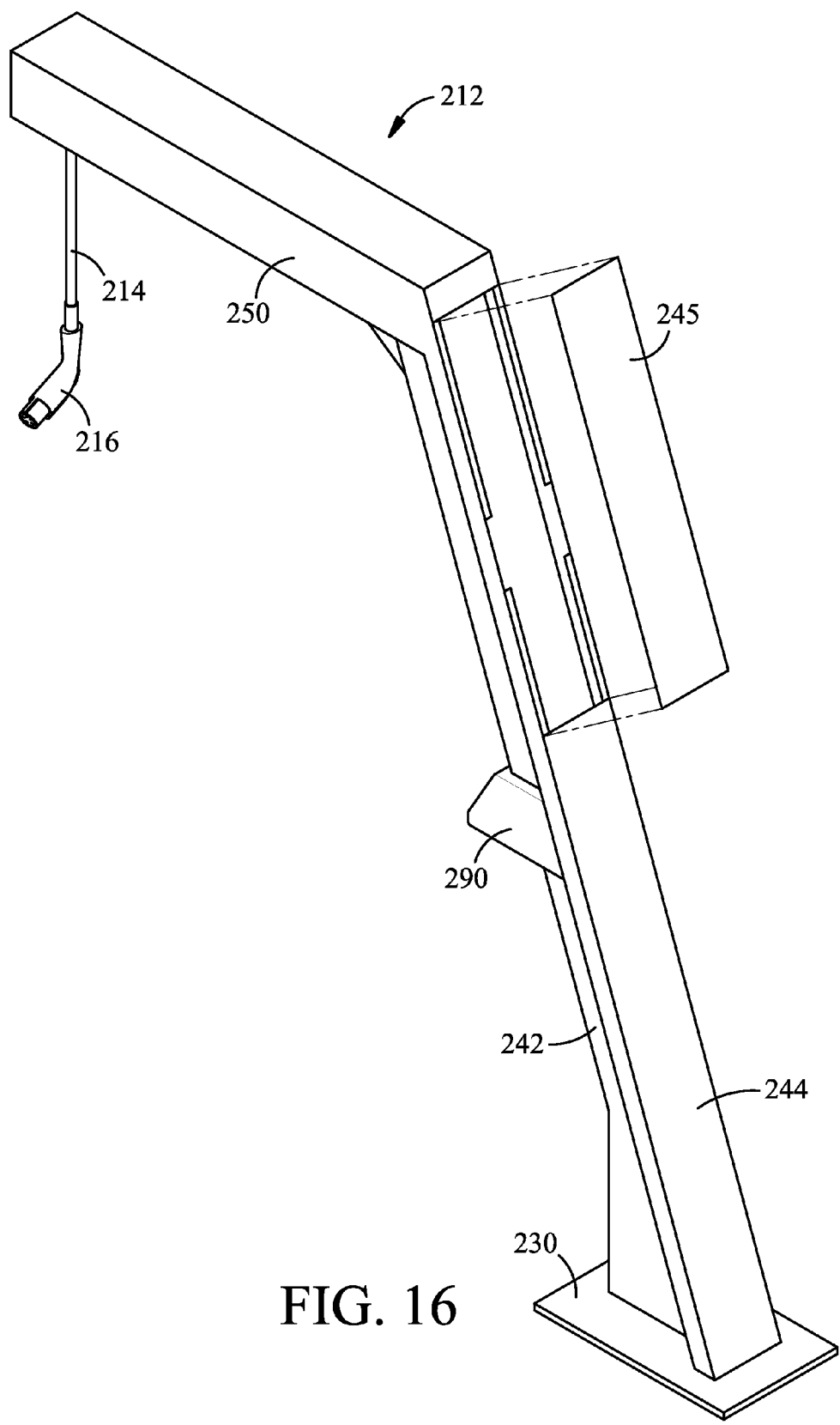
FIG. 16 is a rear exploded view of a stanchion for the charging facility.
Figure 17:
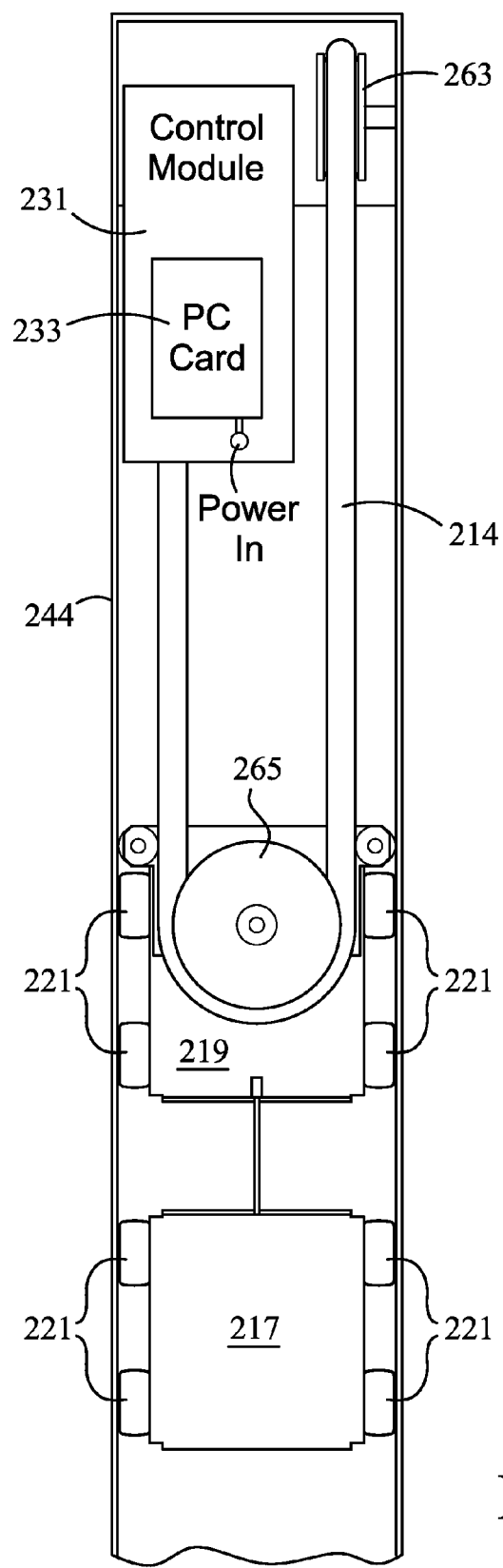
FIG. 17 is an annotated sectional view, partly in schematic, taken along the lines 17-17 of FIG. 15.
Figure 18:
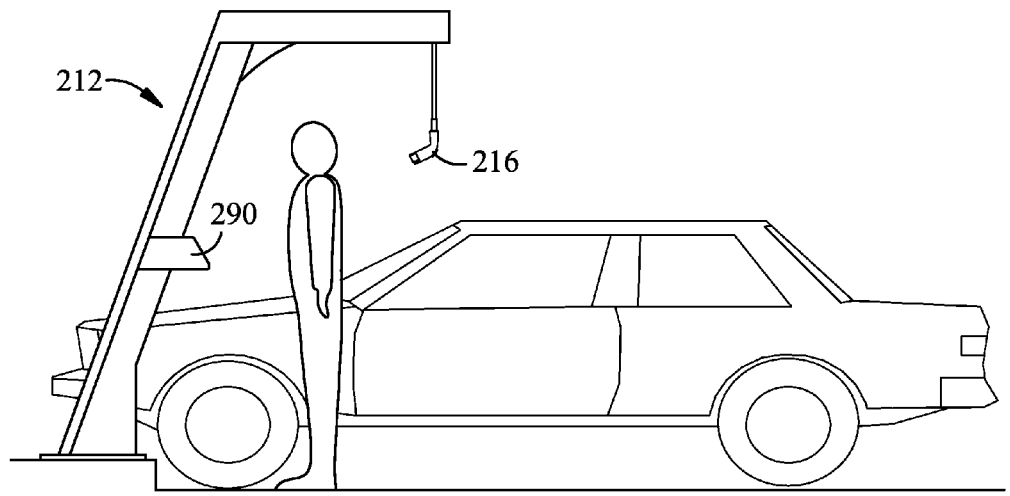
FIG. 18 is a side elevational view of a stanchion unit, a vehicle and an operator prior to activating an electric power charge of the vehicle.
Figure 19:
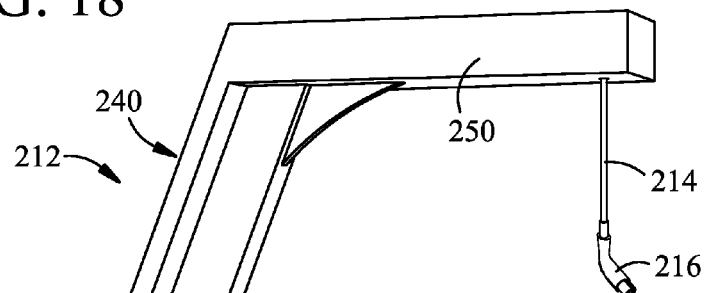
FIG. 19 is a perspective view of the stanchion unit of FIG. 18.
Figure 19A:
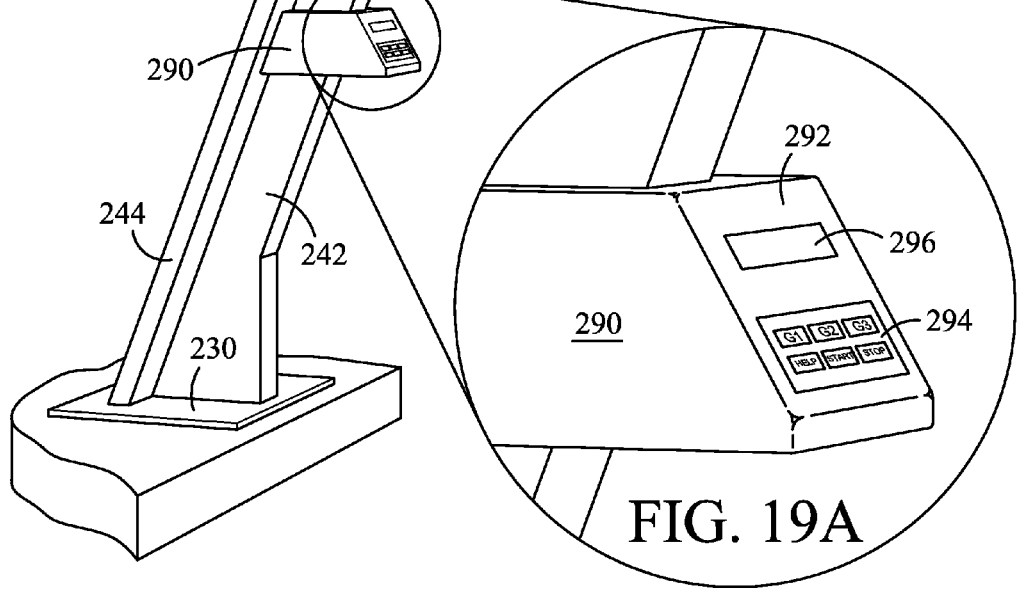
FIG. 19A is an enlarged view of the circled console portion of FIG. 19.

With additional reference to FIGS. 15-17, each power cable 214 includes a terminal 216 which mates with the recharging terminal of the electric vehicle. The power cable 214 connects via a power line 213 with the power supply at a junction box 235 and is controlled by a controller 241 which controls the electric power supplied to the cable terminal controller 231 hose. The controller includes a PC card 233 which is responsive via a control signal 299 from the proximity sensor 298 for controlling the power applied to the terminal 216. The control circuit which includes a ground fault detector for determining a ground fault and preventing the flow of power until the grounding with the vehicle is properly completed. The control circuit also includes circuitry for determining when the charge is completed and terminating the charge to the vehicle battery.

The retractable cable 214 extends around a pair of idle pulleys 261 and 263 and a pulley 265 carried by a variably positionable cable trolley 219. A counterweight in the form of a weight trolley 217 connects with the cable trolley 219 as illustrated in FIGS. 15 and 17. The trolleys 217 and 219 have rollers 221 which slide along the tubular channel of the inclined brace 294. A removable access panel 245 may be removed to provide access to the controller 231 and the trolleys 217 and 219. A 110 VAC outlet 215 may also be mounted on the stanchion (FIG. 15).

Figures 20, 21:
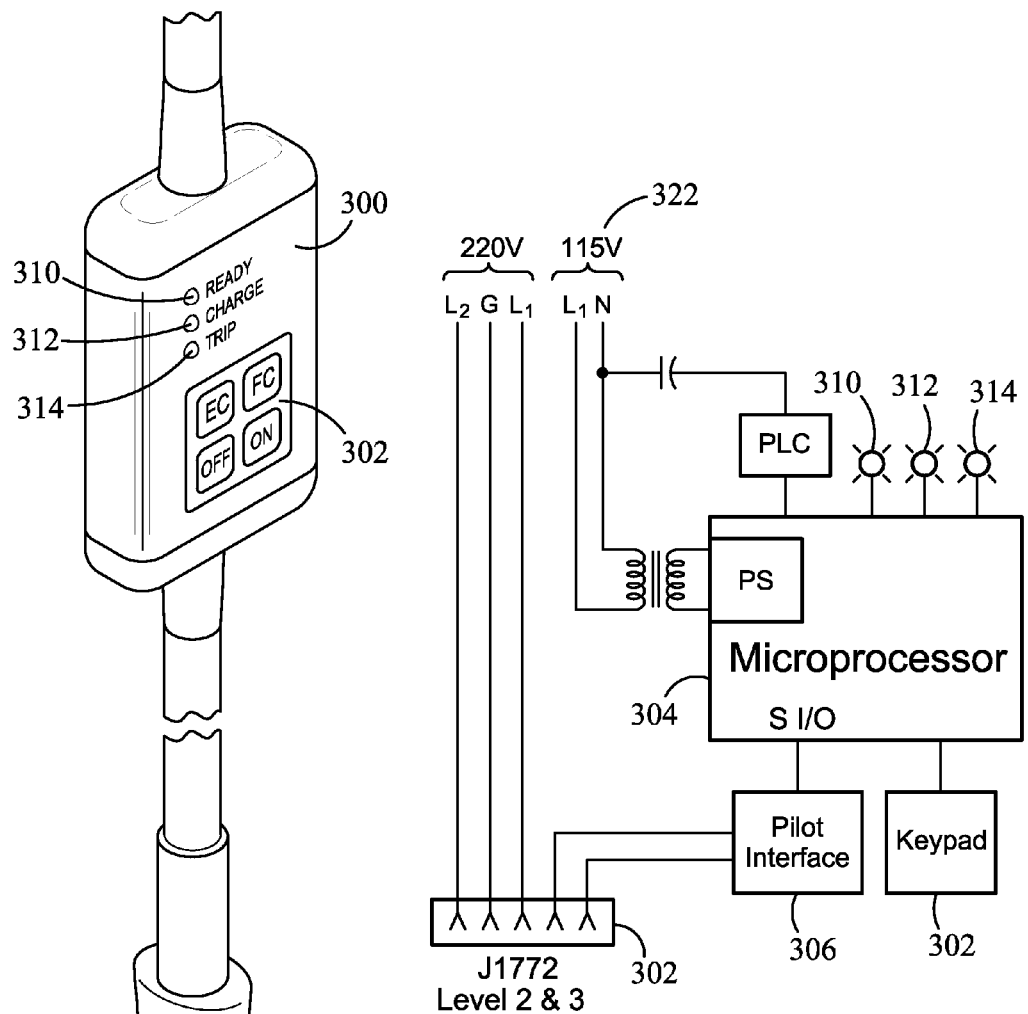
FIG. 20 is a perspective view, portions broken away, of a power cable, a connector and an associated control for a charging facility.
FIG. 21 is a schematic diagram for the connector and the control of FIG. 20.
Figure 24:
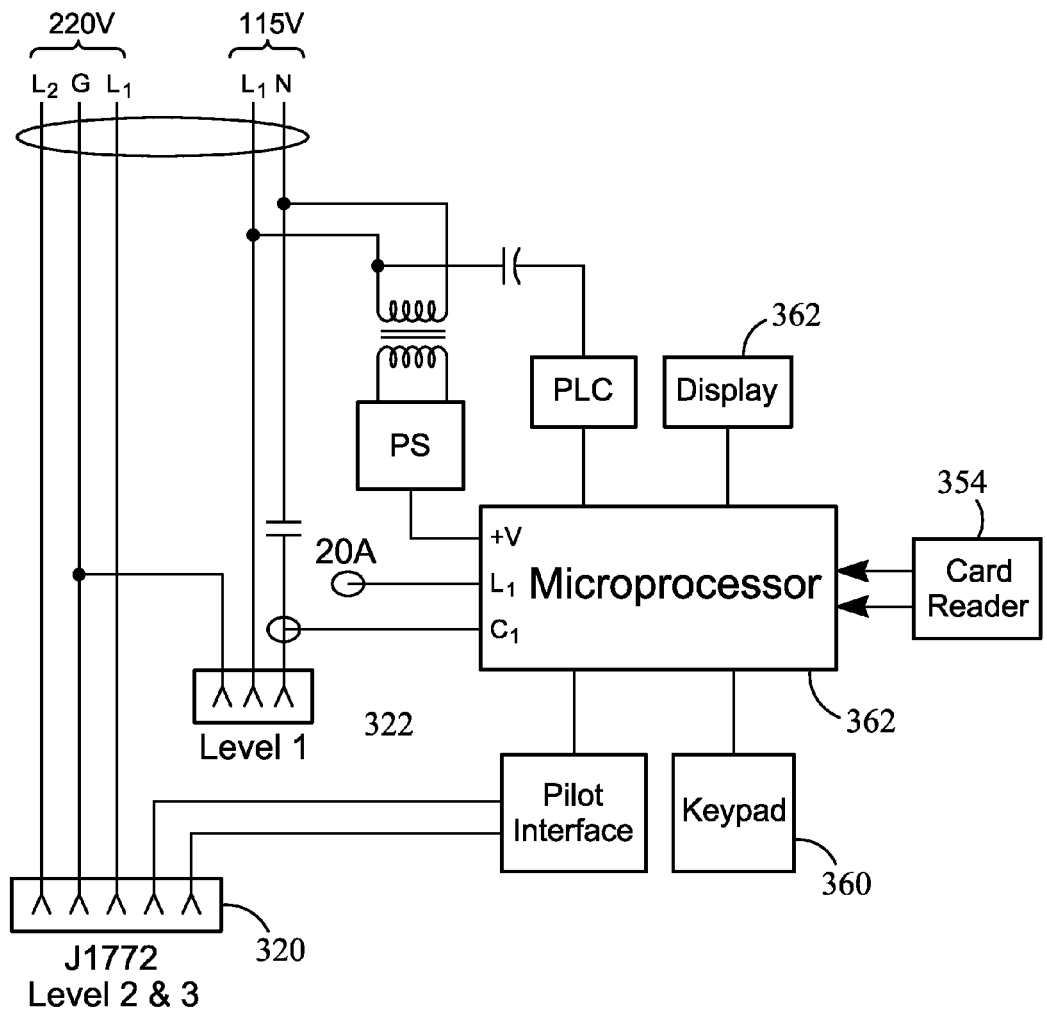
FIG. 24 is schematic diagram for the connector and reader for FIG. 22.
Figure 25:
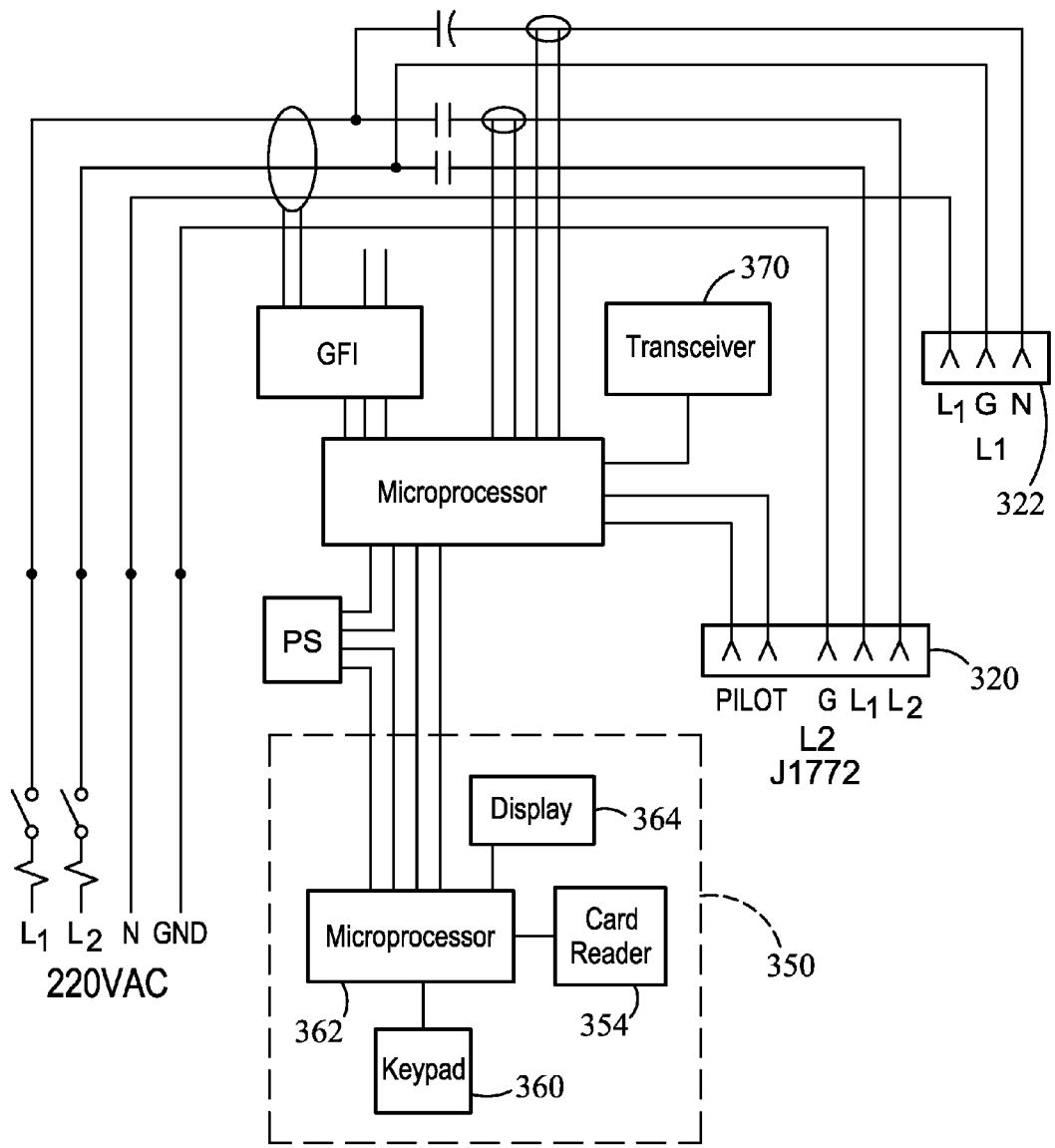
FIG. 25 is a schematic diagram for a charging station.

The terminal connector may have a number of configurations such as a J1772 level 2 and 3 terminal connector 320 illustrated in FIGS. 20 and 21. In addition, provision may be made for both 220-volt and 115-volt charging as illustrated by the terminals and outlet 322 in FIGS. 21 and 22.

The power cable connecting end may assume a number of forms. In one form illustrated in FIG. 20, a control module 300 is mounted proximate the terminal connector 320. The module 300 includes a keypad 302 which provides input to a microprocessor 304. The adjacent terminal connector is configured as a type 2 connector with a 220V power output. Additional power output may be provided at the control module. A pilot interface 306 is employed to detect a ground fault. The module also includes LEDs 310, 312 and 314 for indicating that the terminal is ready for use, that the vehicle is charging or that a trip condition has been detected and implemented.

With reference to FIGS. 22-25, the control module 350 includes a slot 352 for a reader 354 for a card reader 356 or a ticket 358. The module 350 includes a keypad 360 which also provides an input to a microprocessor 362. The level 1 output 322 is provided at the underside of the module. The module also has a display 364 for displaying the various messages as required. As further indicated in FIG. 25, data indicative of the charging may also be forwarded over a transceiver 370 to a central control (not illustrated).

The controller communicates with the input and output functions of the controller and console either via hardwiring or via RF communication or other communication protocols. The control console also ultimately communicates with a remote server for transmitting and communicating information concerning the identity of the operator using the power supply as well as data and information to pay for and/or bill for the power consumed during the charging. The power console screen also provides information concerning the volume of energy supplied during the charge as well as the cost for the supplied power. The console also alerts the operator when the charge is completed. In addition, information concerning the charging time and/or the time remaining for a preset time charge may also be provided at the console screen.

Figure 26:
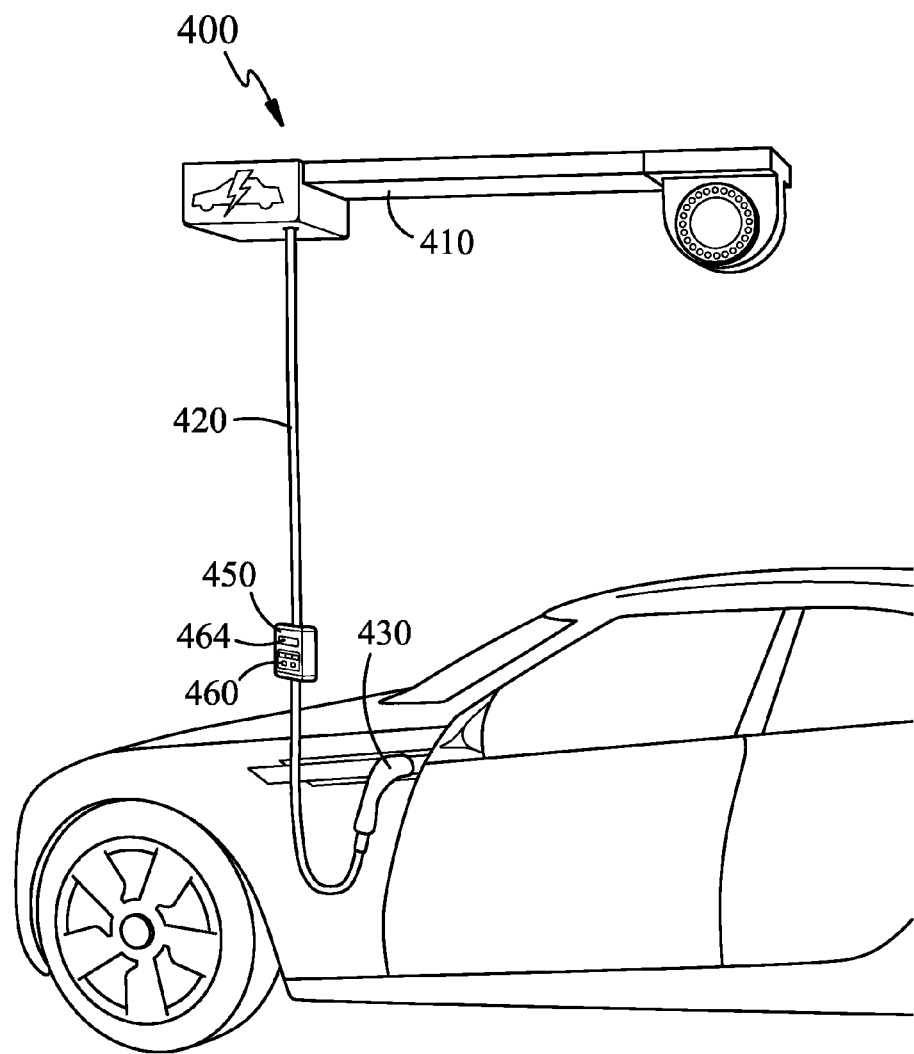
FIG. 26 is a perspective view of an overhead electric vehicle charging station with a retractable power cable being connected to a vehicle (partially illustrated) for charging.

With reference to FIG. 26, an electric vehicle charging station which incorporates an overhead retractable power cable is generally designated by the numeral 400. The cable retraction mechanism is housed within a conformal housing 410 which mounts to the ceiling of a facility, or is otherwise suspended in an overhead orientation. A single retractable power cable 420 includes a power connector 430 which connects with the charging terminal of the electric vehicle as illustrated in FIG. 26. The cable mounts a control module 450 with a keyboard 462 and a display window 464.

Figure 27:
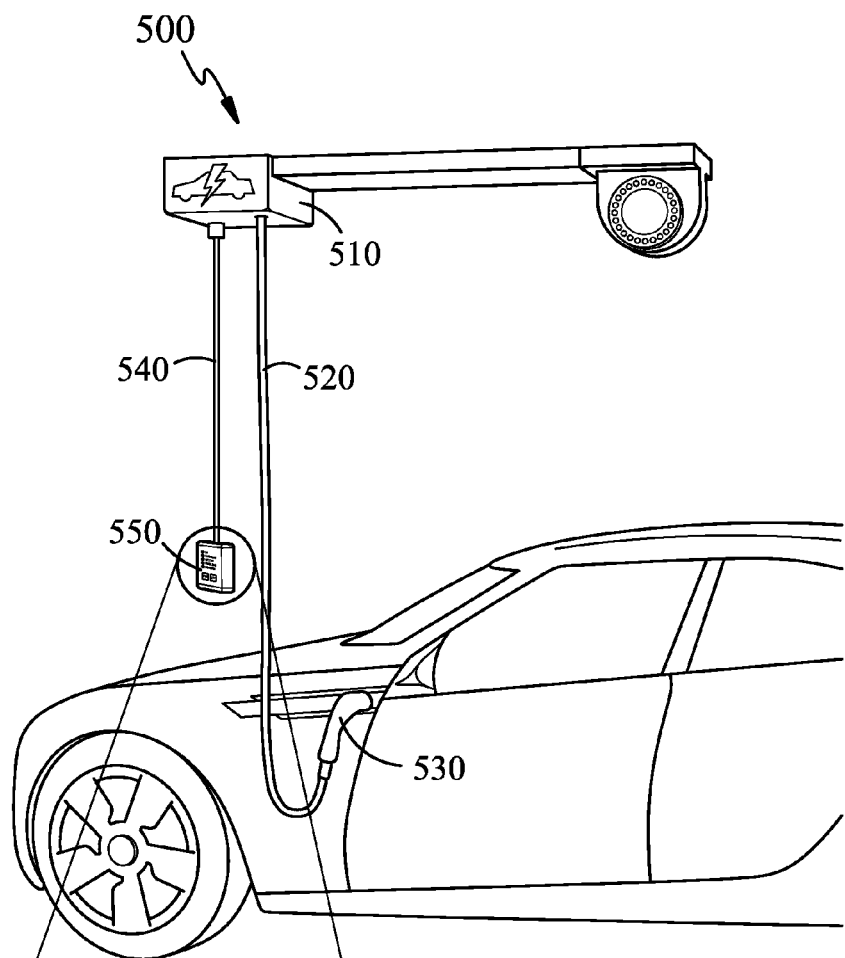
FIG. 27 is a perspective view of another embodiment of an electric vehicle charging station with the retractable power cable connected to a vehicle (partially illustrated) for charging.
Figure 27A:
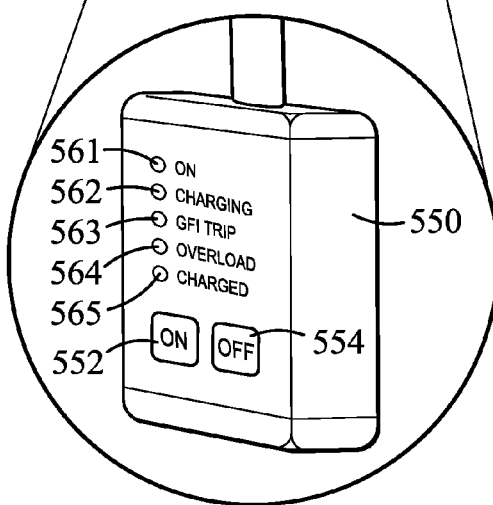
FIG. 27A is an enlarged view of the circled portion of FIG. 27.

With reference to FIG. 27, an electric vehicle charging station, which includes an overhead retractable power cable, is designated generally by the numeral 500. The retractable power cable 520 has a connector 530 which connects with the charging terminal of the electric vehicle. A cord 540 is also suspended from the forward portion of the housing 510. The cord connects with a control module 550 which remains suspended in a generally fixed position (which can be adjustable) above the floor of the parking bay. The control module 550 may thus be relatively easily accessed by the operator. The module 550 includes an on button 552 and an off button 554 and various LED indicators 561-565 which, for example, respectively indicate that the power is on, the vehicle is charging, there is a ground fault trip, there is an overload and the vehicle is fully charged.

Figure 28:
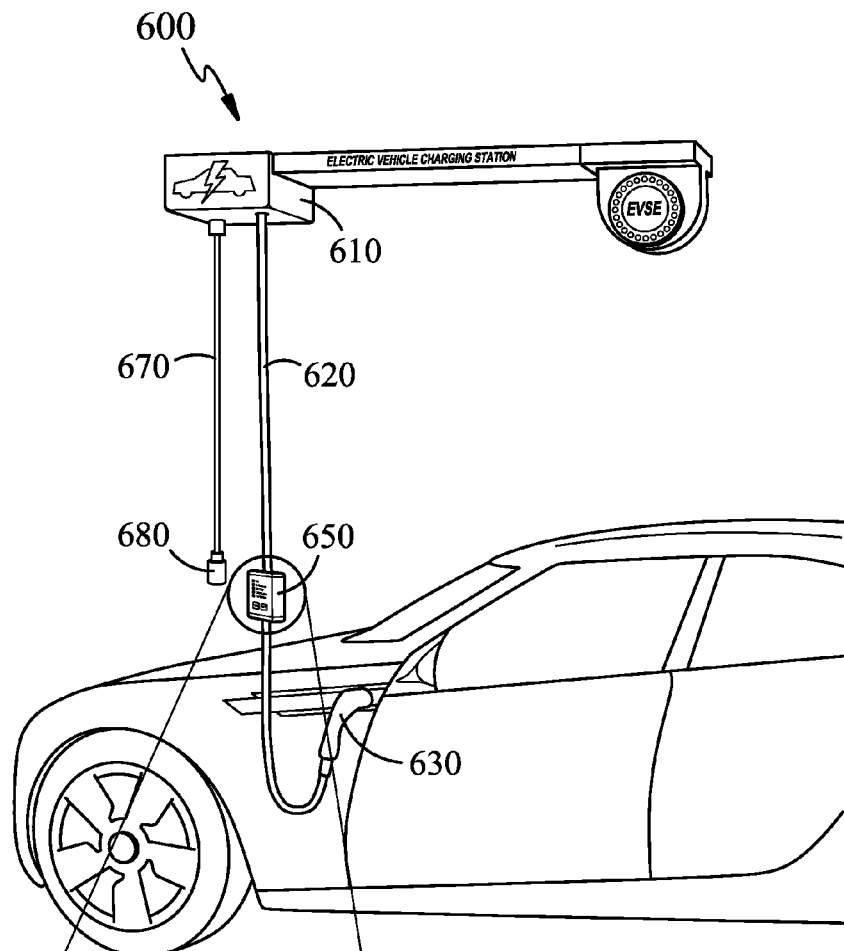
FIG. 28 is a perspective view of an additional embodiment of an electric vehicle charging station illustrated with the retractable power cable being connected with an electric vehicle (partially illustrated) for charging.
Figure 28A:
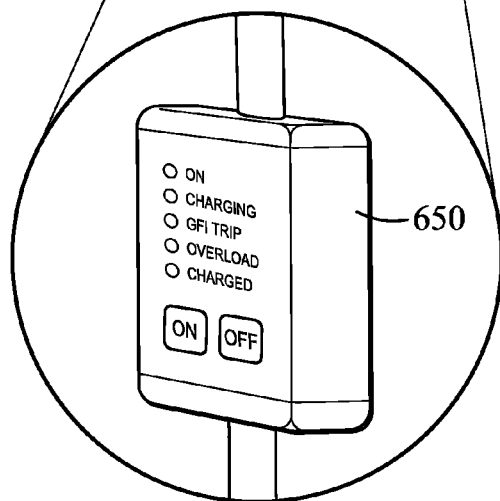
FIG. 28A is an enlarged perspective view of the circled portion of FIG. 28.

With reference to FIG. 28, an electric vehicle charging station which incorporates a retractable power cord is designated generally by the numeral 600. The power cable 620 connects with a level 2 connector 630 such as a J1772 connector which is capable of supplying 220 volts at 32 amps. The cable 620 also includes a module 650 for operating the charging and indicating the condition of the charge function. In addition, a second retractable cable 670 is suspended from the housing 610. The cable 670 connects with a level 1 connector 680 which may, for example, supply 120 volts at 20 amps.

One set of preferred positional parameters for the various power cables and connectors is illustrated in FIGS. 29A and 29B. For example, an illustrated preferred position of the connector in a non-usage mode is approximately 4 feet above the surface of the parking bay. The overhead retractable cable system may be suspended from a height, for example, of 8 feet, 5 inches. The power cable 520 in the extended mode such as, for example, wherein a 10 foot arc would be swept out, indicates that the connector 530 may be easily positioned at various positions of the electric vehicle depending upon the location of the cable connector and the manner in which the vehicle is positioned within the parking bay.

Figure 30A:
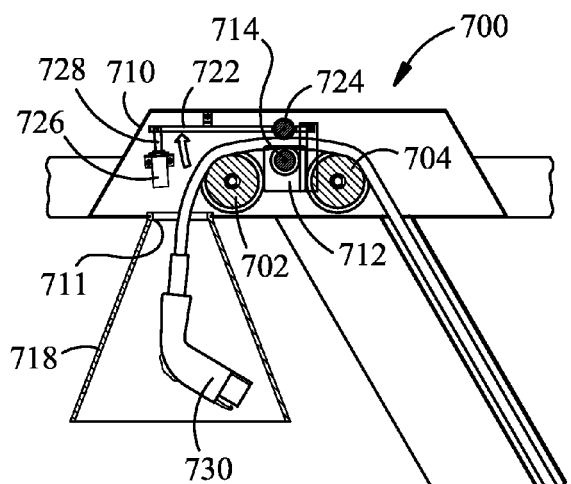
FIG. 30A is a fragmentary diagrammatic sectional view of a stanchion for an overhead charging station further illustrating a mechanism for extending and retracting the power cable, said mechanism being illustrated in a retracted mode.
Figure 30B:
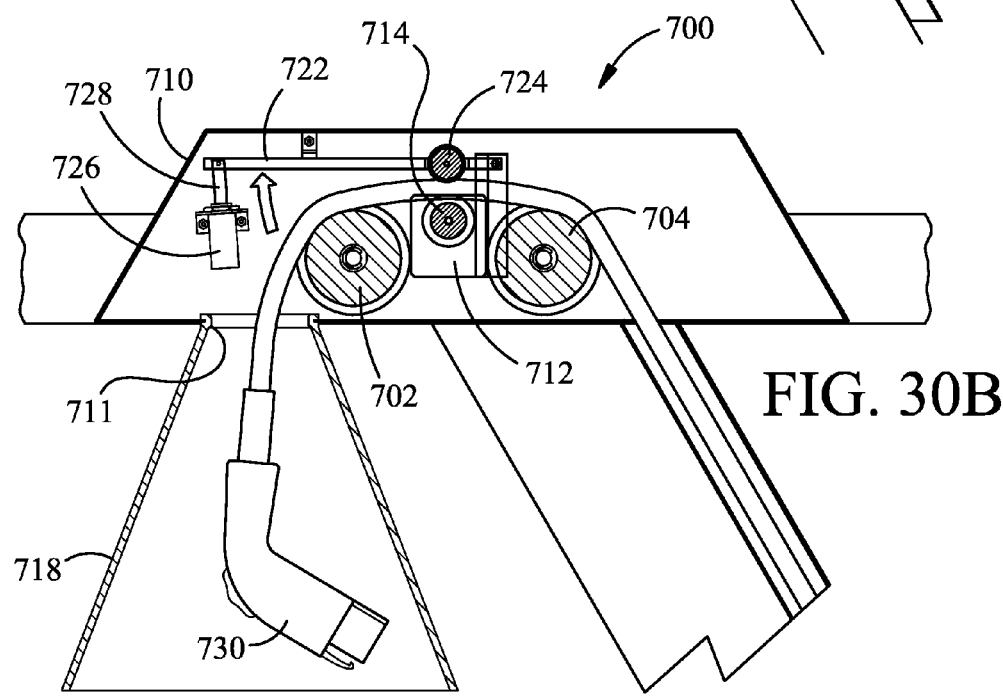
FIG. 30B is an enlarged view of a portion of FIG. 30A.
Figure 31A:
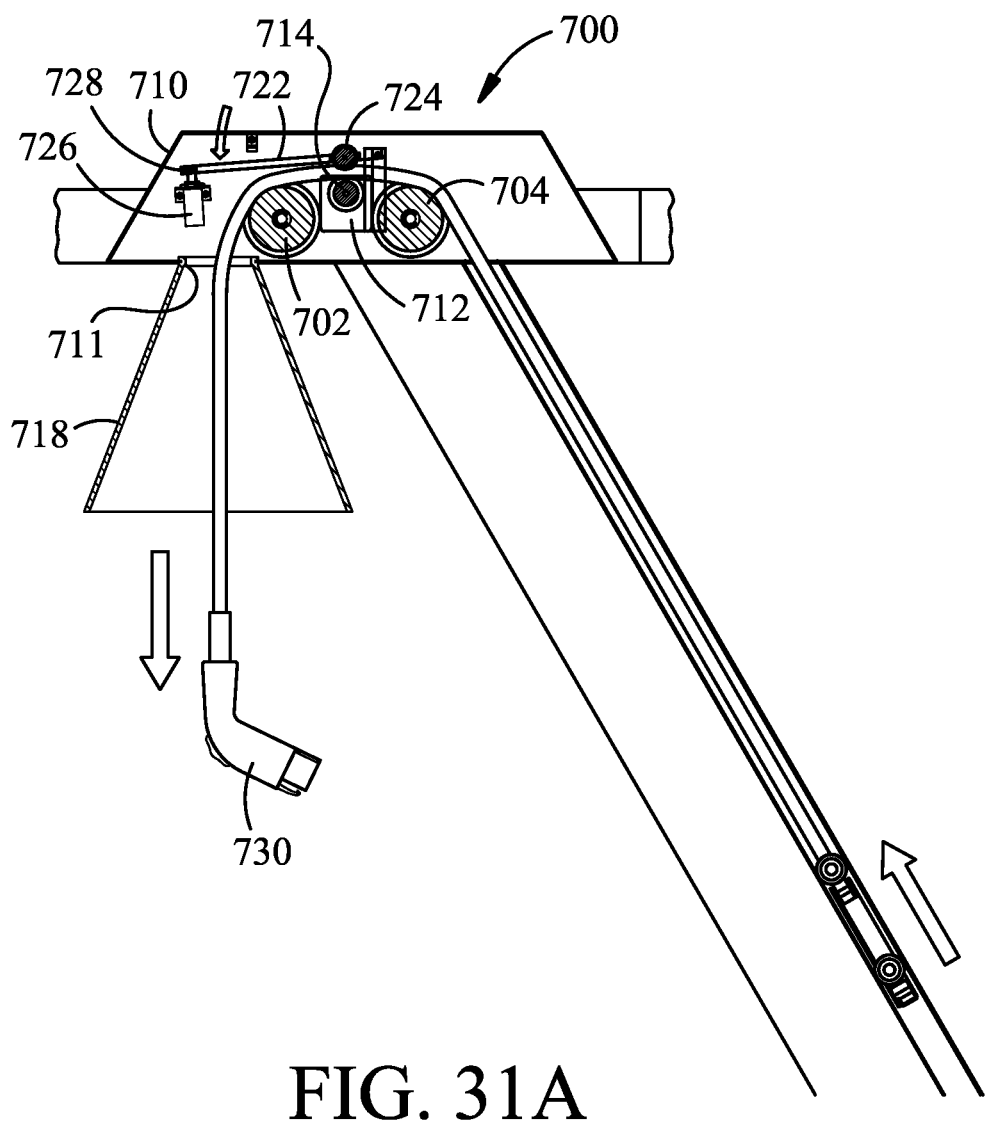
FIG. 31A is a fragmentary diagrammatic sectional view of the stanchion and mechanism of FIG. 30A, said mechanism being illustrated in a drive extending mode.
Figure 31B:
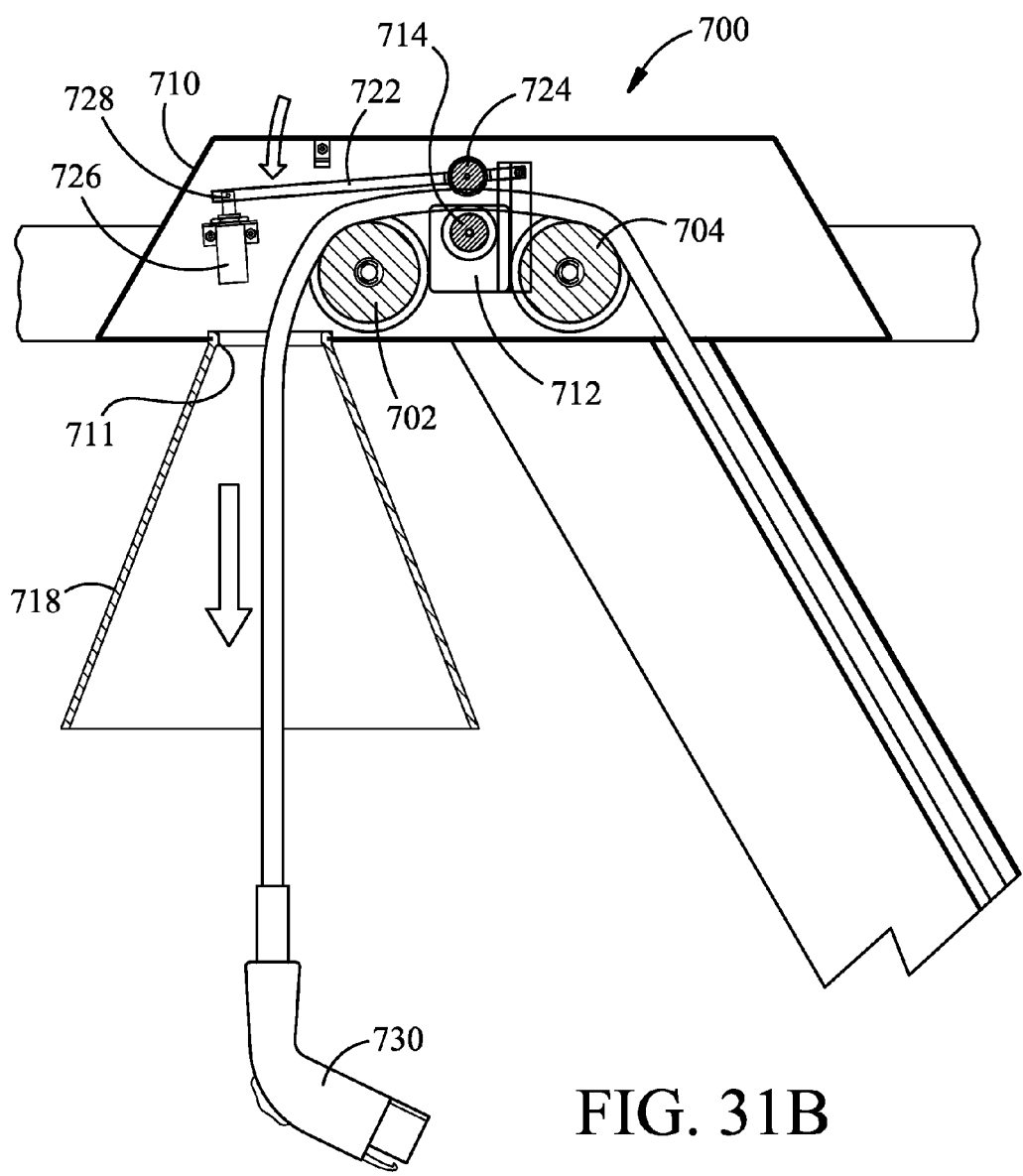
FIG. 31B is an enlarged view of a portion of FIG. 31A.
Figure 32A:
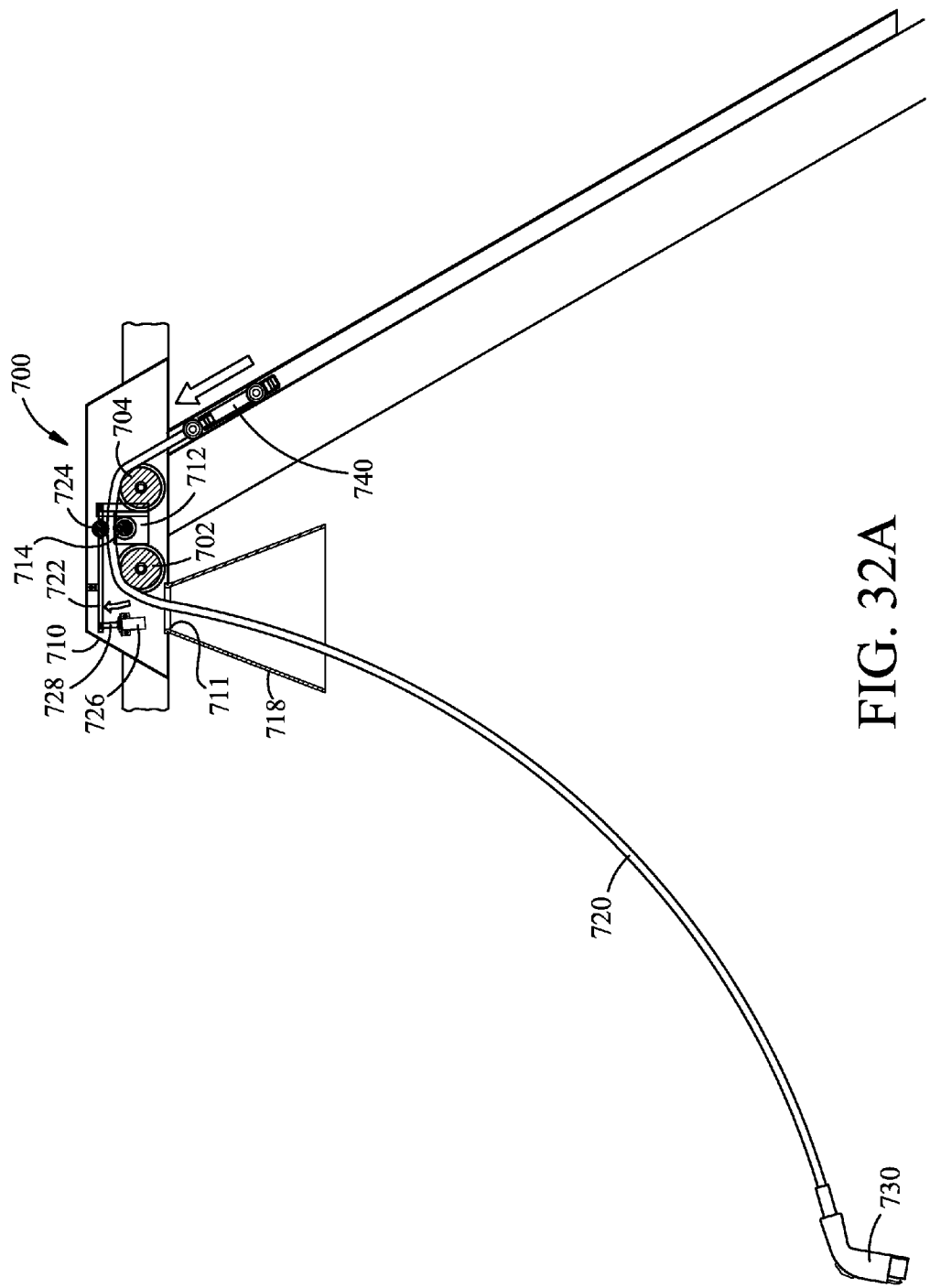
FIG. 32A is a fragmentary diagrammatic sectional view of the stanchion and the mechanism of FIG. 30A, illustrating the mechanism in a free-pull mode with the power cable in an extreme extended position.
Figure 32B:
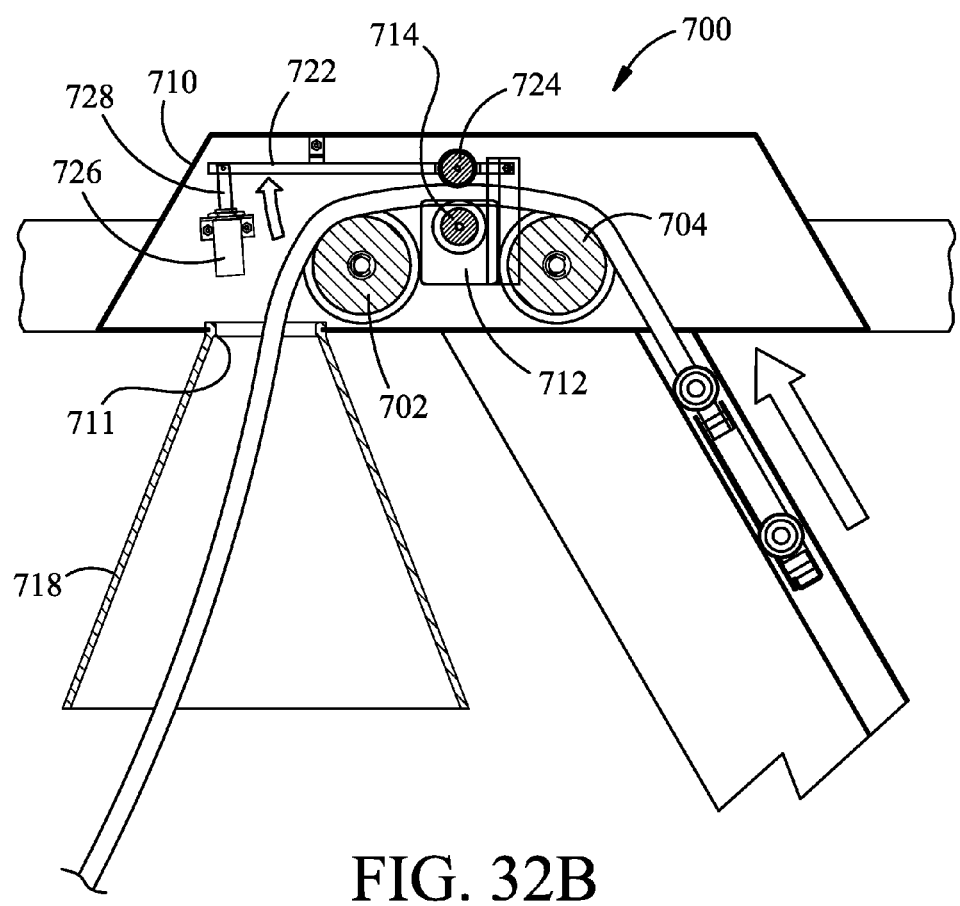
FIG. 32B is an enlarged view of a portion of FIG. 31B.

With reference to FIGS. 30A-32B, a drive mechanism for extending and retracting an overhead power cable as employed on an upright stanchion is generally designated by the numeral 700. The drive mechanism 700 is housed within a housing 710 at the top of the stanchion. The power cable 720 passes through an opening 711 at the bottom of the housing 710. FIGS. 30A and 30B illustrate the drive mechanism 700 as the cable 720 is at the retracted position. FIGS. 31A and 31B illustrate the drive mechanism 700 as the cable is initially moved toward the "ready for use" position. FIGS. 32A and 32B illustrate the drive mechanism 700 as the cable is extended to connect to the electric vehicle.

The drive mechanism 700 includes a pair of idlers 702, 704 which are mounted within the housing 710 and are disposed in generally spaced relationship for rotation about parallel axes. The power cable 720, which is typically a 32 amp or 74 amp cable, is a heavy-duty and relatively heavy cable. The power cable 720 is also somewhat stiff and essentially only semi-flexible and is carried by the idlers with the free end connecting with a J1772 connector 730 and the cable passing through an opening 711 in the stanchion housing.

A motor 712 drives a wheel or drive puck 714 whose rotational axis is parallel to that of the idlers. The drive puck 714 is disposed between the idlers 702, 704. The drive puck 714 is adapted and positioned to selectively engage the underside of the cable as it passes over the idlers 702, 704. An arm 722 is pivotally mounted within the housing above the drive puck. The arm carries a roller 724 having a rotational axis which is parallel to that of the drive puck. A solenoid 726 connects at the opposite end of the arm. The solenoid has an actuator 728 which is variably positionable to essentially raise and lower the pivotal position of the arm and hence raise and lower the carried roller 724. A stop 732 may be mounted above the arm to provide an upper limit position of the arm.

When the arm 722 is in an upper position determined by the solenoid actuator 728, the roller 724 does not contact or either lightly engages the upper portion of the cable which typically assumes a quasi-arc-like configuration between the two idlers, as best illustrated in FIGS. 30B and 32B. When the solenoid moves the arm to a downward pivotal position, the roller 724 engages the cable 720 opposite the drive puck 714 and essentially captures or pinches the cable between the roller and the drive puck, as best illustrated in FIG. 31B. Rotational motion of the drive puck 714 forces the cable 720 to move either to the right or the left, over the idlers 702,704 as illustrated in the figures.

The motor 712 is bi-directional so that when the drive puck rotates in a counterclockwise direction (as illustrated in the figures), the cable is forced downwardly from the opening 711 at the bottom of the housing and will essentially be lowered to a "ready to use" position (FIG. 31A) so that the user may visually see the selected cable and easily grasp the cable and/or connector. The solenoid 726 then moves the arm 722 to an upward position (FIG. 32A) wherein the roller disengages from the pinched relationship with the cable. The cable may now be further extended by the vehicle operator from the "ready to use" position, which is typically 4 feet above the pavement, and pulled to connect the connector 730 to the battery charging terminal of the vehicle. Because the roller does not forcefully engage against the top of the cable, the cable is free to be pulled over the idlers 702, 704 and extended, as best illustrated in FIGS. 32A and 32B.

When the battery charging operation is complete, a signal is sent to a controller for the motor and the solenoid. The roller 724 is then downwardly pressed against the cable and the motor is powered to rotate the drive puck in a clockwise direction to retract the cable into the housing. The lower portion of the cable loops around a weight trolley 740, as previously described for trolley 219.

It should be appreciated that when the charging station is not used, the connector is fully housed within a protective shroud 718 (illustrated only in FIGS. 30A and 30B) at the top of the stanchion. When either the vehicle operator uses a card at a kiosk or presses a switch or otherwise commences use of the power charging facility, the motor 712 and solenoid 726 receive a signal and are positioned automatically to extend the cable to a user-friendly height—approximately 4 feet above the pavement. The motor 712 is turned off and the solenoid 726 is actuated to allow the cable to be easily pulled to an extended position suitable so that the connector can be connected with the vehicle terminal for charging.

Upon termination of the charging and disconnection of the power cable 720, the motor and solenoid are actuated to retract the cable to the fully retracted position so that the connector is fully received in the shroud 718. The position of the cable at certain selected positions, namely the fully retracted (FIG. 30A) and the "ready to use" (FIG. 31A) positions, may be sensed by Hall sensors sensing magnets placed on the cable.

At the retracted position (FIG. 30A), the cable is not locked and the arm and roller are in an upper position. If someone pulls on the retracted cable and/or connector, the Hall sensor will sense same and send a signal to drive the motor to retract the cable, thereby providing a safety lock and preventing unauthorized usage.

Figure 33:
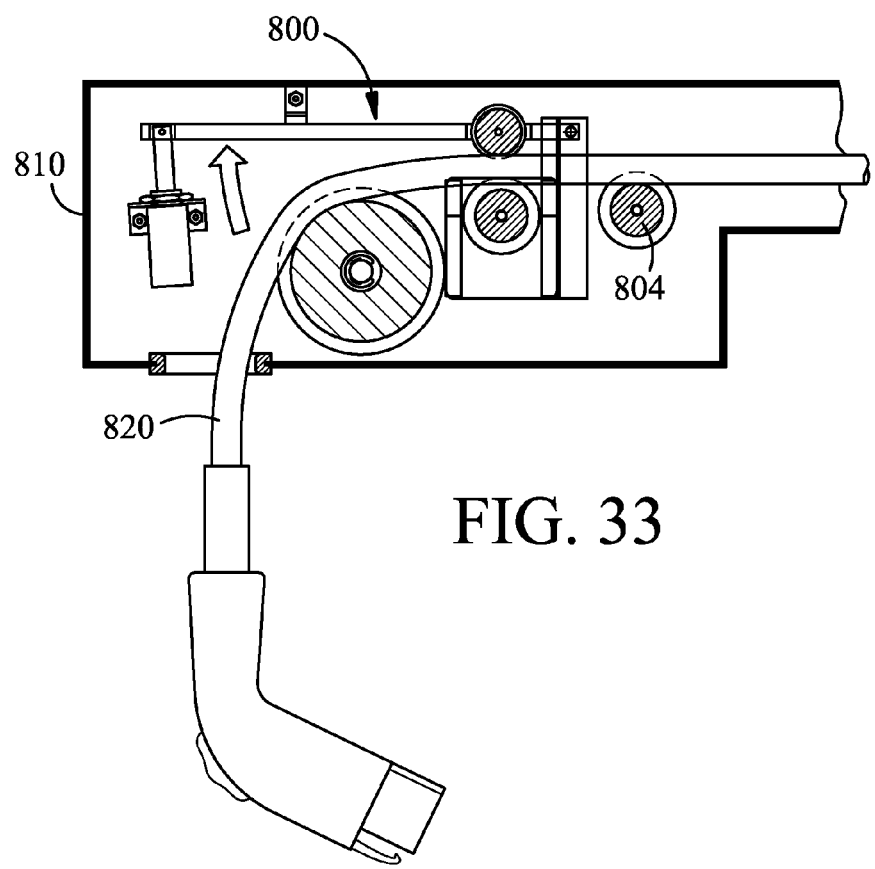
FIG. 33 is a fragmentary diagrammatic sectional view of a retractable power cable mechanism for an overhead housing with the cable being illustrated in a retracted position.
Figure 34:
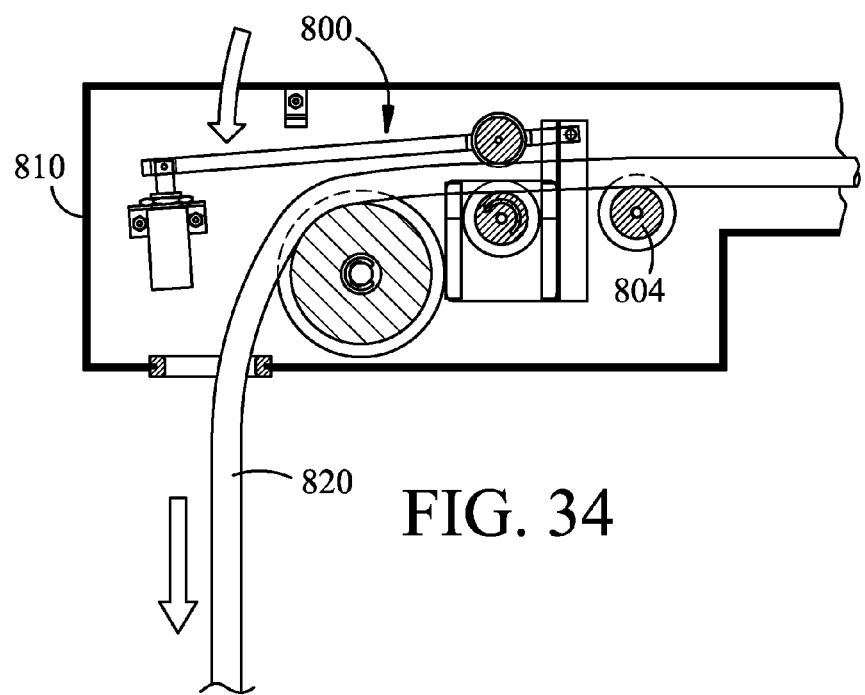
FIG. 34 is a fragmentary diagrammatic sectional view of the cable retracting mechanism of FIG. 33 with the mechanism being illustrated as the power cable is driven toward an extended position.

The drive mechanism 800 illustrated in FIGS. 33 and 34, is similar in form and function to drive mechanism 700. Drive mechanism 800 does not employ a weight trolley as such, since it is configured for an overhead cable 820, which upon retraction, is substantially completely disposed in an overhead housing 810. Because the cable 820 within the housing 810 assumes a more linear configuration than cable 720 for the stanchion installations of FIGS. 30A-32B, a smaller diameter idler 804 is employed. A spring-assist pulley is mounted to reel in the pulley as it is retracted and allow the cable 820 to be extended.

Figure 36C:
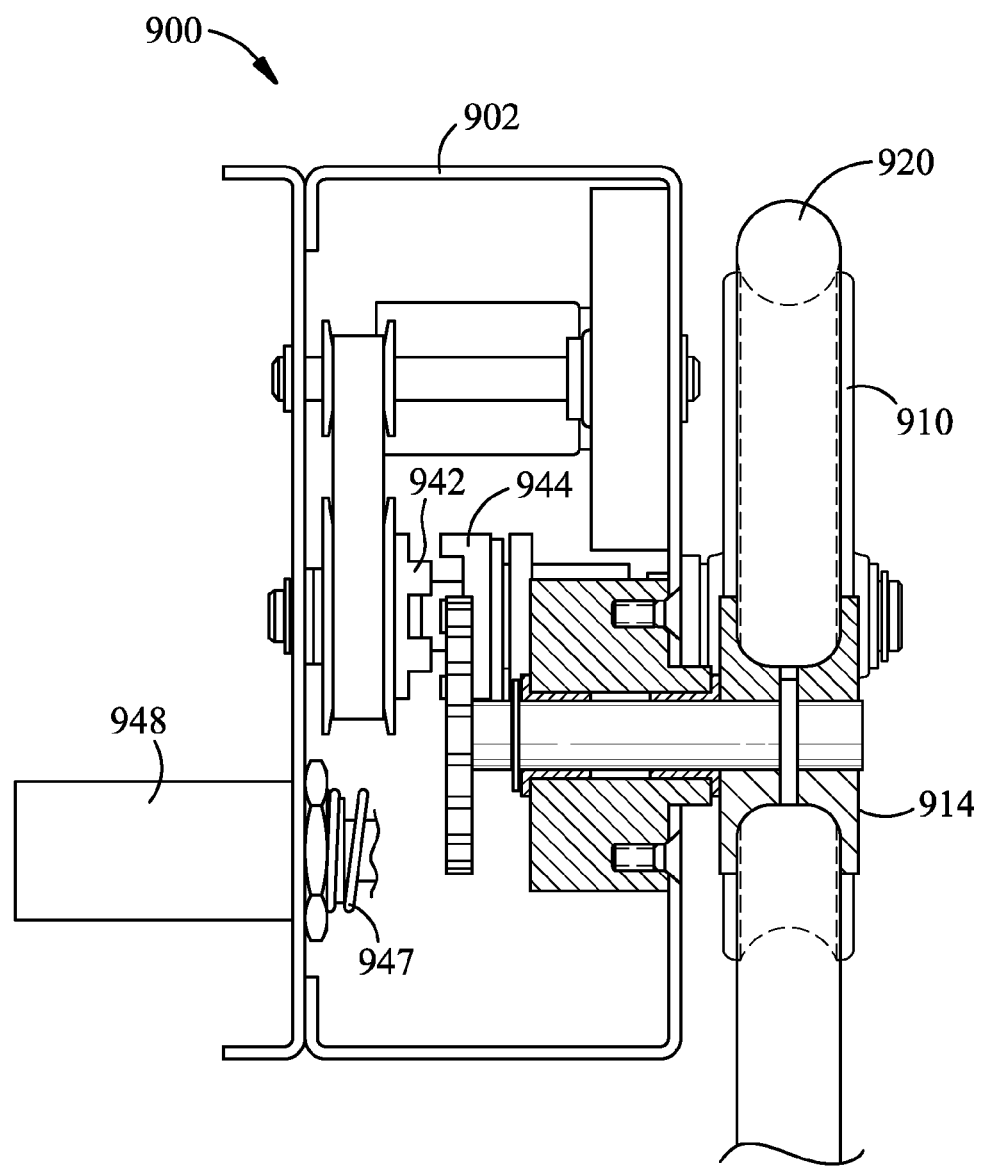
FIG. 36C is a cross-sectional view, viewed from an opposite end thereof to that of FIG. 36A of the retractor mechanism of FIG. 35 and a portion of a power cable.
Figure 37:
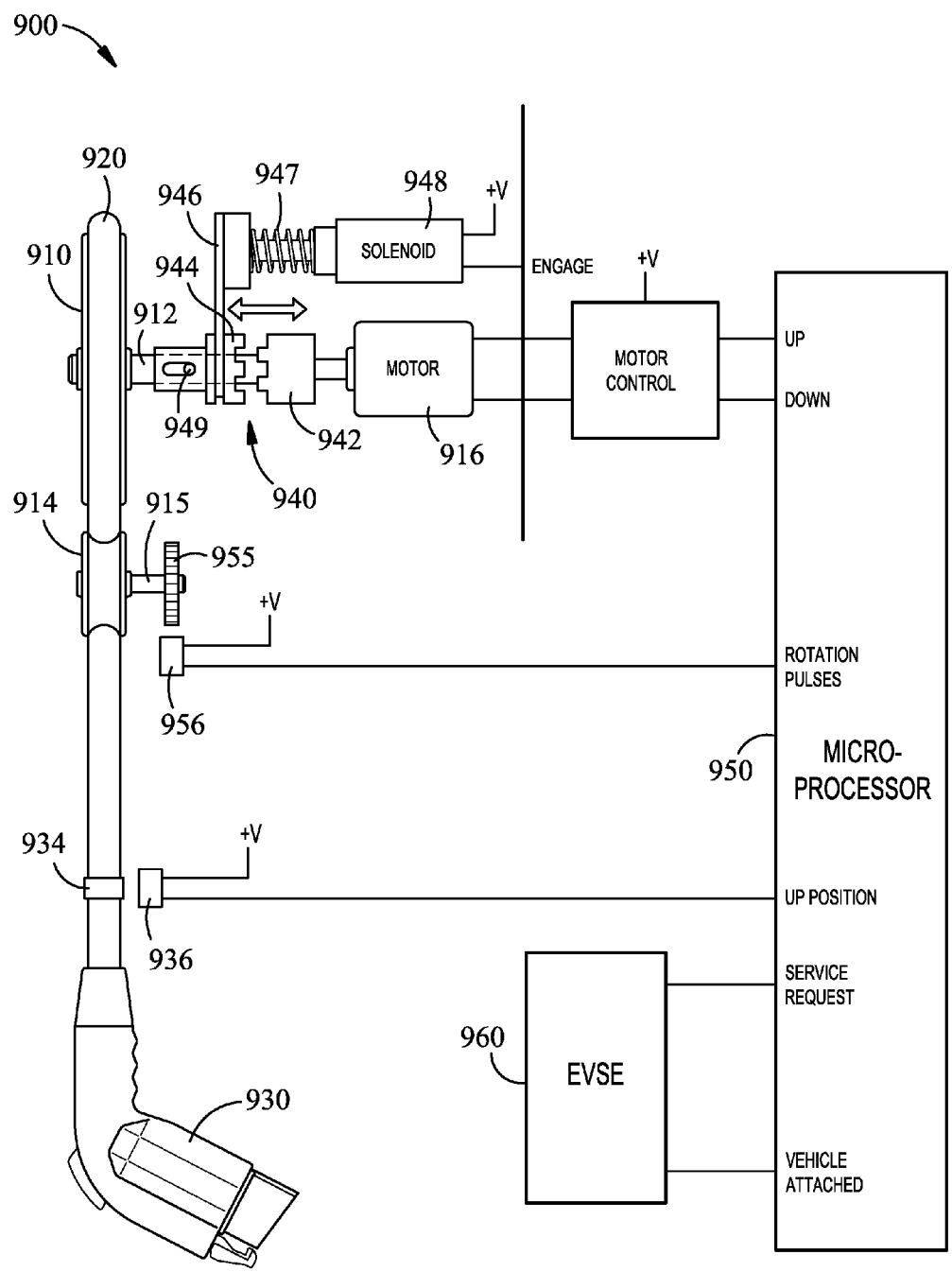
FIG. 37 is a frontal view, partly in schematic and portions removed, of the retractor mechanism and power cable of FIG. 35 and further schematically illustrating the control, operation and construction of the retractor mechanism.

With reference to FIGS. 35-37, a retractor comprising a cable drive mechanism for controllably extending, releasing and retracting an overhead power cable for various electric vehicle charging installations is generally designated by the numeral 900. The retractor 900 is housed within a housing 902. The power cable 920 passes through an opening 904 at the bottom of the housing 902. The J1772 connector 930 is preferably received within the housing or a shroud integrated with or extending from the housing 902 when the cable is fully retracted.

The retractor 900 employs a drive wheel 910 which engages along the cable 920 and is bi-directionally rotatable to extend and/or retract the power cable as required. In addition, the drive wheel is releasable to a quasi-free wheeling state. The drive wheel 910 is mounted to a shaft 912 which is driven by a selectively controlled motor 916. The motor 916 connects via a clutch 940 to selectively power the drive wheel 910.

The power cable 920 winds around the drive wheel and extends through a gap between the drive wheel 910 and a pressure/idler wheel 914. The positioning of the drive wheel 910 and the pressure wheel 914 functions to impart sufficient opposing pressure to the captured cable so that when the shaft 912 of the drive wheel is rotatably driven by the motor 916, the cable, in turn, can be retracted or extended in accordance with the directional drive of the motor.

The clutch assembly 940 employs a pair of clutch plates 942, 944 with toothed interfaces which selectively mesh to rotatably couple. The clutch plates 942, 944 are coaxial with the drive shaft 912. The position of the second clutch plate 944 is governed by a transfer arm 946 whose axial position is controlled by a solenoid 948. A disengagement spring biases 947 the transfer arm to a disengaged position of the clutch assembly. The disengaged clutch position typically allows quasi-free rotational movement of the drive wheel so that the power cable 920 may be easily extended by the vehicle operator for connection with the vehicle. A stop pin 949 axially travels in a slot to limit the axial position of the movable clutch plate 944.

The retractor 900 is automatically controlled by a microprocessor 950. The motor 916 is controlled by a motor control 952 which receives an up/down (retract/extend) input from the microprocessor 950. The microprocessor 950 also preferably incorporates a switch for setting a pre-set limit number of rotation pulses to thereby provide a limit of the cable extension and/or detect an improper operation in the drive mechanism of the power cable. The microprocessor 950 also provides an output signal for the solenoid 948.

Figure 37A:
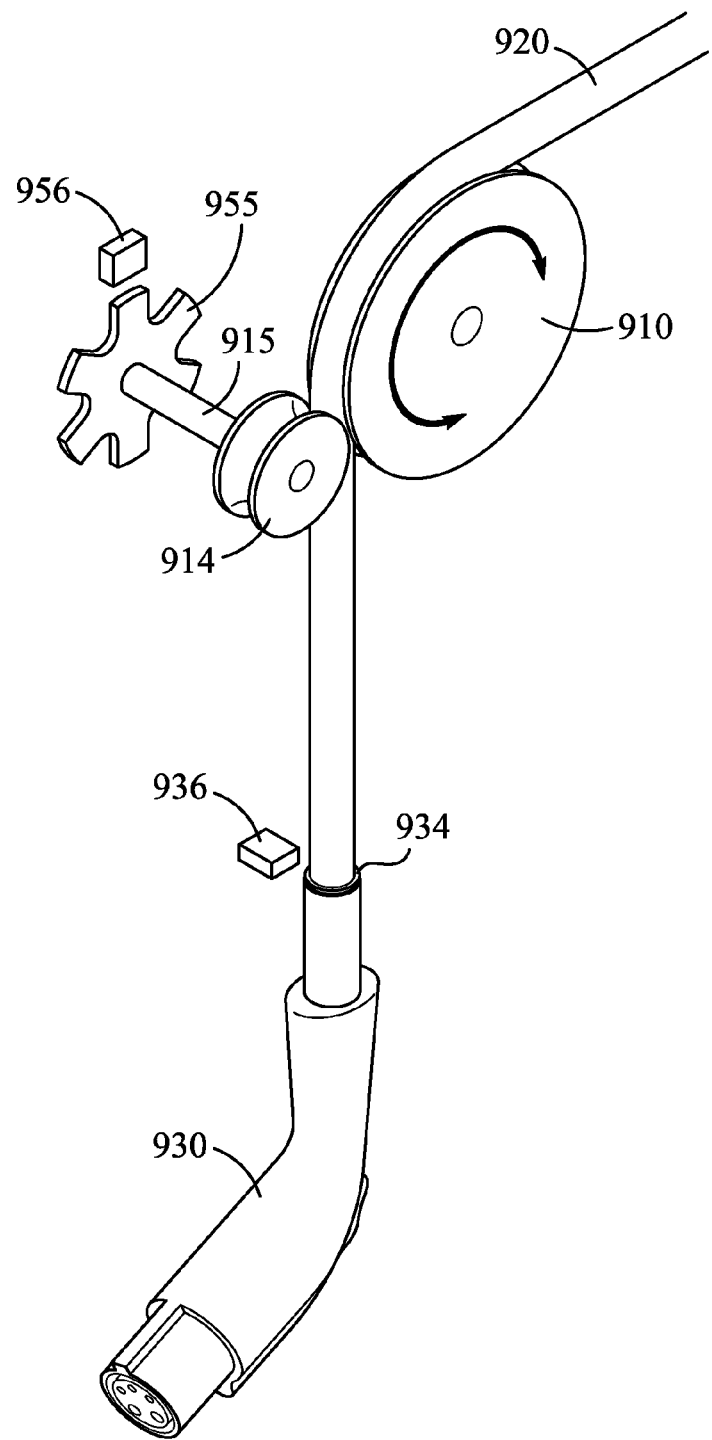
FIG. 37A is an enlarged perspective view, partly in schematic and portions removed for the retractor mechanism and power cable of FIG. 37.

With additional reference to FIG. 37A, the pressure wheel 912 rotatably fixedly connects via a shaft 915 with a magnetic gear 955. A magnetic sensor 956, such as a Hall transducer, senses the teeth as the gear rotates to provide a rotation generated pulse train input to the microprocessor 950.

In conventional fashion, the power cable includes a J1772 connector 930 with a proximity switch 932. A magnetic ring 934 proximate the connector is employed to electronically sense, via a magnetic sensor 936 (Hall transducer) mounted at the housing, the retracted position of the power cable 950. The microprocessor is also responsive to inputs from the EVSE 960 to electronically indicate that a service has been requested and the connector 930 has been attached to the vehicle.

When it is desired to power the drive wheel 910, for example, extend the cable 920 for usage, the solenoid 948 is energized to position the transfer arm (in the direction of the arrows) so that the clutch plates 942, 944 engage as illustrated in FIG. 36B. The motor 916 preferably drives the drive wheel shaft via a belt drive 915 which connects via the clutch 940 to the drive wheel 910. When it is desired to further extend the cable to connect the connector with the vehicle, the clutch 940 is disengaged, such as illustrated in FIG. 36A, to allow the drive wheel 910 to quasi-freely rotate.

Figure 39A:
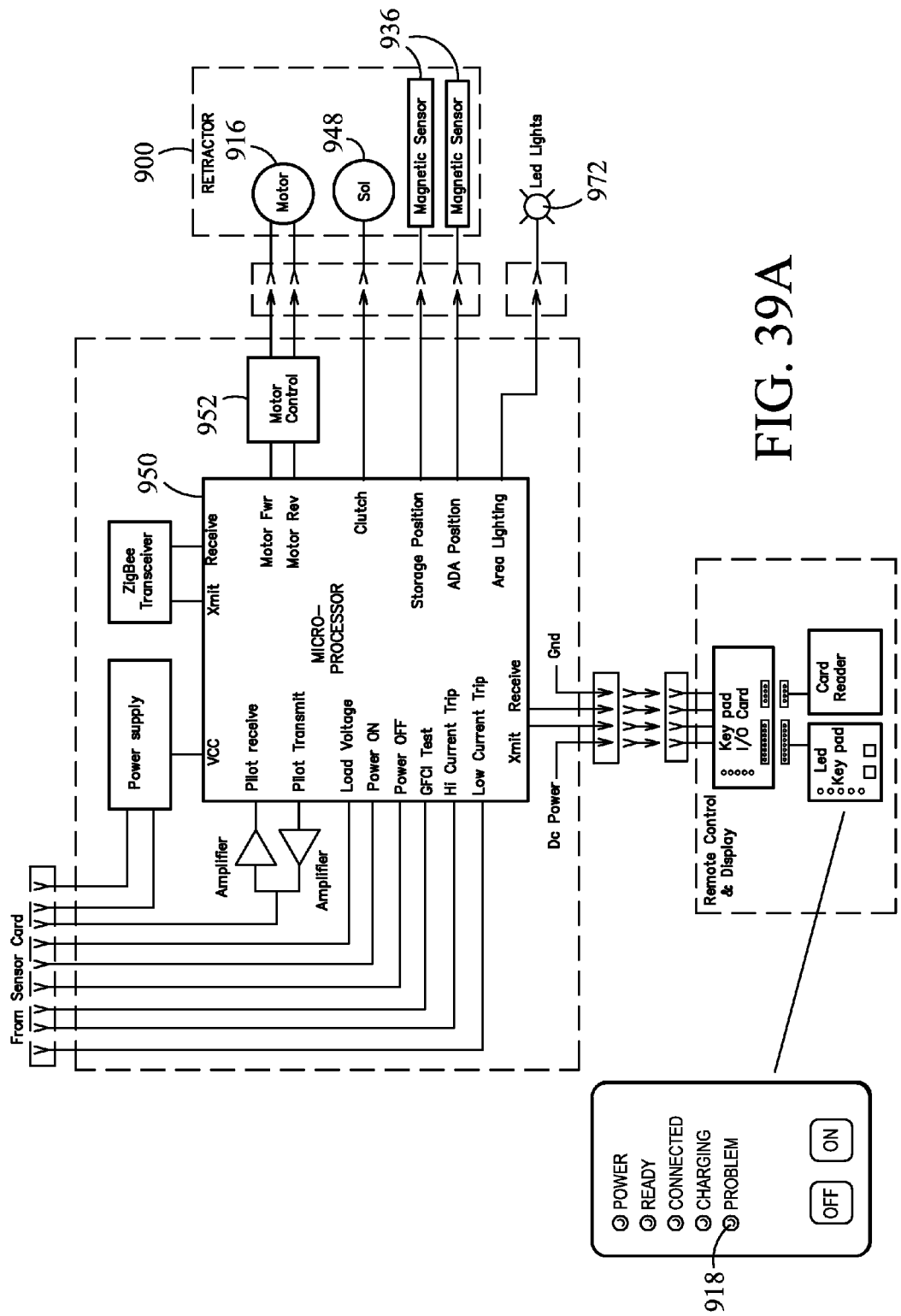
FIG. 39A is an enlarged, more detailed schematic diagram for the control module, retractor and remote control and display for the block diagram of FIG. 38.

The magnetic gear 955, which rotates with the sliding movement of the cable 920, generates pulses to electronically monitor the extension as well as the retraction. If the pulses exceed the pre-established number of pulses within a pre-established time interval, then an inoperative state is indicated at LED 918 (FIG. 39A). The inoperative state can be determined by either an excessive extension of the cable or a failure of the described drive mechanism to properly engage the cable for retraction purposes. The number of rotation pulses is also correlated with a time interval defined by a timer.

Figure 38:
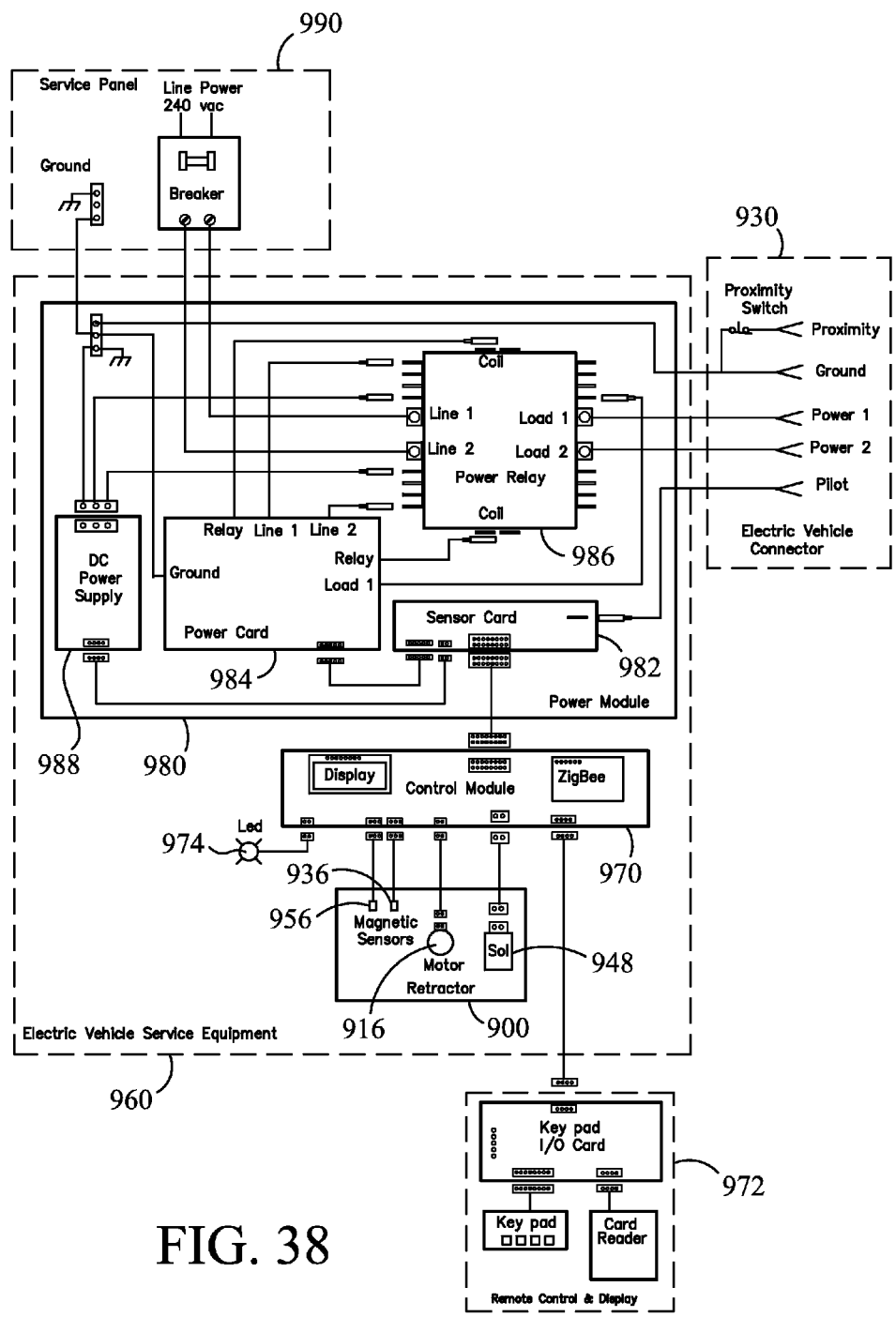
FIG. 38 is a system block diagram for the retractor mechanism of FIG. 35 as integrated into an electric vehicle charging installation.
Figure 39B:
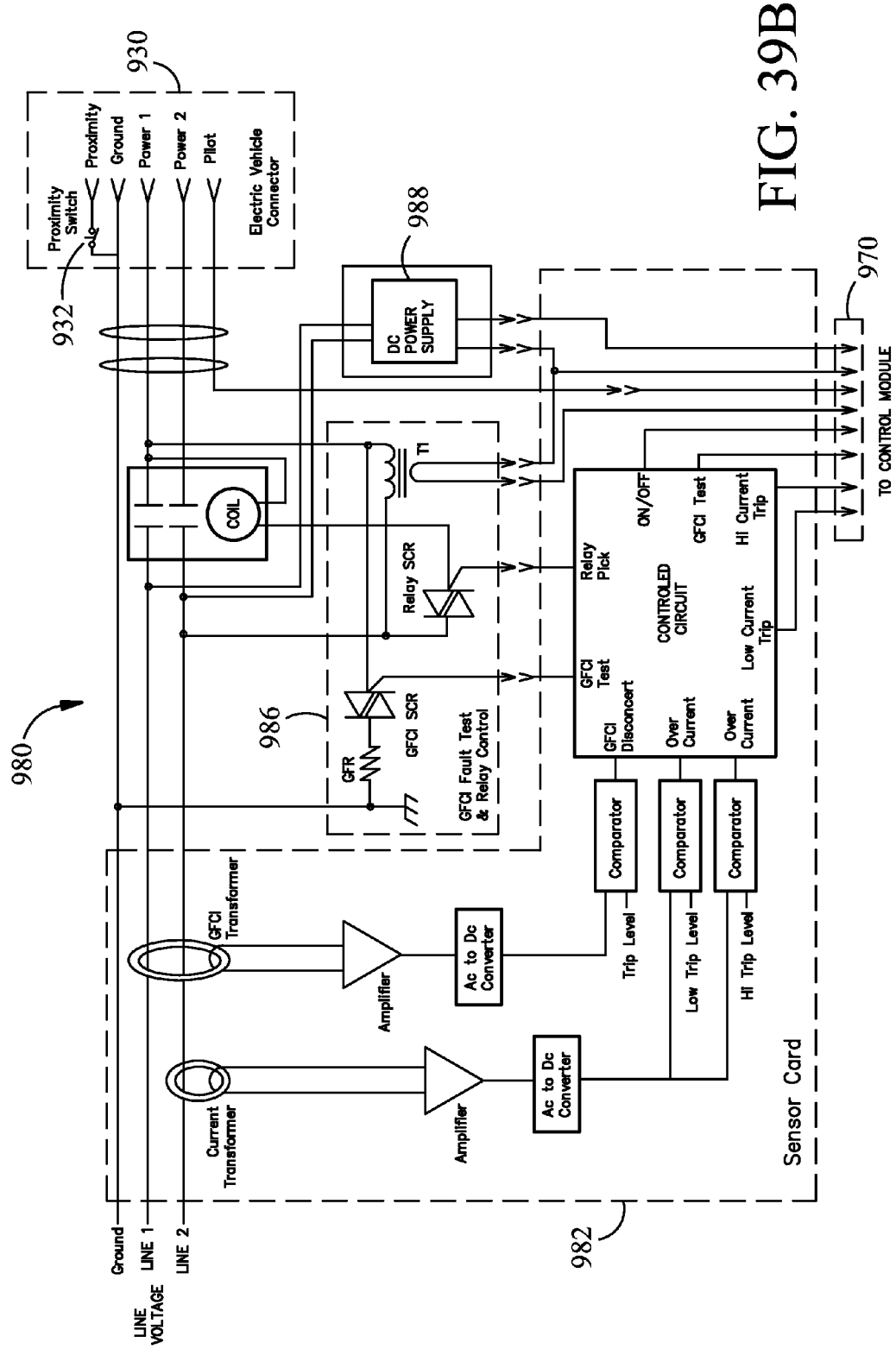
FIG. 39B is an enlarged, more detailed block diagram of the power module for the block diagram of FIG. 38.

With reference to FIGS. 38, 39A and 39B, a system block diagram illustrates how the retractor 900 can be incorporated or integrated with the EVSE system 960. The magnetic sensors 936, 956 provide inputs to a control module 970. The control module 970 receives inputs from the remote control and display 972. The control module 970 also interfaces to control the motor 916 and the solenoid 948. One or more LEDs 972 are also employed to provide general illumination.

The control module 970 interfaces with the power module 980 as best illustrated in FIG. 39B. The power module 980 generally includes a sensor card 982, a power card 984 and a power relay 986 for implementing a ground circuit control and a relay control. The power module connects with the line power service panel 990. The power module 980 includes a 24 Volt DC power supply 988 for the sensor card and the power relay 986.

The operation of the retractor mechanism can best be appreciated by the functional block diagram of FIG. 40A-40D which further describes the sequential operational sequences of the motor and the clutch, as well as how improper operation can be detected and reported. The EVSE sends a service request to activate the motor to power the cable to an accessible position vertically displaced above the facility floor. The clutch 940 is engaged and a down timer starts. The rotation pulses generated by the magnetic gear coupled to the idler/pressure wheel 914 are counted. If the rotation pulses equal the preset end count, then the motor 916 is stopped and the clutch is disengaged. A start vehicle attach timer is started. The connector is attached to the vehicle. The connector 930 is attached to the vehicle.

Figure 40A:
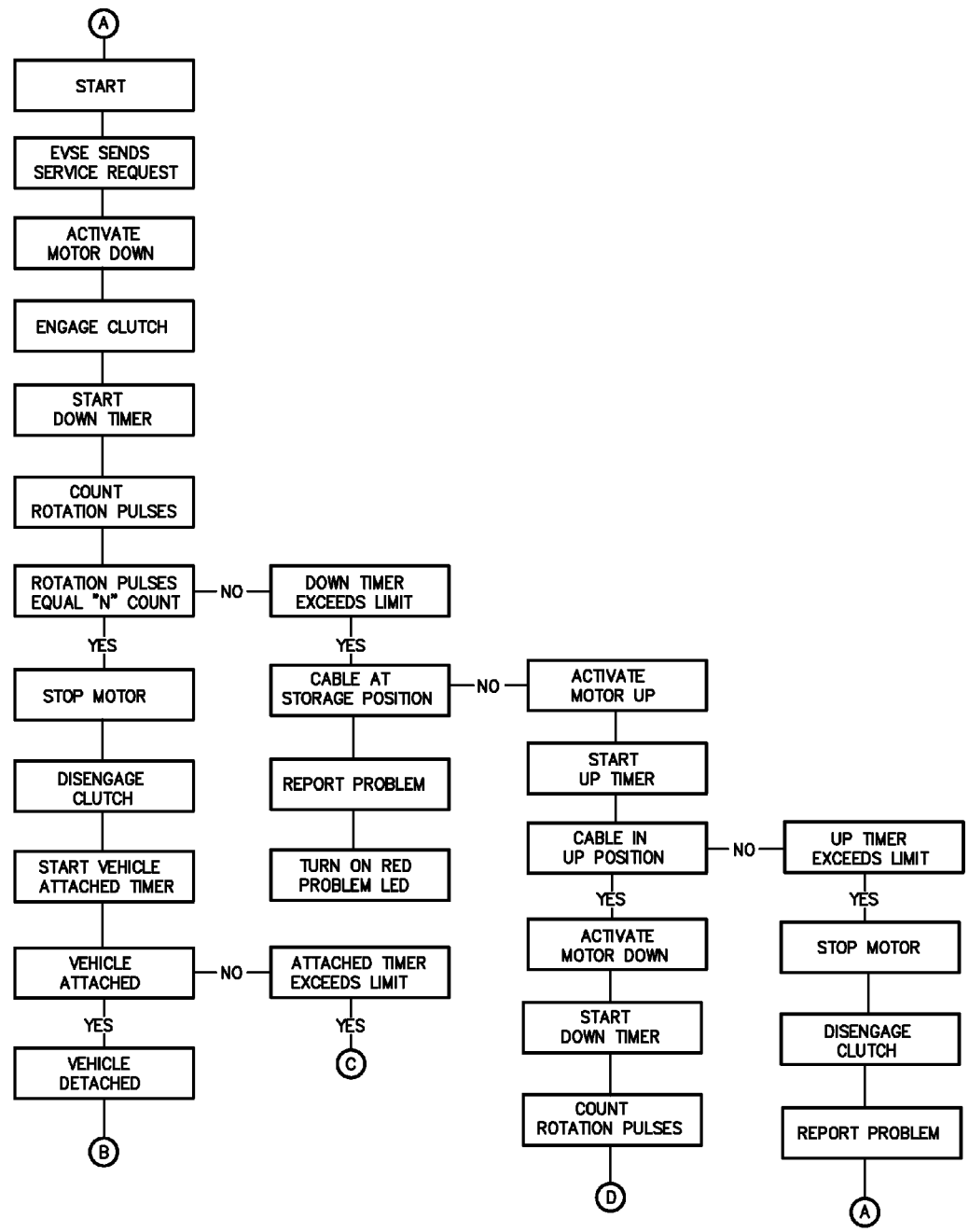
FIGS. 40A-40D together constitute a functional block diagram for the retractor mechanism of FIG. 35 as integrated with an associated EVSE system.
Figure 40B:
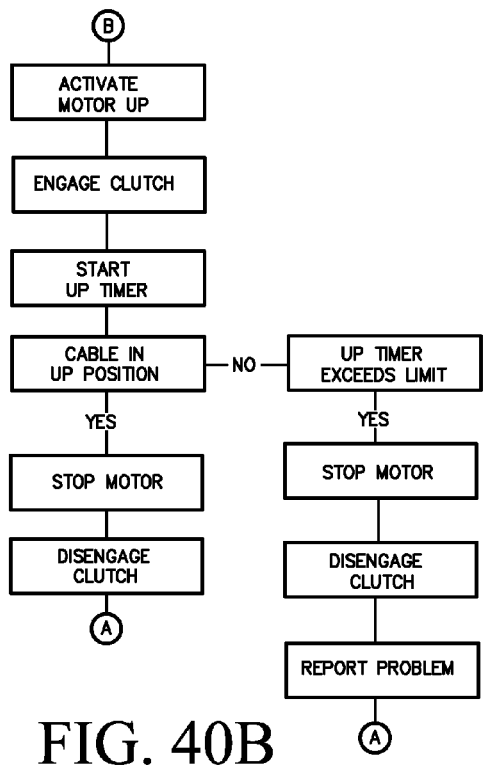
Figure 40C:
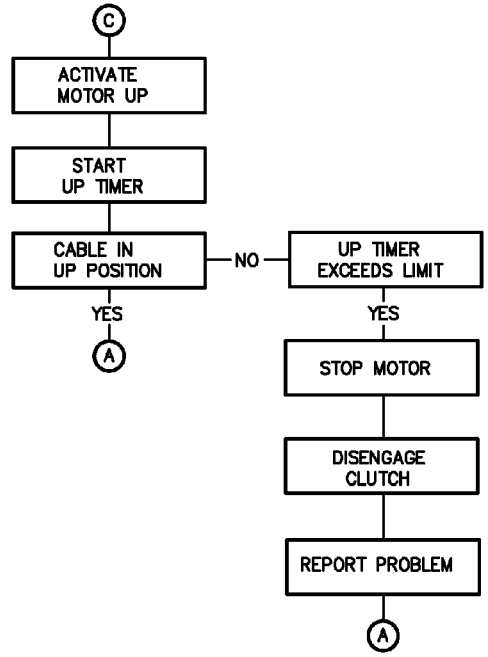
Figure 40D:
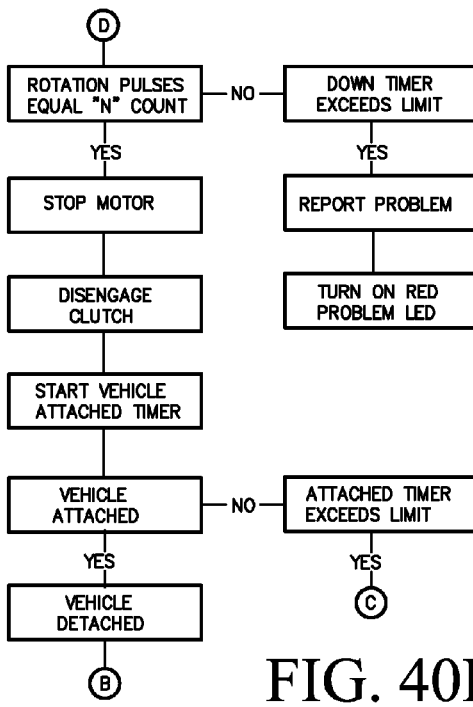

If the rotation pulses do not equal the end count and the down timer exceeds the preset limit and the cable is at a storage position as sensed by the Hall sensor, the problem is reported and the red LED trouble light 918 is activated. If the attached timer exceeds a limit, then the motor 916 is activated to drive the cable upward. A start-up timer is activated if the cable is in position and in its initial configuration A as indicated in FIG. 40A.

If the cable is not in the retracted position as sensed by the Hall sensor and the upper timer exceeds a limit, then the motor is stopped, the clutch is disengaged and a problem is indicated via LED 918 and reported.

In the event that the vehicle is detached, the motor is activated to drive the wheel so that the cable is retracted by engaging the clutch. The up timer is started when the cable retracted position is sensed by the magnetic sensor 936, the motor 916 is stopped and the clutch 940 is disengaged. Until the cable is sensed in the up position and the up timer exceeds a pre-established time, the clutch is disengaged and an operational problem is reported.

With reference to FIGS. 41 and 41A, the retractor mechanism 900 may be incorporated into a charging installation 1000 which employs a post-type mount construction. A central tubular post 1010 and a tubular member 1012 are disposed in vertical side-by-side relationship and anchored in a concrete base 1020 which extends at least partially below the level of the grade. The second tubular member 1012 extends in parallel relationship to the central support post and has a slightly greater width to accommodate and the proximal portion of the variably positionable power cable 920. The opposite side of the support post includes a tubular sleeve 1030 having a dimension substantially similar to that of member 1012 except that it extends downwardly from the upper portion and terminates at an intermediate location such as, for example, at approximately 4 feet, 6 inches. The lower portion of the sleeve is open and flares outwardly to form a receptacle 1032 for the connector 930 so that when the connector is in a fully retracted position, it is fully housed within the receptacle 1032, as illustrated in FIG. 41. A roller 1040 may be mounted at the interior of the receptacle to facilitate the extension of and protect the cable from abrasion when extending the cable to connect the connector 930 to the electric vehicle.

The upper portion of the retractor mechanism 900 is housed within a cap-like enclosure 1050 which has a bottom panel that seals with the sleeve 1030, 1010, post and member 1012 to protect the housed retractor 900 from the elements. Illumination lights 1052 are preferably disposed at the bottom of the enclosure to provide illumination for the installation.

As further illustrated in FIGS. 42A-42C, the retractor mechanism 900 can be employed in a wide variety of overhead cable installations. In FIG. 42A for an overhead cable installation such as one suspended from the ceiling of a garage, the end of the cable connects via a trolley 992 with a spring return mechanism 994. In the installation illustrated in FIG. 42, for a stanchion as previously described, a roller/counterweight assembly 996 may be employed. FIG. 42C illustrates a vertically supported overhead connector, the position of which is controlled by the retractor 900 and which employs a counterbalancing weight trolley 998 on the end of the cable.

With reference to FIGS. 43 to 49E, a cable management system 1100 may be incorporated into an overhead charging installation 1200. The charging installation 1200 employs an overhead housing 1210 which is generally mounted via brackets 1211 or other means to the underside of a ceiling, roof or other overhead structure. The housing 1210 is preferably an elongated rugged structure which has, at a forward end, a rectangular capsule 1212, which may have a sleek, quasi-trapezoidal shape (FIGS. 43-44) or a rectangular shape (FIGS. 45A-48), extends downwardly and includes an opening 1214 for the power cable 1120. The power cable 1120 preferably terminates at a J1772 connector 1130.

Figure 43:
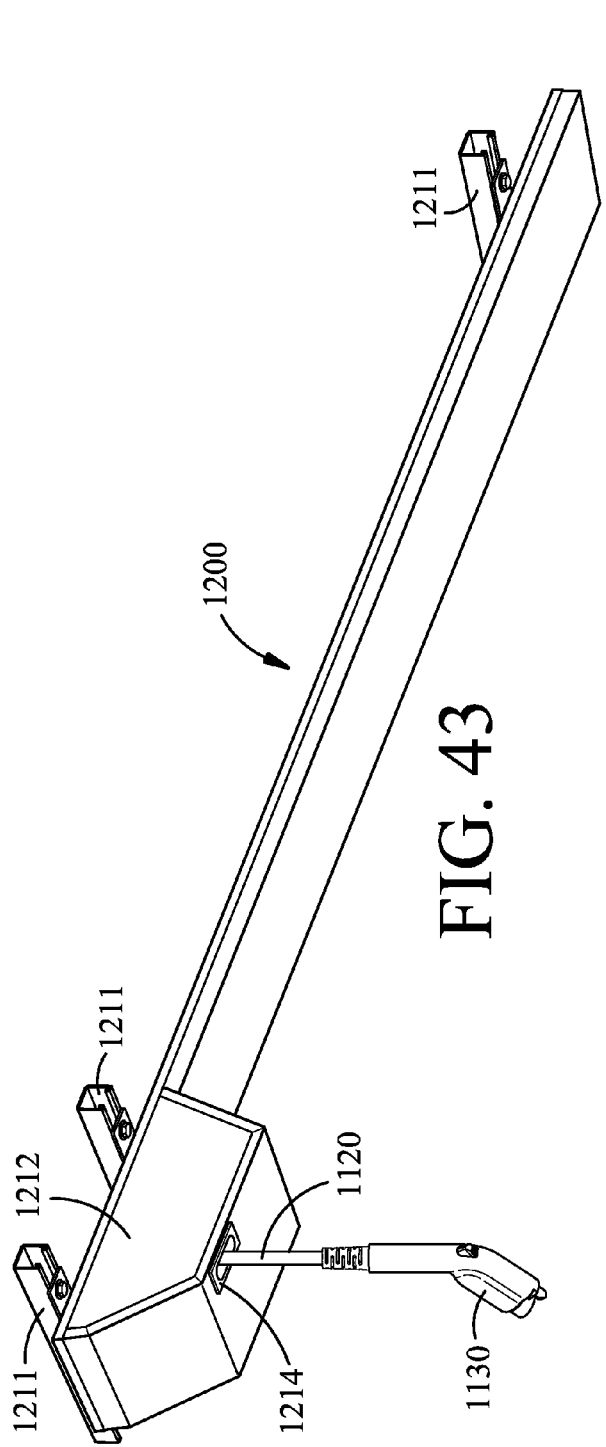
FIG. 43 is a perspective view of a ceiling mount installation incorporating a cable management system.
Figure 44:
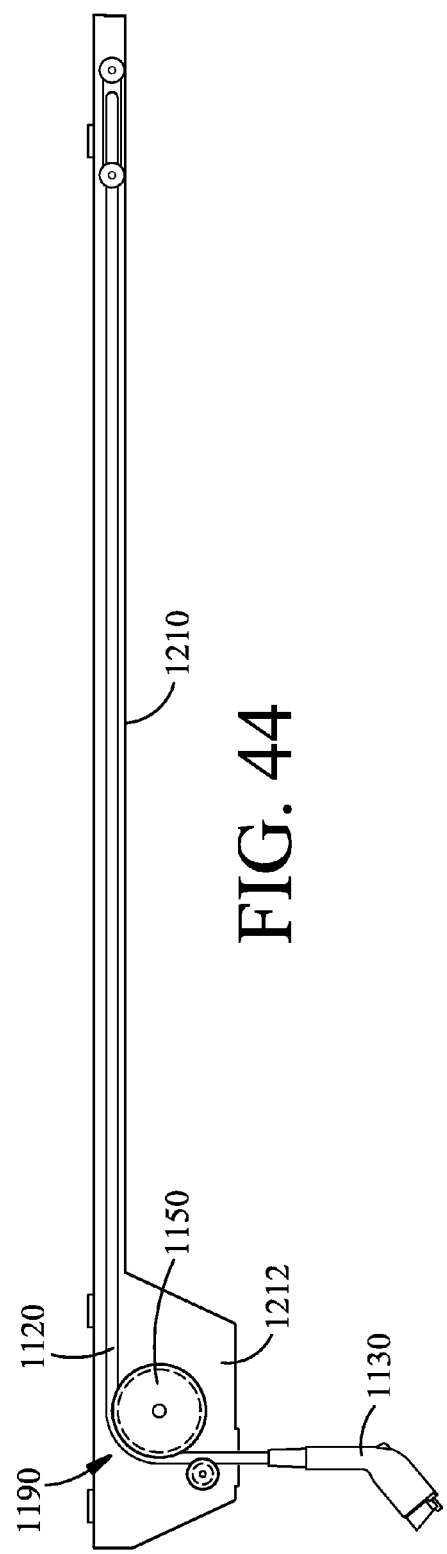
FIG. 44 is a side elevational view of the installation of FIG. 43, portions removed to show additional detail.

The extension and retraction and charging operation of the cable 1120 is controlled by the cable management system 1100. The cable management system 1100 functions to extend the cable 1120 to an intermediate, ready-for-use height when activated. The cable is then released and the vehicle operator can manually extend the cable as required for connecting with the charging terminal of the vehicle. Upon termination of usage and release from the vehicle, the cable is then retracted by the cable management system 1100 to an upper overhead location adjacent the bottom end of the capsule (retracted position), as illustrated in FIGS. 43 and 44. Alternatively, the connector 1130 may be enclosed in a shroud (not illustrated) at the retracted position.

The power cable 1120 wraps around a drive pulley 1150 at the interior of the housing capsule 1212 and extends longitudinally in a loop form wherein the cable wraps around an idler pulley 1160 and is connected with the power center. The idler pulley 1160 rotates about a vertical axis. The idler pulley 1160 rides on a trolley platform 1170. The trolley platform 1170 has a pair of forward and rear wheels or rollers 1172 which travel along a track 1174 at the upper surface of the underside panel of the housing.

The trolley 1170 position (and hence the idler pulley 1160 position) is governed by a timing belt 1180 which is suspended between a frontal drive wheel 1182 and a rear idler wheel 1184 (FIGS. 45B, 46B) suspended from the end of the housing. A timing belt drive shaft 1186, which mounts the timing belt drive wheel, extends between opposed sides of the housing capsule. The timing belt 1180 may be secured to the trolley platform by one or more cross-brackets 1176 (FIG. 45B).

Figure 47:
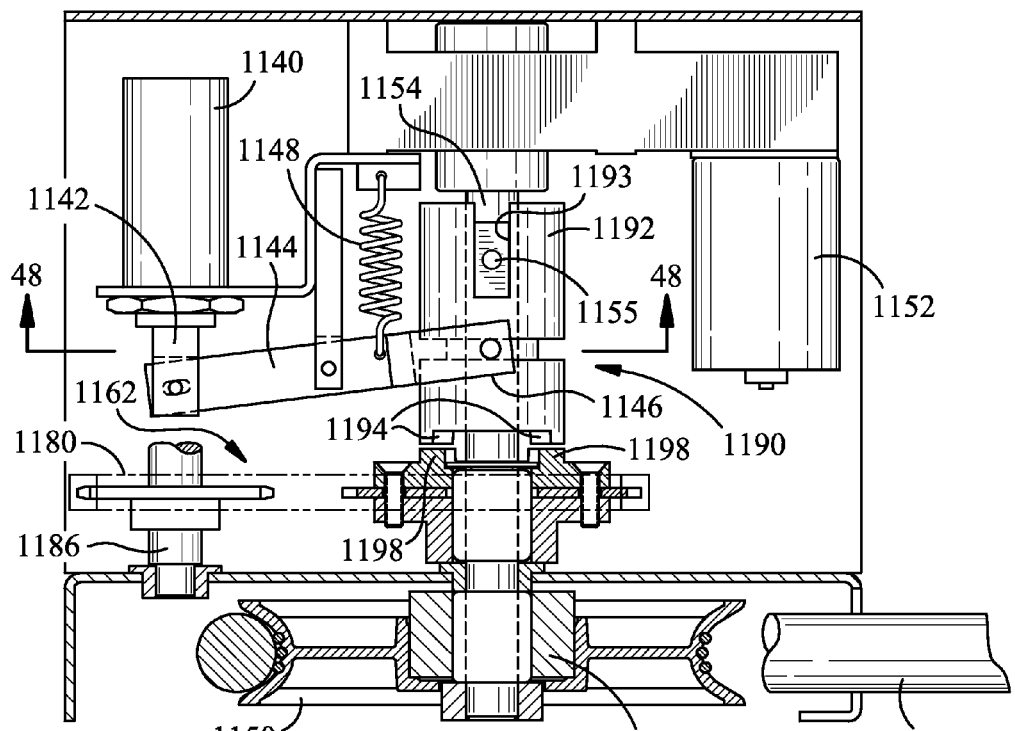
FIG. 47 is an enlarged top interior view, portions in phantom, of the installation of FIG. 43.
Figure 48:
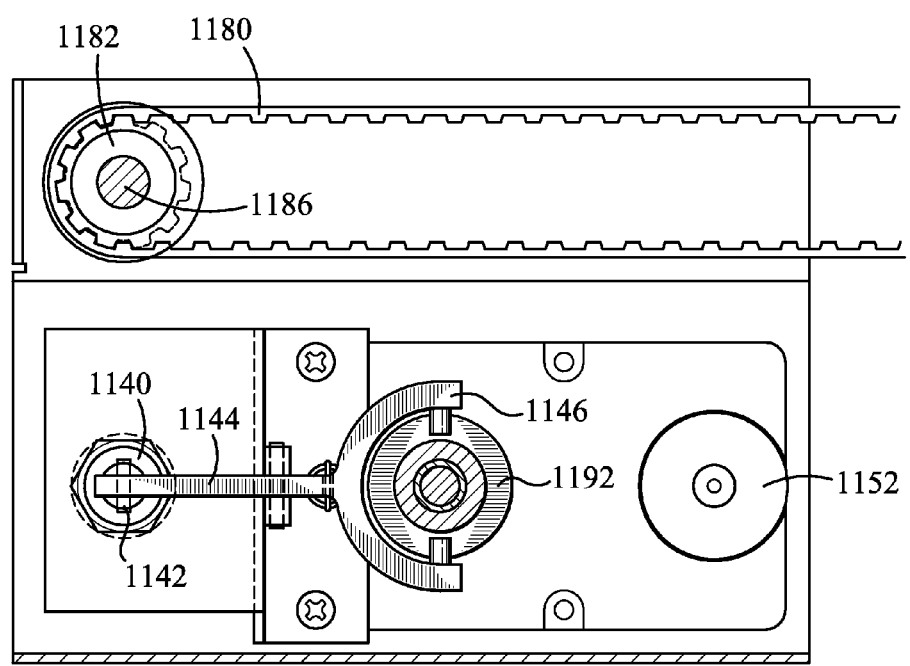
FIG. 48 is a side view, partly in section and portions in phantom, of the installation of FIG. 47 taken along the lines 48-48 thereof.

With reference to FIGS. 47-48, a bi-directional gear motor 1152 drives a shaft 1154 which rotatably drives the drive pulley 1150 via a clutch assembly 1190 and a clutch bearing 1156. The clutch assembly includes an axially displaceable clutch member 1192 mounted to the drive shaft 1154. The clutch member includes an axial slot 1193 which receives a radial pin 1155 projecting from the drive shaft so that the clutch member rotates with the drive shaft. The end of the slot constitutes a stop which defines the axial limit of the clutch release. The clutch member 1192 defines an annular recess 1195 at an intermediate axial location.

The end of the clutch member 1192 includes a plurality of angularly spaced, axially extending teeth 1194. The clutch member axially aligns with a clutch receiver 1196 mounted to the drive shaft 1154 for the drive pulley 1150. The receiver 1196 is rotatably engaged with the drive pulley 1150 via a clutch bearing 1156.

With reference to FIG. 47, the clutch receiver 1196 has axially projecting teeth 1198. When the clutch member 1192 and the clutch receiver 1196 are disengaged, a gap is axially formed between the components. When the clutch head and the clutch receivers axially mesh upon the axial displacement of the clutch member, the teeth of the member 1192 and the receiver 1196 angularly engage and, upon rotation of the drive shaft, rotatably drive the drive pulley 1150.

Figure 49A:
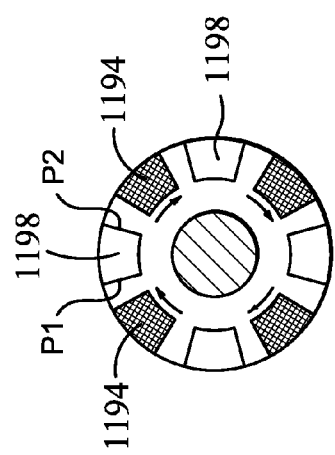
FIGS. 49A-49E are a sequence of sectional views, partly in diagram form, illustrating the clutch mechanism employed in the installation of FIG. 43.
Figure 49B:
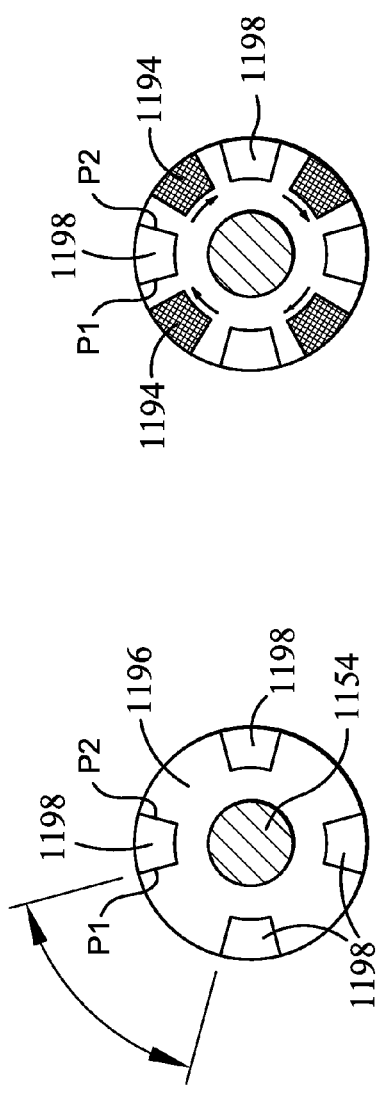
Figure 49C:
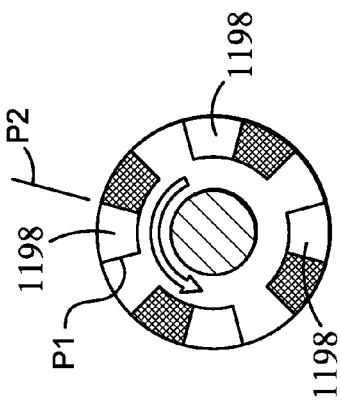

With reference to FIGS. 47A-47E, the engagement ends of the clutch members 1192 and 1196, including the respective teeth 1194 and 1198, are congruent and the teeth are equi-angularly spaced and have the same dimensions, the teeth 1198 having engagement plates P1, P2. It should be appreciated that there is a pre-established angular spacing which forms angular recesses between the teeth 1194 and 1198. When the teeth are initially engaged, as represented in FIG. 49C, in the corresponding recesses between the teeth, upon rotation, the teeth 1194 angularly engage plate P1 of the corresponding teeth 1198 and cooperatively produce a rotation of the drive pulley.

Figure 49D:
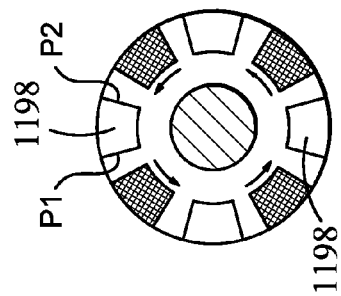
Figure 49E:
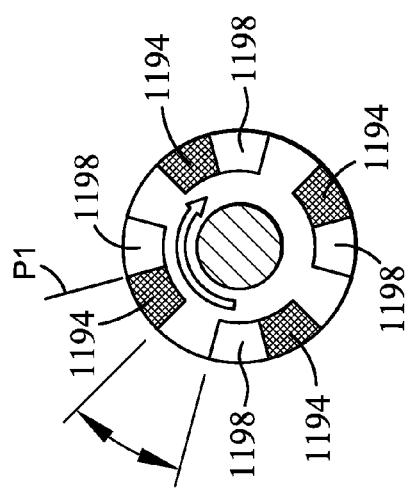

When the motor is reversed, the teeth-to-teeth contact is at least momentarily angularly disengaged. There is, however, an angular play which allows a pre-established time between reengagement and rotation of the shaft in the reversed shaft rotation position, as best represented by FIG. 49D. When the clutch is engaged and teeth 1194 engage plate P2 of teeth 1198, the drive pulley is forced to rotate provided the shaft is being rotated. The clutch bearing 1156 allows the drive pulley to fully rotate when the shaft is not driven.

A sprocket wheel arrangement 1162 (FIG. 47) connects the clutch receiver 1196 to the drive wheel 1186 for the timing belt 1180. Accordingly, when the clutch is engaged and the drive shaft is driven, the timing belt 1180 is also correspondingly driven. The ratio of the sprocket wheel and pulley drive dimensions is selected to provide the proper coordinated movement of the power cable and the trolley.

The position of the clutch assembly 1190, namely engaged or disengaged, is mechanically implemented by a solenoid 1140 which is governed by the controller 1210. The solenoid arm 1142 pivotally connects with a lever 1144. The lever 1144 has a yoke 1146 which engages with annular recess 1195 of the drive clutch member 1192. The lever 1144 is biased by a spring 1148 to the disengaged position.

The solenoid 1140 and the drive motor 1152 are both controlled by a controller 1220 (schematically shown in FIG. 57) which is also housed within the capsule 1212. The controller 1220 receives input from a terminal adjacent the overhead installation or a terminal remote from the adjacent area. The terminals may be located at a kiosk and assume various forms and functions, such as previously described.

When the vehicle operator desires to charge his vehicle, it is parked in a spot generally below the overhead housing 1210. The operator may then enter a card or key number or other input to start the operation of the overhead management system and to record various details concerning payments for use of the electricity. The operator input is transmitted to the controller 1220. The controller, inter alia, processes the input data, and generates the appropriate signals for the operation of the solenoid 1140. The solenoid activates the clutch member 1192 to axially engage the clutch receiver 1196. The controller also generates an output signal to activate the motor 1152. The pulley 1150 powered by the drive shaft then drives the power cable to an intermediate use position (approximately 4 feet above the floor). The drive pulley is then released from drive engagement, and the vehicle operator can then easily pull the cable 1120 to the desired position for connecting to the vehicle charging terminal.

When the charge is completed and the connector 1130 is disengaged from the vehicle, the clutch is then reengaged and the motor is driven in a reverse mode so that the cable is retracted to the upper non-usage position 1120, such as illustrated in FIG. 43. The trolley 1170 which carries the idler pulley 160 is also accordingly correspondingly moved along the track by means of the timing belt 1180 so that as the retraction occurs, the cable generally remains configured in a non-slack or quasi-taut condition. As the cable is retracted by the drive pulley, the trolley moves toward the rear of the housing.

Figure 57:
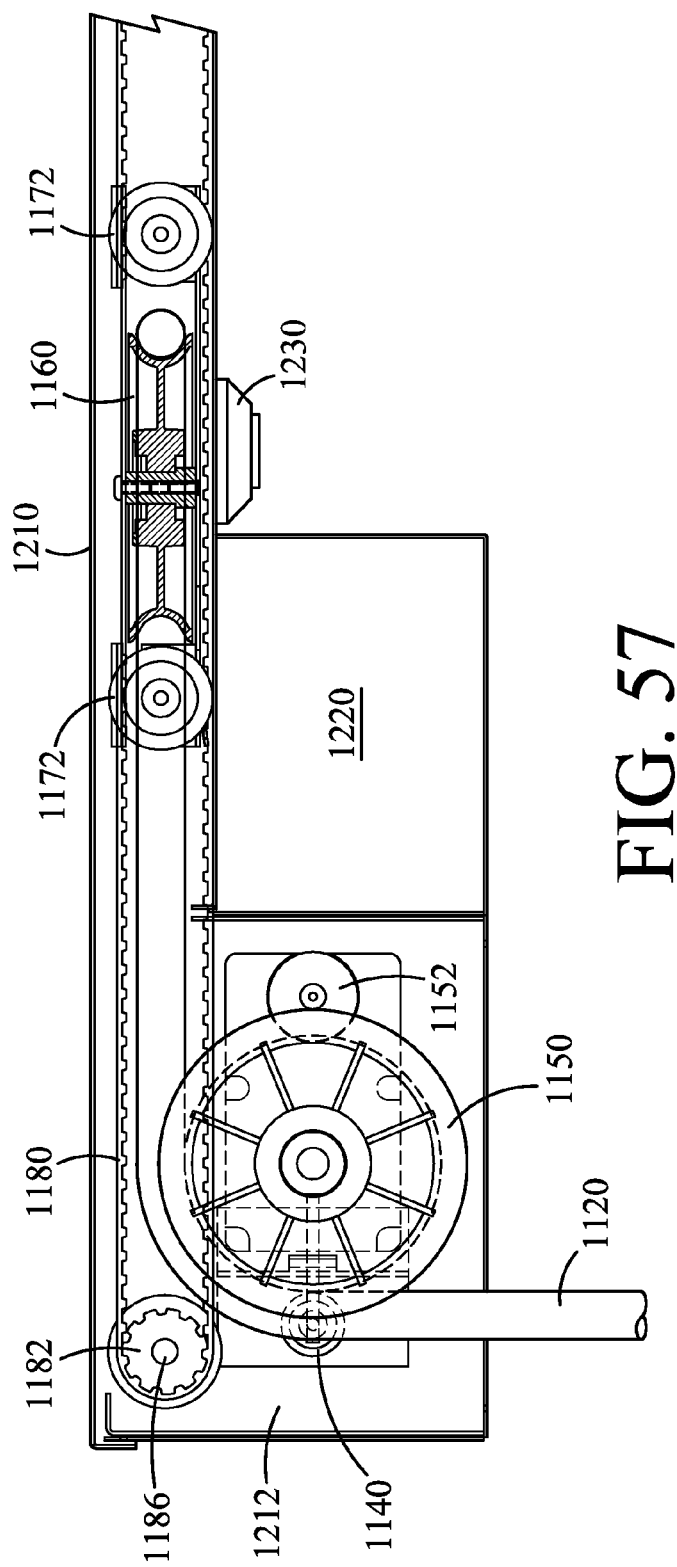
FIG. 57 is an enlarged side view, portions in phantom, portions in schematic and portions removed, illustrating an alternate overhead installation incorporating a smoke detector.

With reference to FIG. 57 in one embodiment, a smoke detector 1230 is mounted at the underside of the housing. In the event that smoke is detected, the controller 1220 immediately terminates the supply of electricity to the connector and generates an appropriate warning for remote monitoring. One suitable detector is a Fenwal® Model PSD-7157 or Model PSD-7157D photoelectric smoke detector of Kidde-Fenwal, Inc., of Ashland, Mass.

Figure 50:
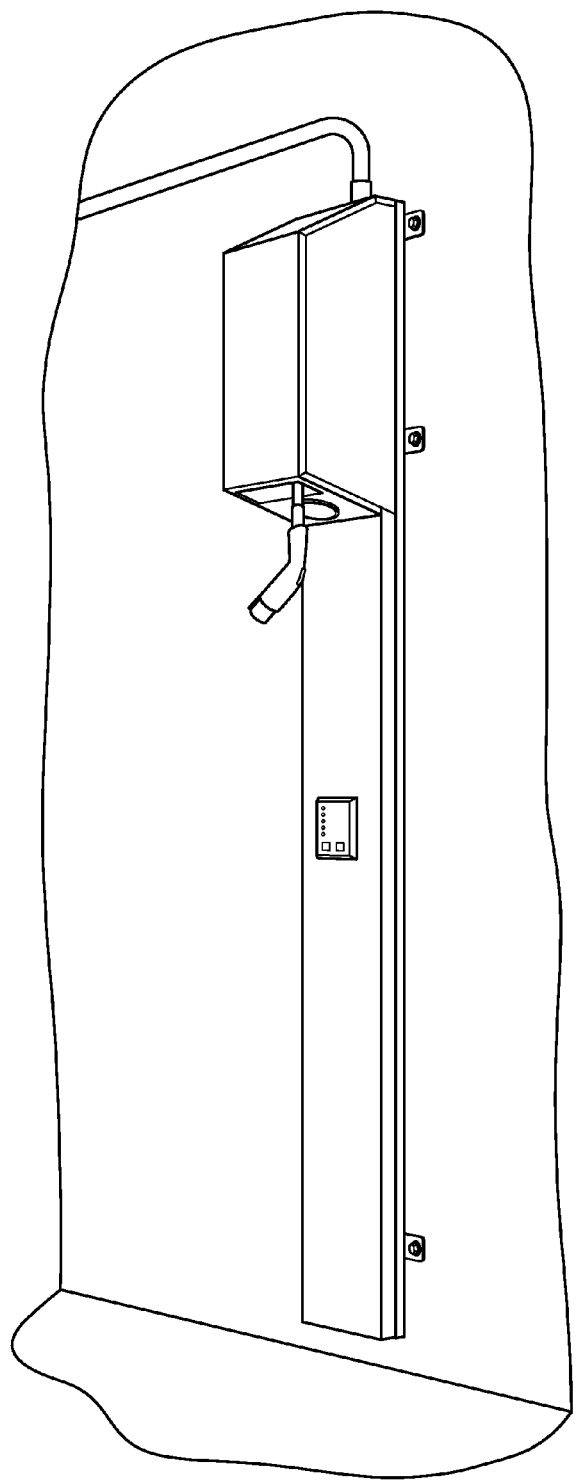
FIG. 50 is a side elevational view of a wall mount installation incorporating the cable management system.
Figure 51:
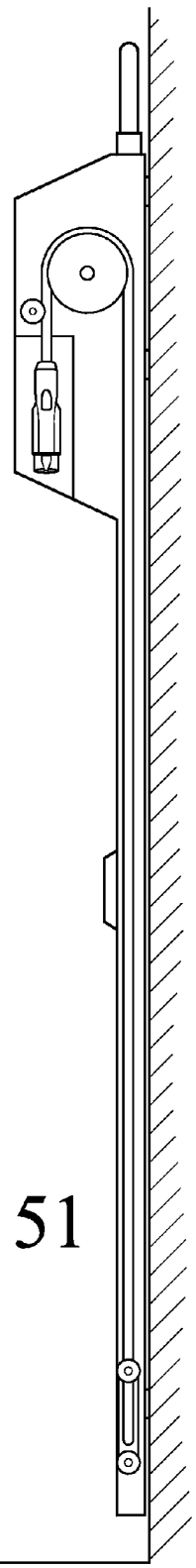
FIG. 51 is a side elevational view, portions removed, of the wall mount installation of FIG. 50.
Figures 52, 53:
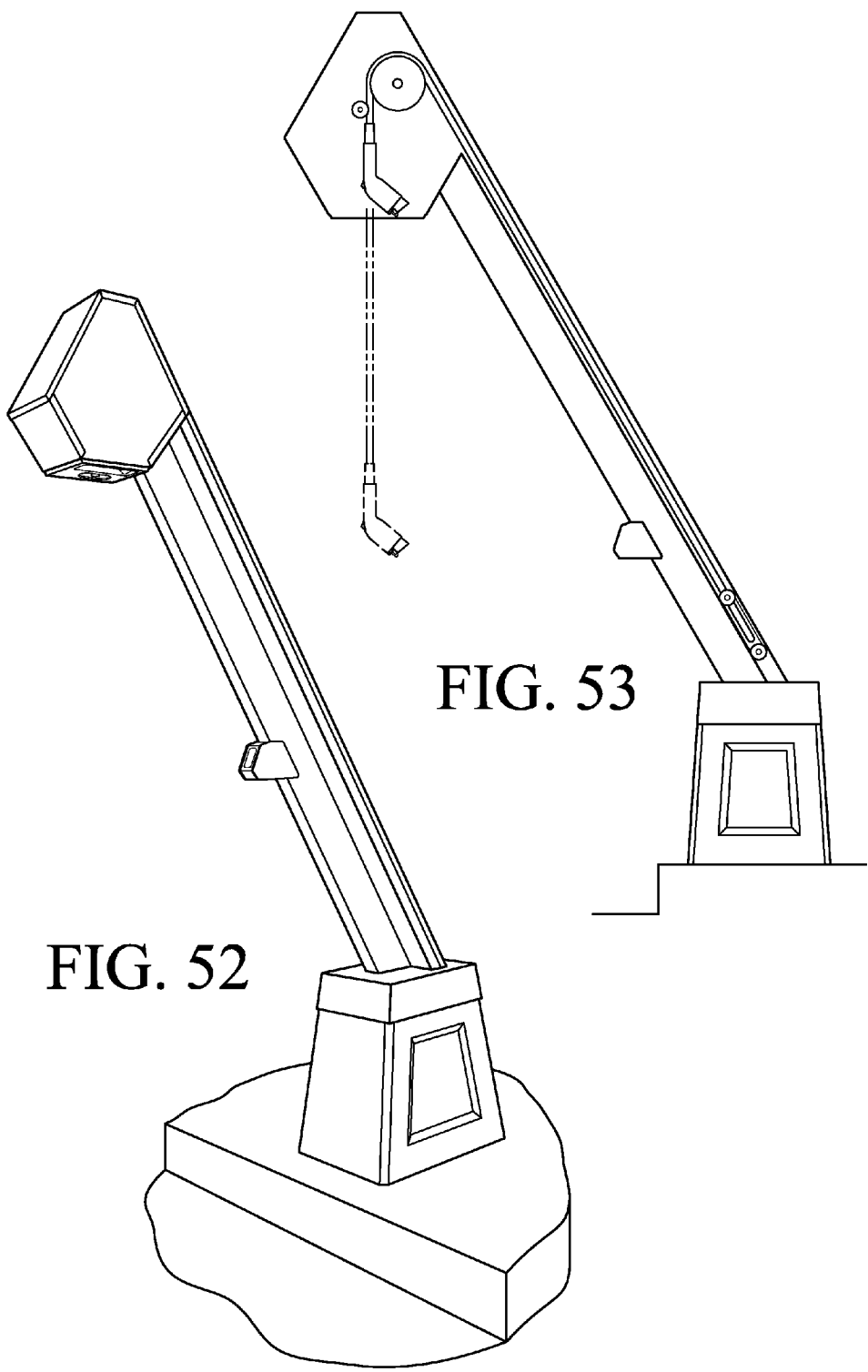
FIG. 52 is a perspective view of a parking lot installation incorporating a cable management system.
FIG. 53 is a side elevational view, portions in phantom and portions removed, of the installation of FIG. 52.
Figure 56:
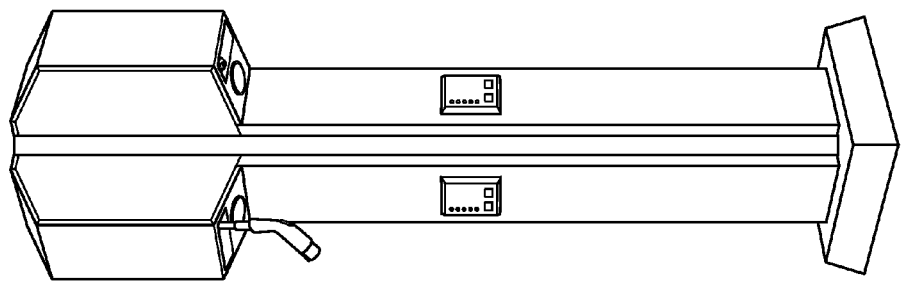
FIG. 56 is a perspective view illustrating a quad pedestal installation incorporating the cable management system.
Figure 55:
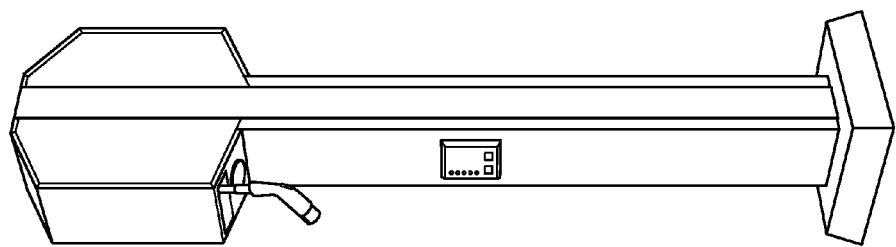
FIG. 55 is a perspective view illustrating a double pedestal installation for the cable management system.
Figure 54:
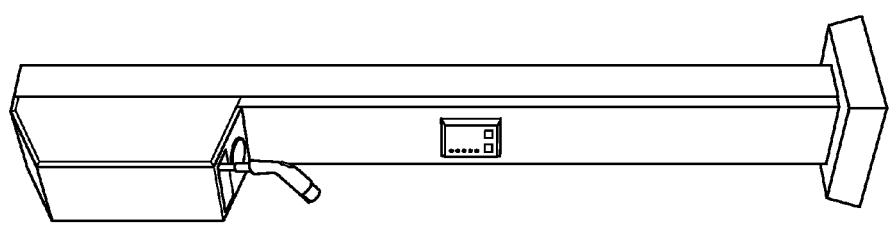
FIG. 54 is a perspective view illustrating a single pedestal configuration for installation for the cable management system.

It should also be appreciated that the foregoing cable management system may be incorporated into a vertical wall mount installation, such as illustrated in FIGS. 50-51, a stanchion-type installation such as illustrated in FIGS. 52 and 53, and a vertical post-type installation such as illustrated in FIGS. 54-56.

With reference to FIGS. 73-89C, another embodiment of a cable management system is designated by the numeral 2100. Cable management system 2100 is disposed in overhead housing 1210 which includes an opening 1214 for the power cable 1120 terminating at a J1772 connector 1130.

Cable management system 2100 employs a drive/clutch assembly 2200 which selectively drives the drive wheel 2160 for the timing belt 2180 and the drive pulley 2150 for the cable 1120. A bi-directional gear-driven motor 2152, which is responsive to the controller 1220, rotatably drives a drive shaft 2154. The outer end of the drive shaft mounts the drive pulley 2150 for the cable. The drive shaft 2154 also mounts at an intermediate axial location a clutch assembly for the timing belt 2180.

Figure 81:
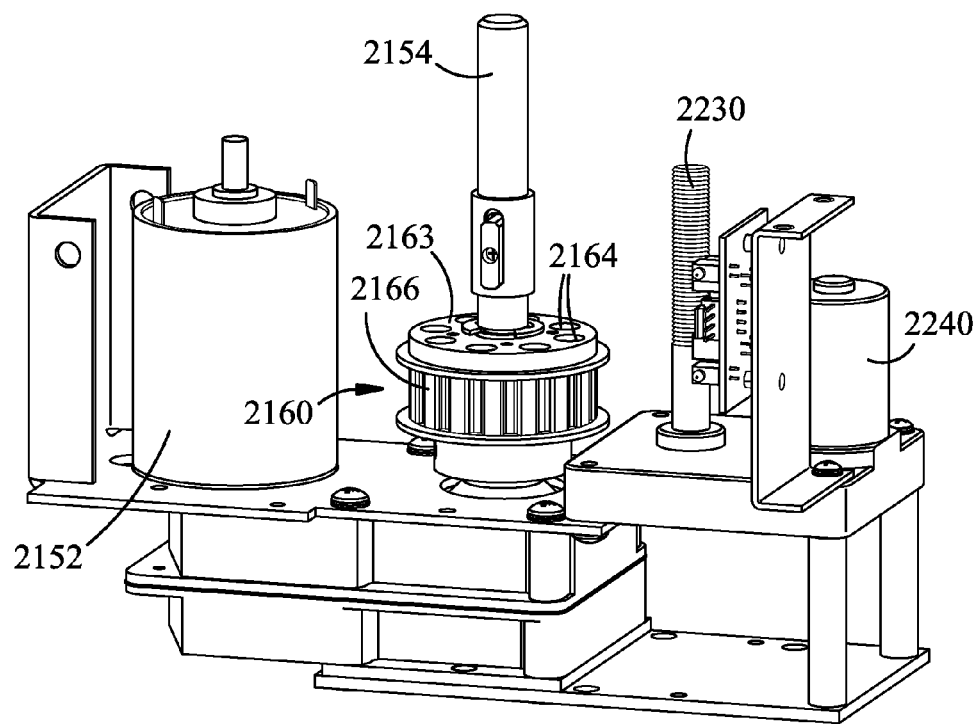
FIG. 81 is an assembled perspective view of a portion of the drive/clutch sub-assembly of FIG. 80.
Figure 82:
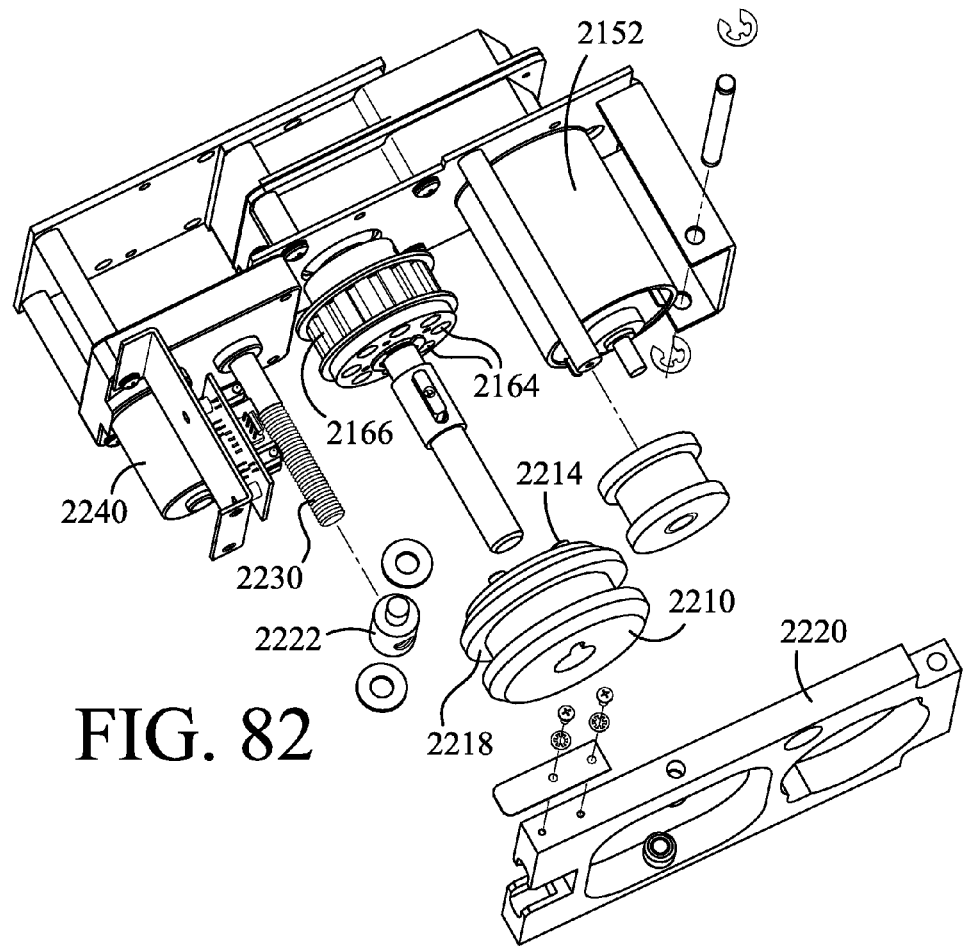
FIG. 82 is an exploded perspective view of an additional sub-assembly for the drive/clutch sub-assembly for the system of FIG. 80.
Figure 83:
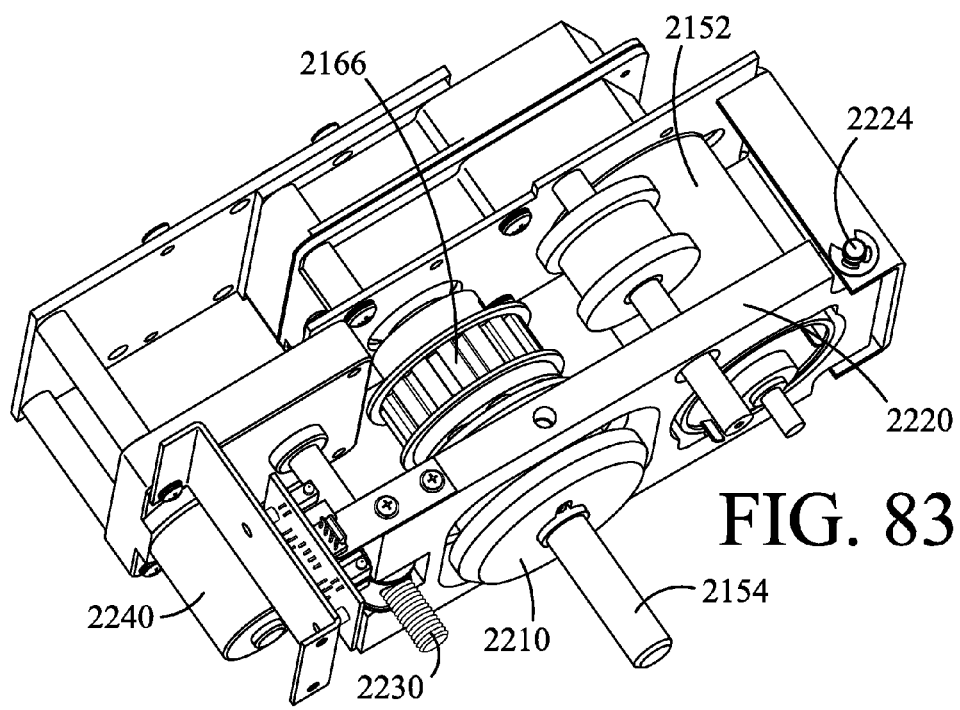
FIG. 83 is a perspective assembled view of the drive/clutch sub-assemblies portion of FIG. 82.
Figure 84:
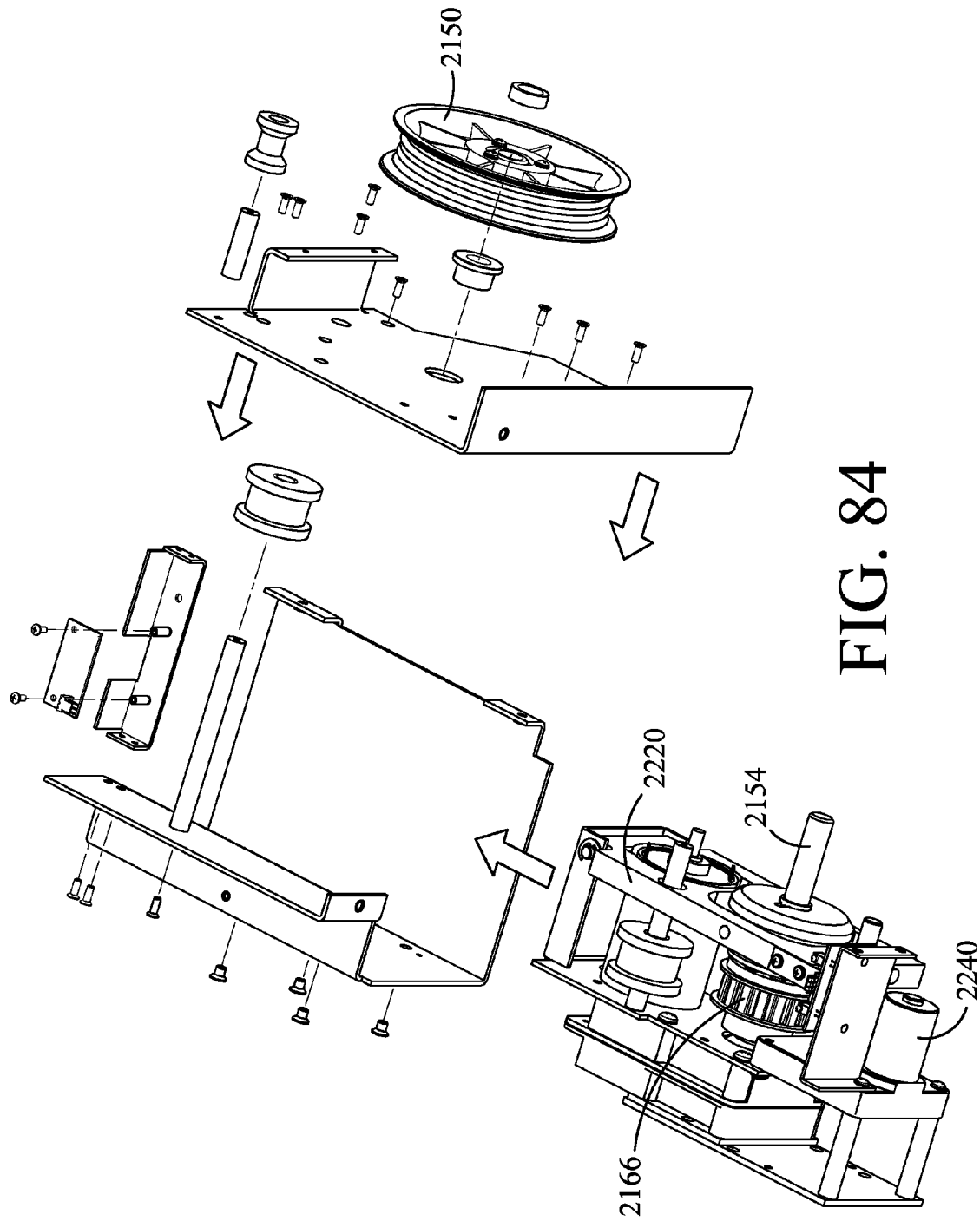
FIG. 84 is an exploded perspective view, partly in diagram form, of an additional sub-assembly for the drive/clutch sub-assemblies of FIG. 83.

With reference to FIGS. 74A to 76B, the drive wheel 2160 is mounted to shaft 1252 by a one-way clutch mounting bearing 2162 and has an axially forward plate 2163 which functions as a receiver. The drive wheel receiver plate has a plurality of equi-angularly spaced openings or axial bores 2164 (FIGS. 81, 82). The drive wheel has an outer circumferential surface 2166 configured with alternating raised/recessed segments to engagedly mate with the teeth of the timing belt 2180.

An axially displaceable clutch member 2210 is disposed between the drive pulley 2150 and the drive wheel 2160 and mounted for selective rotation with the drive shaft 2154. The clutch member has four equi-angularly spaced axial bores 2212. Each of the bores receives a pin 2214 which is axially biased by a spring 2216 toward the drive wheel 2160. The pins 2214 angularly align with the bores 2164 of the drive wheel.

The clutch member 2210 includes an annular recess 2218 which receives a pivotal yoke 2220. One end of the yoke includes a pivot nut 2222 which is threaded to an axially projecting screw drive 2230. The opposite end is retained by a pivot pin 2224. A motor 2240 responsive to the controller controls the rotation of the screw drive 2230 which causes the yoke to selectively pivot inwardly (FIG. 74A arrows) and outwardly (FIG. 74B arrows) to thereby force the clutch member 2210 axially (direction of FIGS. 74A and 75A arrows) relative to the receiver plate 2163 of the drive wheel 2160. In the clutch drive engaged position of FIGS. 74A and 75A, the ends of the pins 2214 are received in corresponding bores 2164 of the face of the drive wheel so that they rotatably engage, and the clutch member 2210 and drive wheel 2160 rotate in tandem under the drive of the shaft 2154 to retract the cable into the housing as will be further described below.

When the shaft 2154 is driven in the engaged clutch position (FIGS. 74A, 75A) in a first angular direction, the drive wheel is also correspondingly driven. Because the drive wheel 2160 has a one-way clutch bearing 2162 in the opposed direction, the drive wheel is not driven when the shaft rotates in the opposed direction even if the drive wheel is engaged by the clutch member. It will be appreciated that the drive pulley 2150 also has a one-way clutch bearing 2152 which allows the cable to be pulled away from the opening after the connector has been lowered to the ADA height and allows the drive pulley for the cable to be driven in the opposite direction to retract the cable into the housing.

Figure 85:
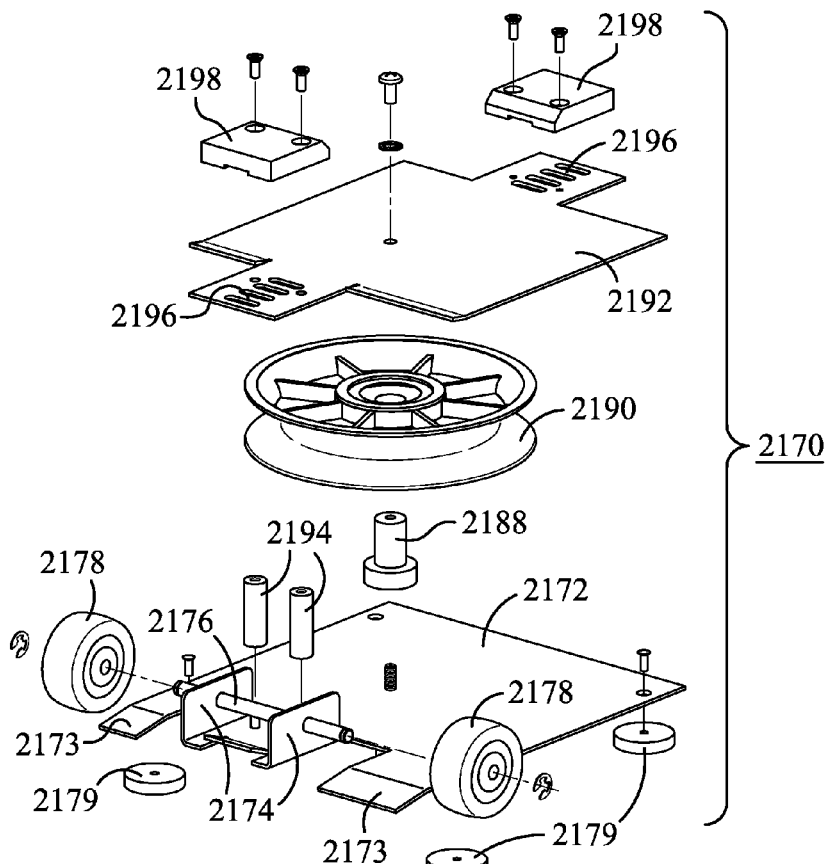
FIG. 85 is an exploded perspective view of a trolley sub-assembly of the cable management system partially illustrated in FIG. 73.
Figure 86:
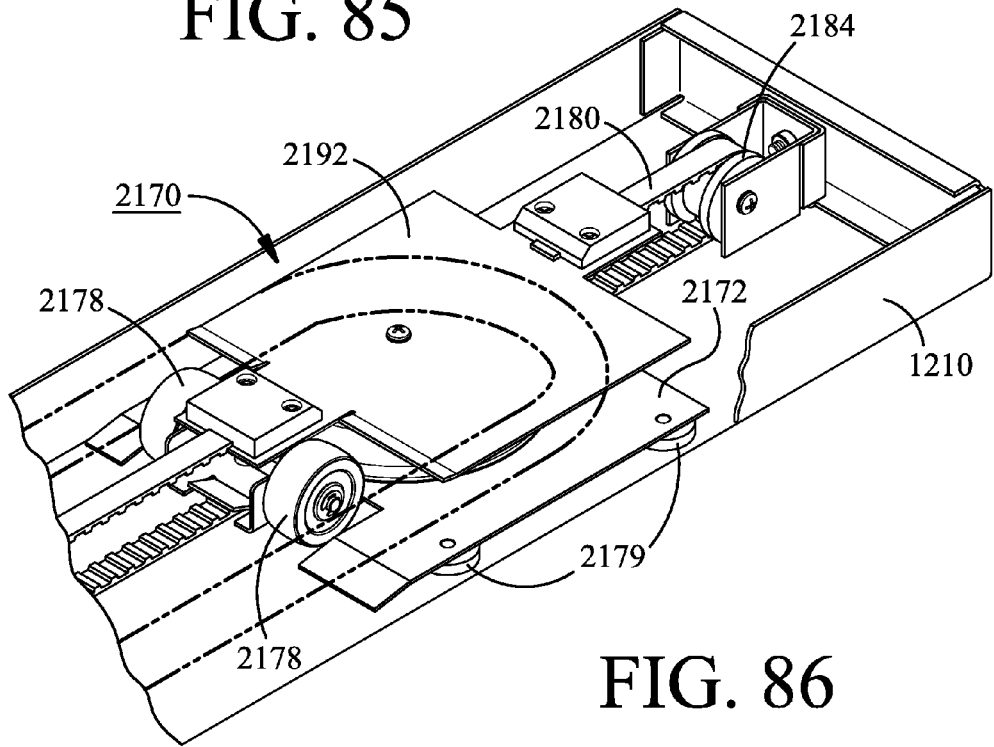
FIG. 86 is an assembled perspective view, partly broken away and partly in phantom, of the installed sub-assembly of FIG. 85.

With reference to FIGS. 85 and 86, the trolley 2170 includes a platform 2172 with a pair of upstanding panels 2174 which rotatably mount an axle 2176. A roller 2178 is mounted to each end of the axle. The platform has a pair of intermediate recesses 2173 at the rear thereof to accommodate the rollers. The rear of the platform may be slightly sloped. Two pairs of guide rollers 2179 are mounted adjacent opposed sides of the platform for rotation about a generally vertical axis. The guide rollers 2179 are located so that they slidably engage against the side walls of the housing.

An axle 2188 vertically extends from a central location of the platform and rotatably mounts the idler pulley 2190. A cover 2192 mounts over the pulley and connects with the platform via spacers 2194. The cover has a set of raised serrations 2196 at the opposed medial front and rear portions which are quasi-complementary with the teeth of the timing belt 2180. A pair of clamp brackets 2198 secures the timing belt 2150 which is captured between the clamp brackets 2198 and the platform serrations 2196 so that the timing belt 2180 is fixedly secured to the trolley 2170. With additional reference to FIGS. 76A,76B, the timing belt 2180 is driven by the drive wheel 2160 and passes around idler wheels 2182 and 2183 and rear idler wheel 2184 (FIG. 86) suspended from the end of the housing.

Figure 76A:
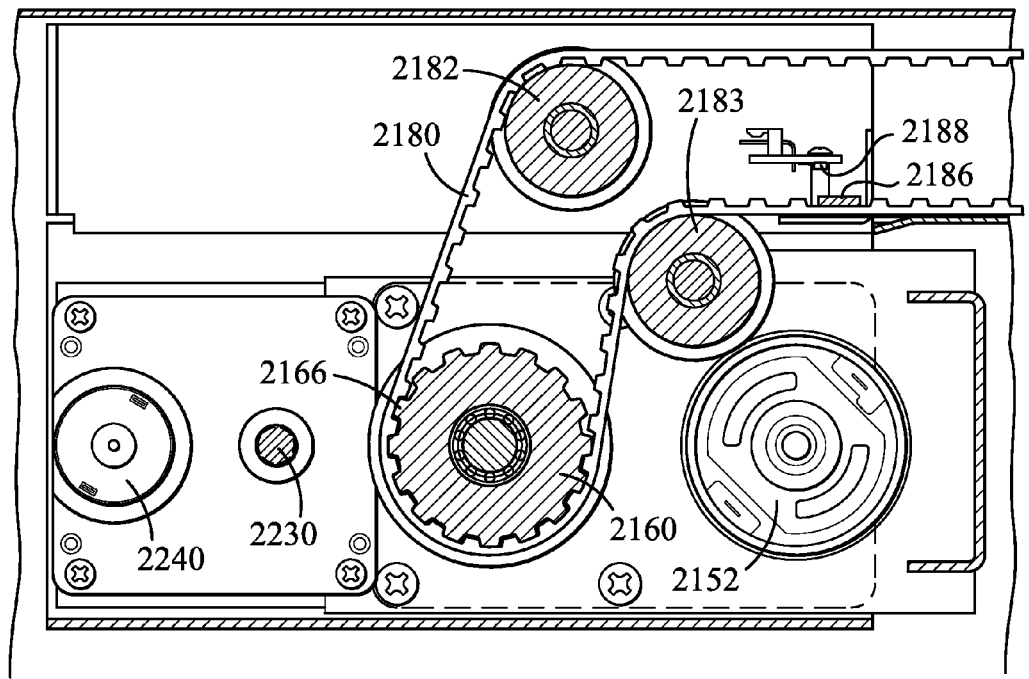
FIG. 76A is a sectional view of the system of FIG. 74A taken along line 76A-76A thereof.

With reference to FIG. 76A, a magnet 2186 is mounted on the timing cable 2180. A Hall effect sensor 2188 is disposed for sensing the home position of the timing belt 2180 so that the proper home position of the cable 1210 can be automatically ascertained.

Figure 76B:
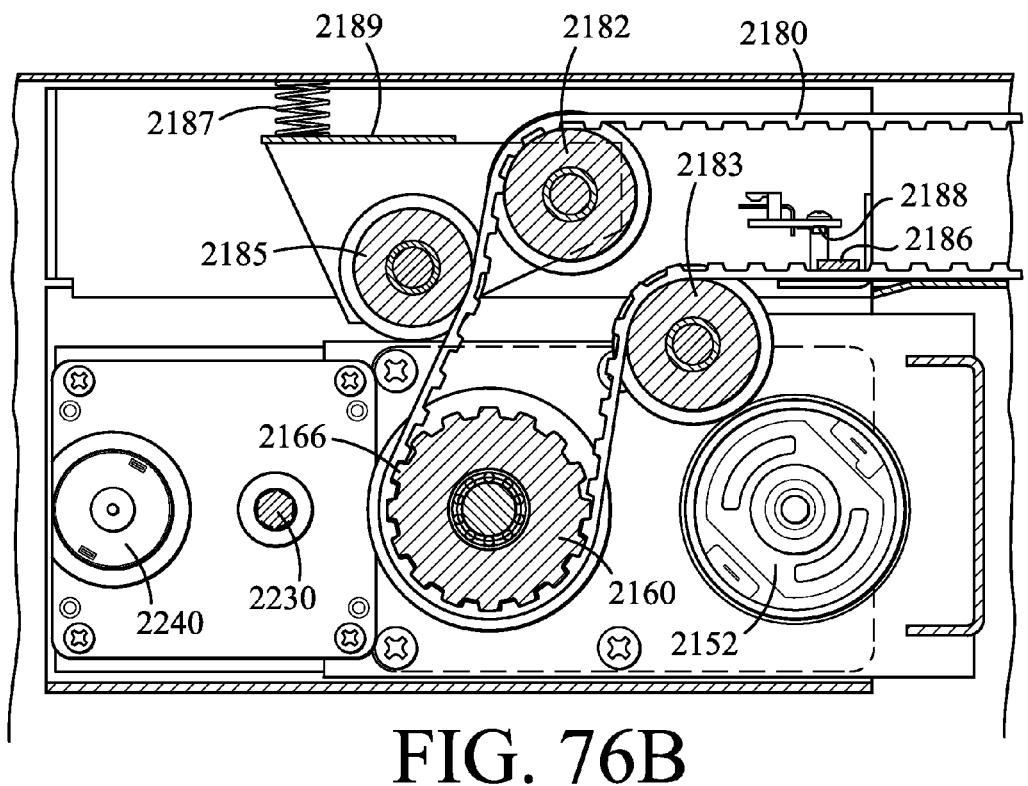
FIG. 76B is a sectional view similar to that of FIG. 76A further illustrating an optional belt tensioner.
Figure 80:
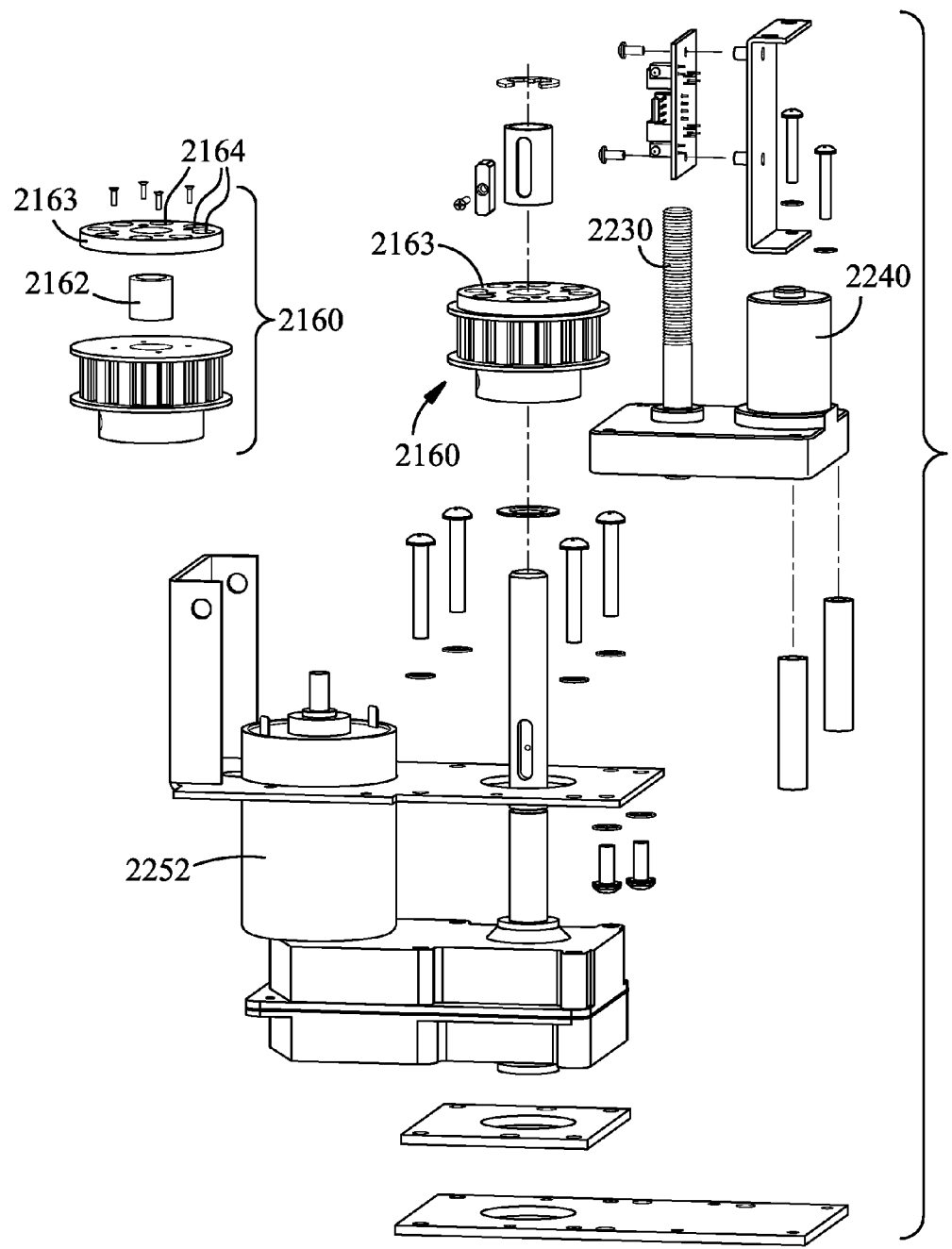
FIG. 80 is an exploded perspective view of the drive/clutch sub-assembly for the system of FIG. 73.

With reference to FIGS. 76B-79, because the timing belt 2180 may be subject to significant ambient temperature differentials depending upon the location of the overhead cable management system, the belt 2180 may be prone to slacken and tighten as temperatures or ambient conditions change. Accordingly, an optional belt tensioner wheel 2185 is engaged against the belt under a bias of spring 2187 to prevent any slackening of the belt as shown in FIG. 76B. The tensioner wheel 2185 is rotatably mounted to a bracket 2189 which is pivotally mounted to the axle for idler wheel 2182.

The operation of the overhead cable management system 2100 and cable 1120 is sequentially schematically illustrated in FIGS. 87A-89C. At the start of the cycle, the connector 1130 is in the retracted home position illustrated in FIGS. 87A and 87B. The position of the trolley 2170 relative to the housing and the timing belt 2180 in the pre-use position is best illustrated in FIG. 87C. The arrows of FIGS. 87B and 87C indicate the initial movement at the start of the cycle.

At the start of the cycle, the cable is lowered to approximately 4 feet off the ground (ADA height) under the drive of the belt drive wheel 2160 which rotates in the counter clockwise direction of the FIG. 87B arrow. The trolley 2170 retreats from the pre-use position forwardly (in the direction of the FIG. 87C arrow) under the pull of the cable.

With reference to FIGS. 88A-88C, the cable 1120 is free to be pulled by the operator (the drive pulley 2150 freely rotates) so that the connector 1130 can be connected to the charging terminal of the electric vehicle. The trolley 2170 position at full cable extension is illustrated in FIG. 88C. The cable position is further illustrated in FIGS. 88A and 88B.

After the connector is disconnected from the electric vehicle, the clutch assembly 2100 is activated so that the spring pins engage the receiver plate bores of the timing belt drive wheel 2160. The retraction cycle is illustrated in FIGS. 89A, 89B and 89C. The cable 1120 under the drive pulley 2150 is retracted as the trolley is concurrently driven rearwardly by the drive wheel 2160 now rotating under the clockwise drive of shaft 2154 to smoothly retract the cable to the home position while substantially maintaining a slack-free or quasi-taut configuration of the cable within the housing. The drive shaft is powered for rotation in the reverse direction so that the cable retracts into the housing until the home position of the connector as well as the trolley is obtained as sensed by the Hall sensor 2188.

Figure 72:
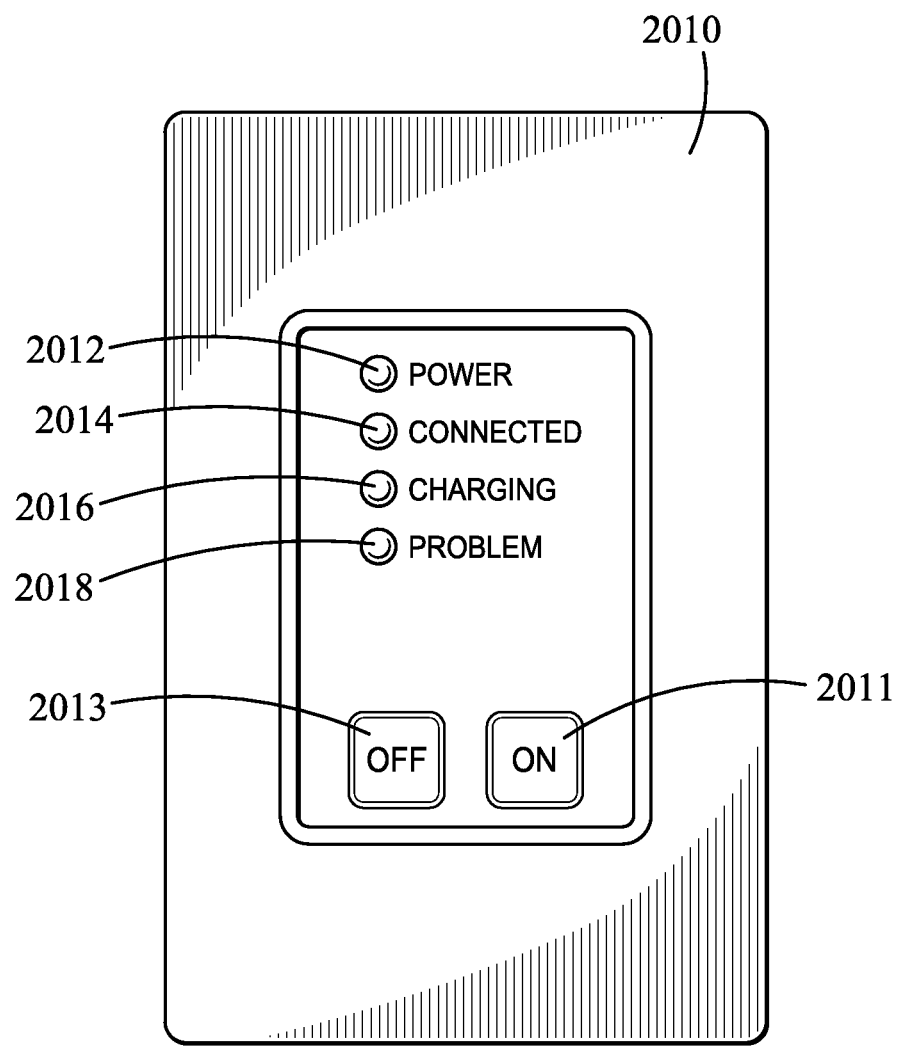
Figure 73:
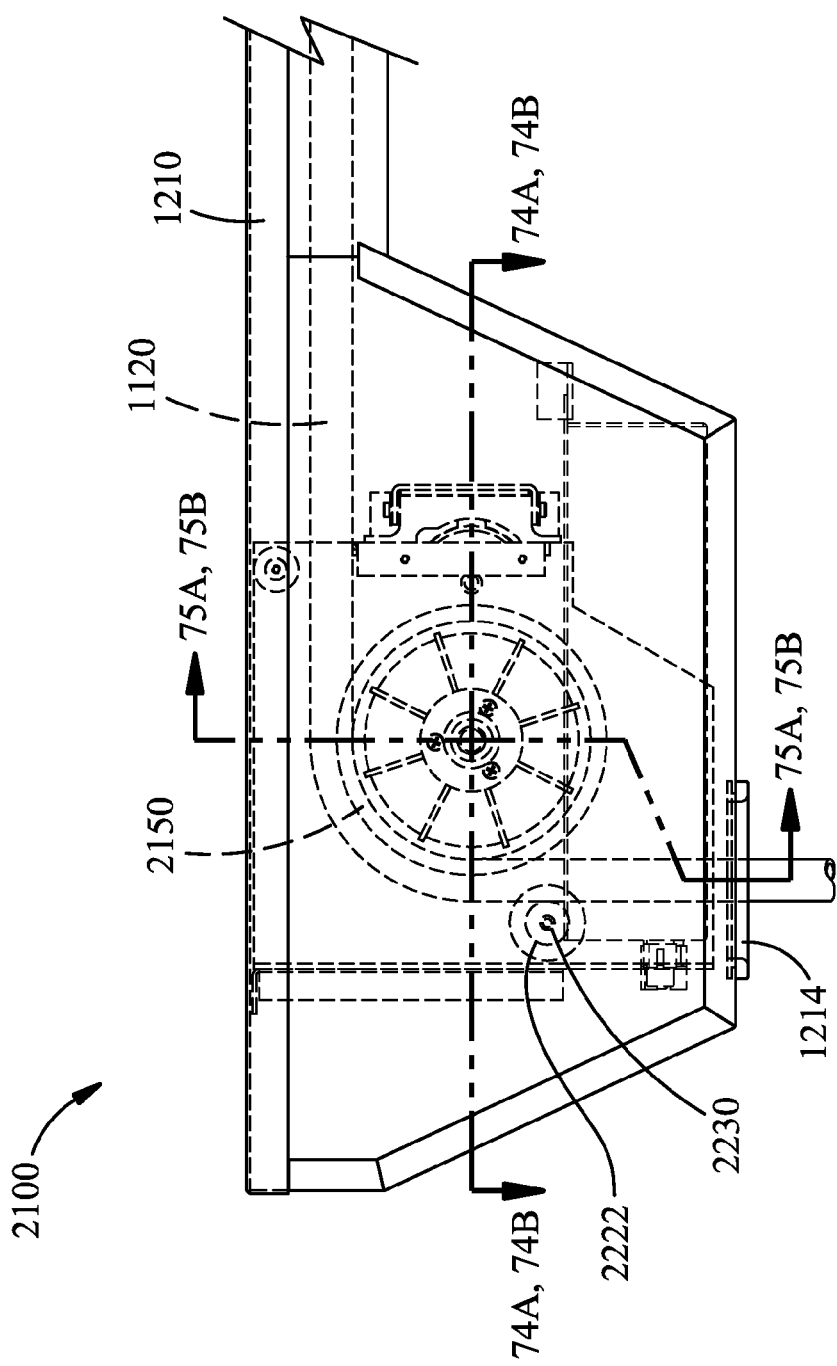
FIG. 73 is a fragmentary side elevational view, portions shown in phantom, of another embodiment of an overhead cable management system.
Figure 74A:
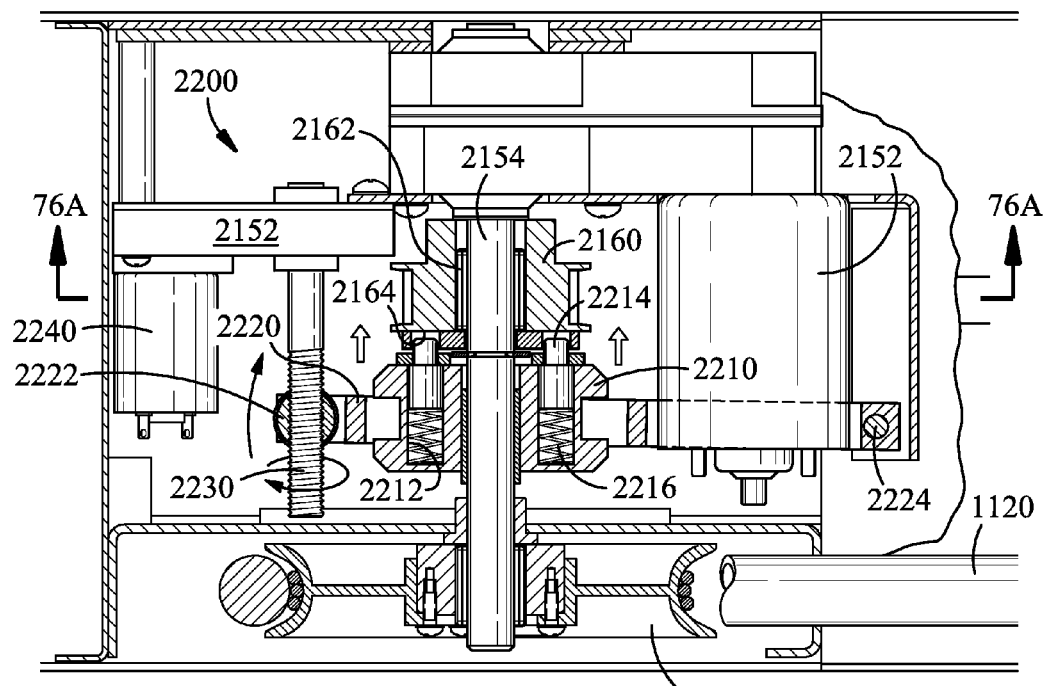
FIG. 74A is a diagrammatic sectional view of the system of FIG. 73 taken along line 74A-74A thereof, illustrating the drive/clutch assembly in an engaged drive mode.
Figure 74B:
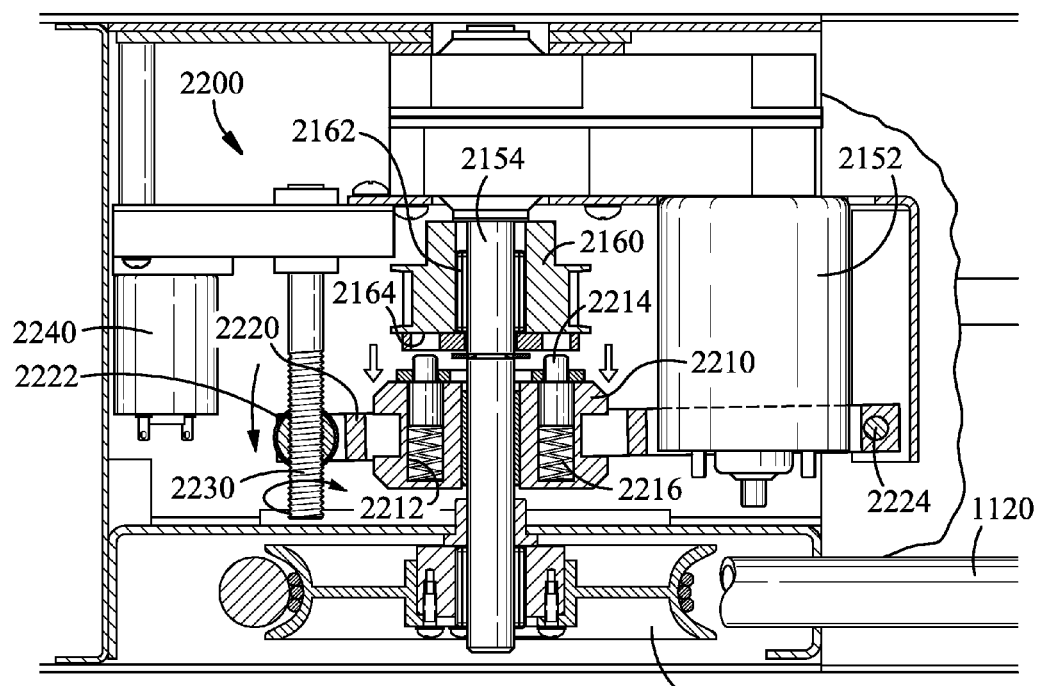
FIG. 74B is a diagrammatic sectional view of the system of FIG. 73 taken along line 74B-74B thereof, illustrating the drive/clutch assembly in a disengaged release mode.
Figure 75A:
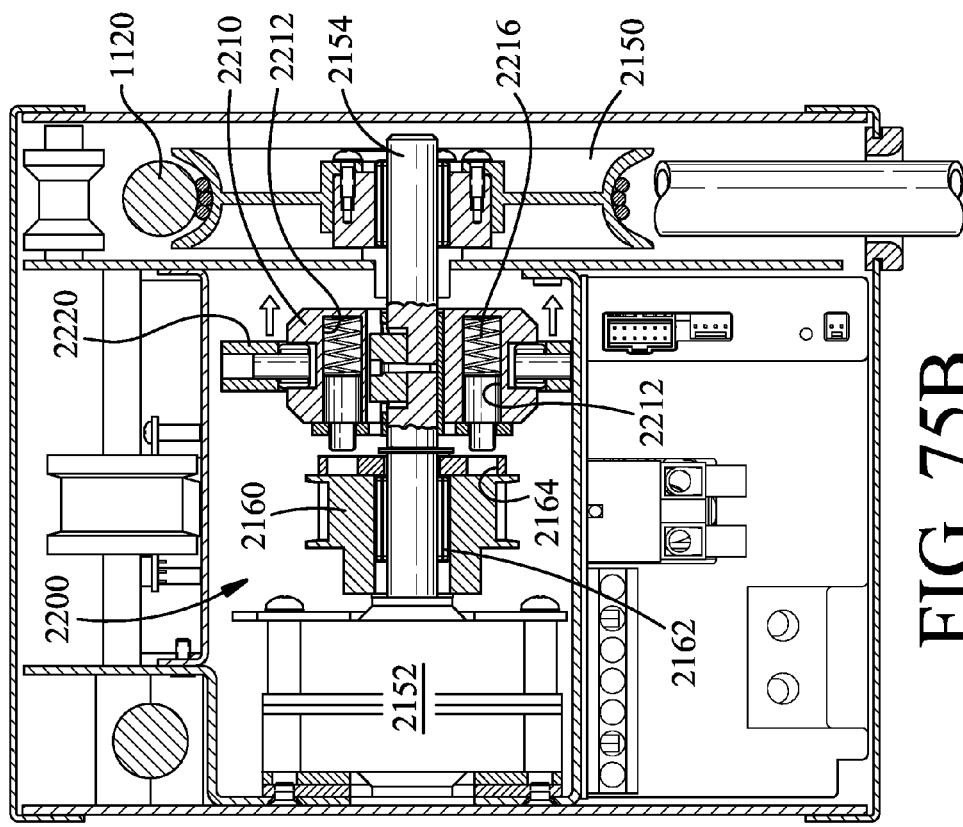
FIG. 75A is a diagrammatic sectional view of the system of FIG. 73 taken along line 75A-75A thereof, and further illustrating the drive/clutch assembly in an engaged mode.
Figure 75B:
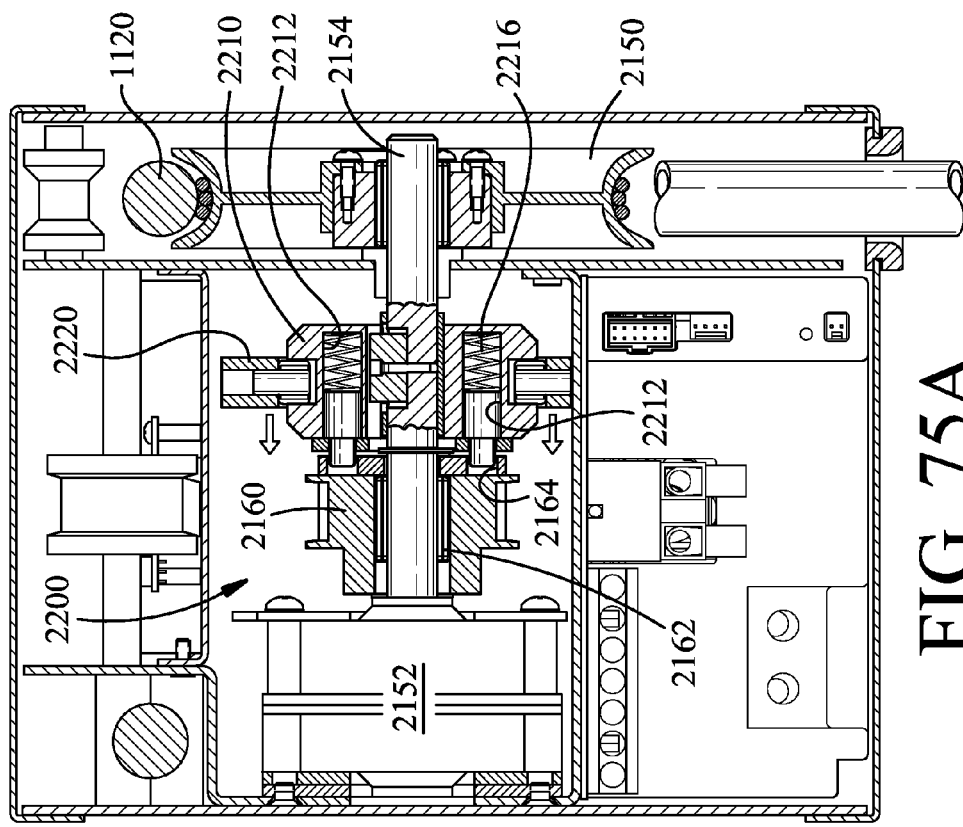
FIG. 75B is a diagrammatic sectional view of the system of FIG. 73 taken along line 75B-75B thereof, and further illustrating the drive/clutch assembly in a disengaged release mode.

With reference to FIG. 72, a panel 2010 located at a kiosk or other accessible location is employed in the operation of the cable management system and for interfacing with the vehicle operator. The panel includes a blue LED 2012 which indicates power, a yellow LED 2014 which indicates a connected condition, a green LED 2016 which indicates a charging condition and a red LED 2018 which indicates a problem. Each of the LEDs 2012, 2014, 2016, 2018 may have a steady state or a pulsing state. The panel also includes an ON button 2011 and an OFF button 2013.

Figure 58:
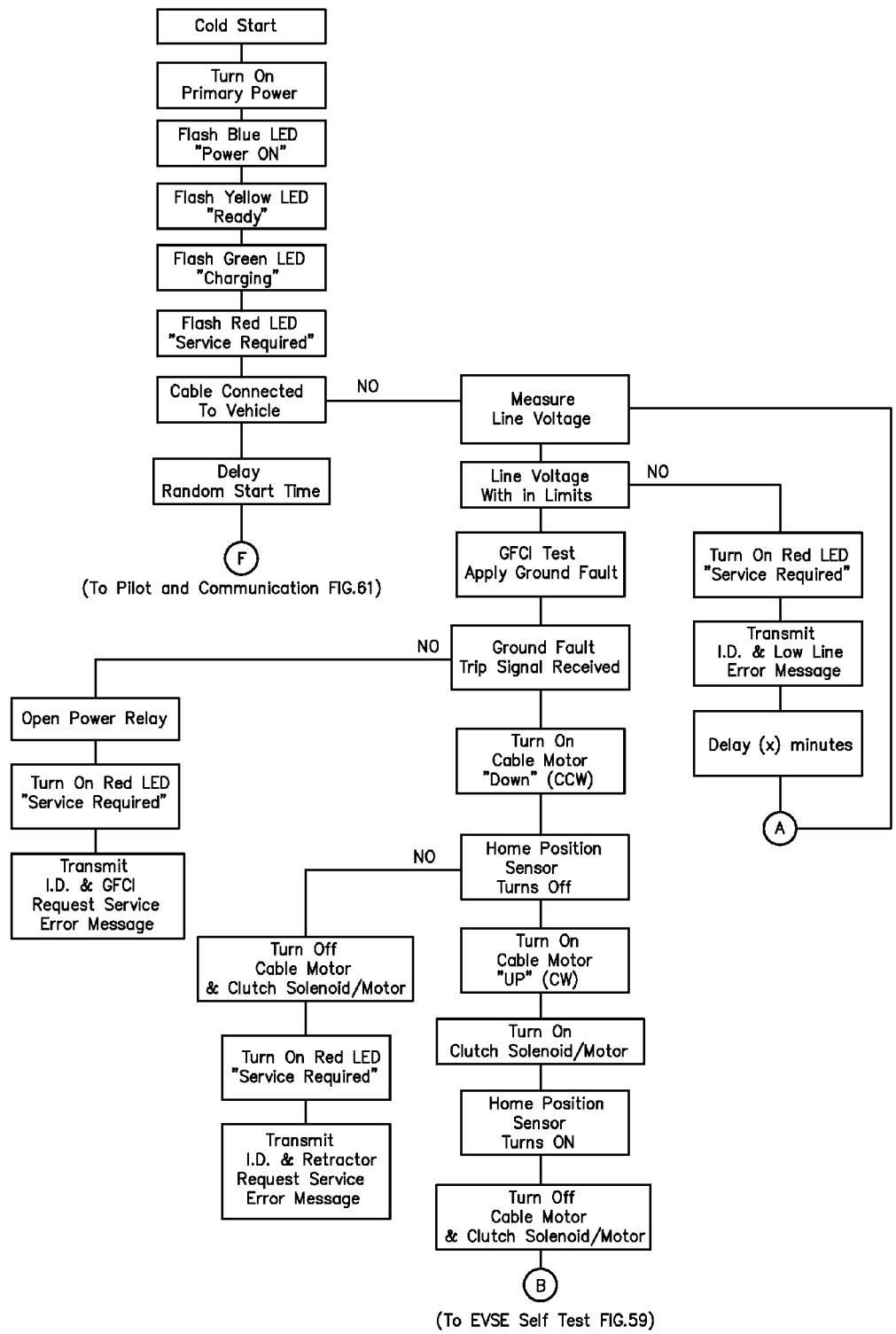

With reference to FIG. 58, upon initial power on for a cable management system which is controlled by a kiosk, an initial self-test is automatically undertaken. Once the primary power is turned on at panel 2010, a blue LED 2012 indicating "power on" is flashed. A yellow LED 2014 indicating "ready" is flashed. A green LED 2016 indicating "charging" is flashed. A red LED 2018 indicating "service required" or a "problem" is flashed. If the cable is connected to the vehicle, a time delay until a random start time is implemented. A pilot test is then undertaken (see FIG. 61).

If the cable is not connected to the vehicle, the power relay is closed and the line voltage measured. If the line voltage is within limits, a ground fault operation is then verified. If the ground fault trip signal is not received, the power relay is opened and the red LED 2018 "service required" indicator is illuminated. Signals transmitting the ID and the "ground fault circuit indicator service request" are transmitted.

If the ground fault trip signal is received, the power relay is opened. The cable motor is then turned on, and the motor is driven counterclockwise to force the cable to a down position. If the home position sensor turns off, the cable motor is energized into a clockwise up drive. The clutch solenoid/motor is turned on. The home position sensor turns on, and the cable motor and clutch solenoid/motor are then turned off. The EVSE self-test is undertaken (see FIG. 59).

If the home position sensor does not turn off, the cable motor and clutch solenoid are turned off. The red LED 2018 is illuminated to indicate "service required", and an ID and a "retractor request service error" message are transmitted.

If the line voltage is not within limits, the power relay is opened, the red LED 2018 light is illuminated to indicate "service required", and an ID and a "low line error" message are transmitted. After a pre-established delay, the power relay is closed and the line voltage is again measured and the process cyclically repeated as required.

Figure 59:
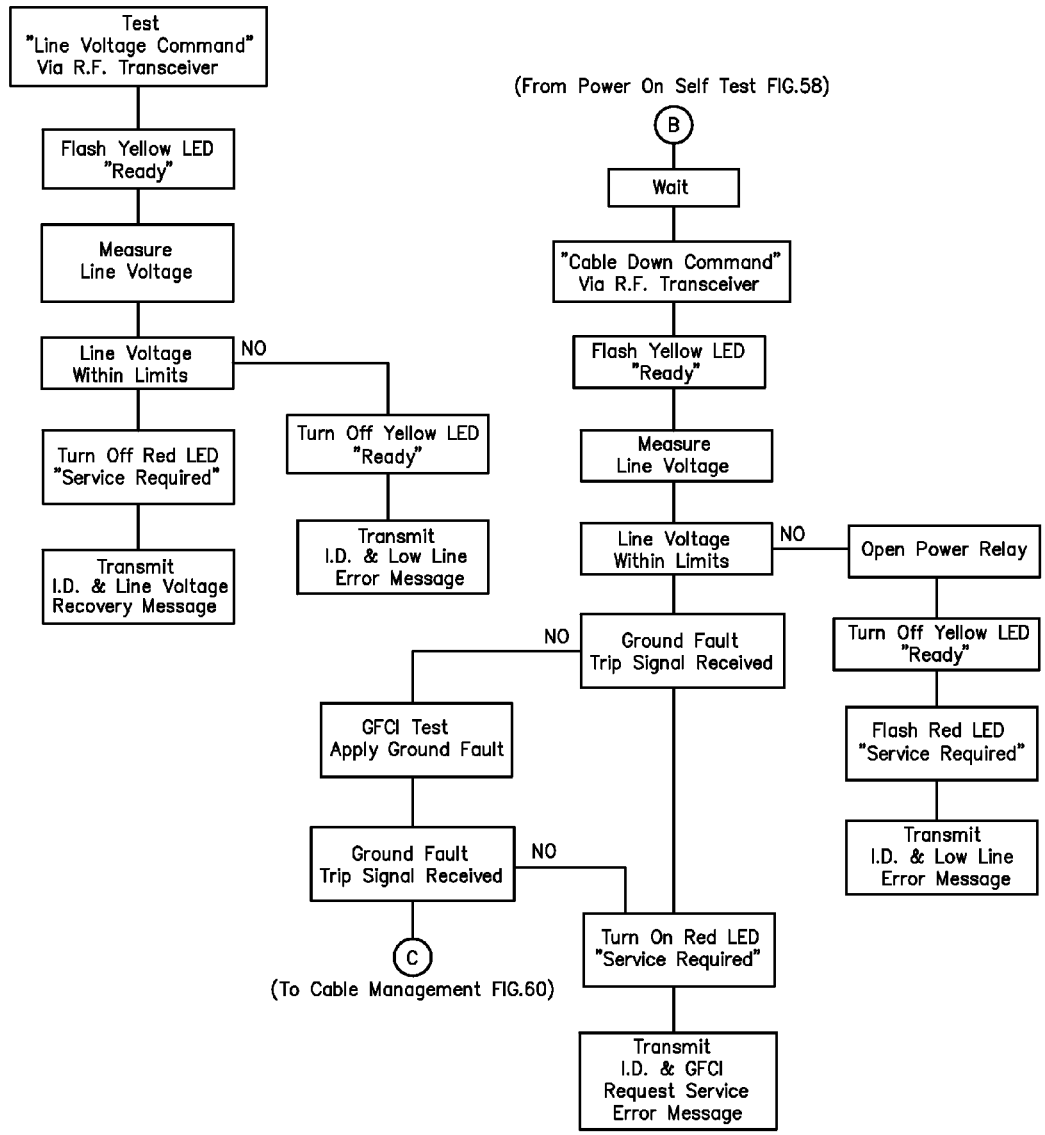

With reference to FIG. 59, after a waiting period, a "cable down command" is received by an RF transceiver from the kiosk. The yellow LED 2014 flashes a "ready" signal, the power relay is closed, and the line voltage is measured. If the line voltage is not within limits, the power relay is opened, the yellow LED 2014 is turned off, and the red LED 2018 indicating "service required" is flashed. In addition, an ID and a "low line error" message are transmitted.

If the line voltage is within limits, check is made to verify that the ground fault trip signal is received. Upon verification, the power relay is opened, a red LED 2018 indicating "service required" is illuminated and an ID and a "ground fault (GF) request service" error message are transmitted. If the ground fault trip signal is not received, a ground fault test is applied. If the ground fault trip signal is received, the power relay is then opened for proceeding with the cable management (see FIG. 60). If not, the power relay is opened, the red LED 2018 is illuminated and the "GFCI service required" message is transmitted.

A test of the "line voltage command" via the RF transceiver is undertaken. The yellow LED 2014 indicating "ready" is flashed, and the power relay is closed to measure the line voltage. If the line voltage is within limits, the red LED 2018 indicating "service required" is turned off and an ID and a "line voltage recovery" message are transmitted. If the line voltage is not within limits, the power relay is opened, the yellow LED 2014 is turned off and an ID and a "low line error" message are transmitted.

Figure 60:
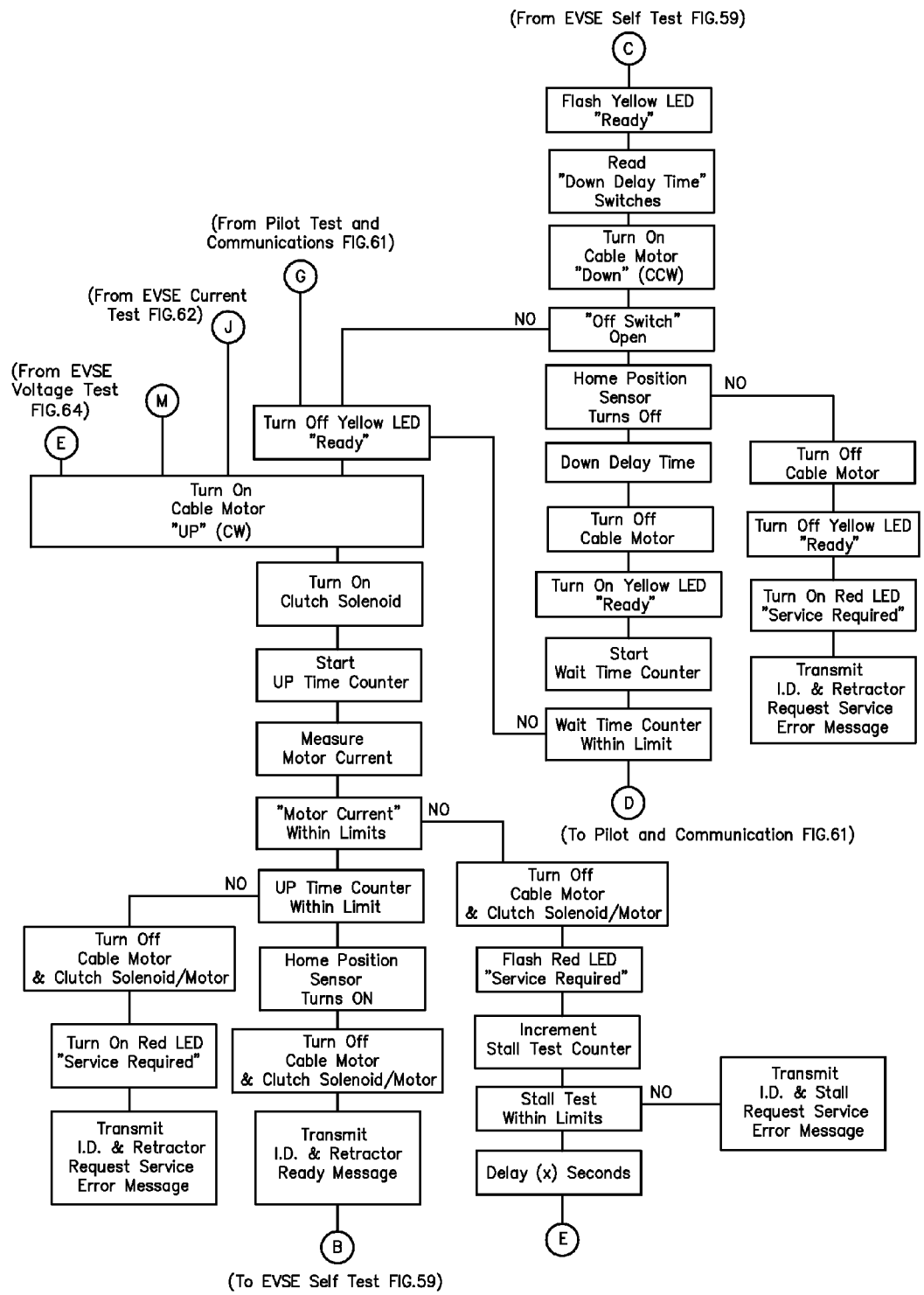

With reference to FIG. 60, once the EVSE self test is undertaken and the power relay is opened, the yellow LED 2014 flashes to indicate a "ready" condition. The "down delay time" switches are read, and the cable motor is turned on and driven counterclockwise to drive the cable to a "down" position. If the "off" switch is open, a check ascertains whether the home position sensor is turned off. If it is, there is a down delay time. The cable motor is turned off, the yellow LED 2014 is illuminated to indicate "ready" and a wait time counter is started.

If the home position sensor is not turned off, the cable motor is turned off, the yellow LED 2014 is turned off, the red LED 2018 indicating "service required" is turned on, and an ID and a "retractor request service error" message are transmitted.

If the wait time counter is within limits, or the "off" switch is not open, the yellow LED 2014 is turned off. The cable motor is then driven clockwise to an "up" condition for the cable. The clutch solenoid is turned on. An "up" time counter is started and the motor current is measured. If the motor current is within limits and the "up" time counter is within limits, the home position sensor turns on, the cable motor and clutch solenoid/motor are turned off and an ID and "retractor ready" message are transmitted to conduct the EVSE self-test (see FIG. 59).

If the motor current is not within limits, the cable motor and clutch solenoid/motor are turned off, the red LED 2018 flashes to indicate "service required", and a stall test counter is incremented. If the stall test is within limits, there is a delay and the voltage test resumes with the cable motor being driven clockwise to an "up" condition. If the stall test is not within limits, an ID and a "stall request service error" message are transmitted.

If the "up" time counter is not within limits, the cable motor and clutch solenoid/motor are turned off, the red LED 2018 is turned on to indicate "service required", and an ID and a "retractor request service error" message are transmitted.

Figure 61:
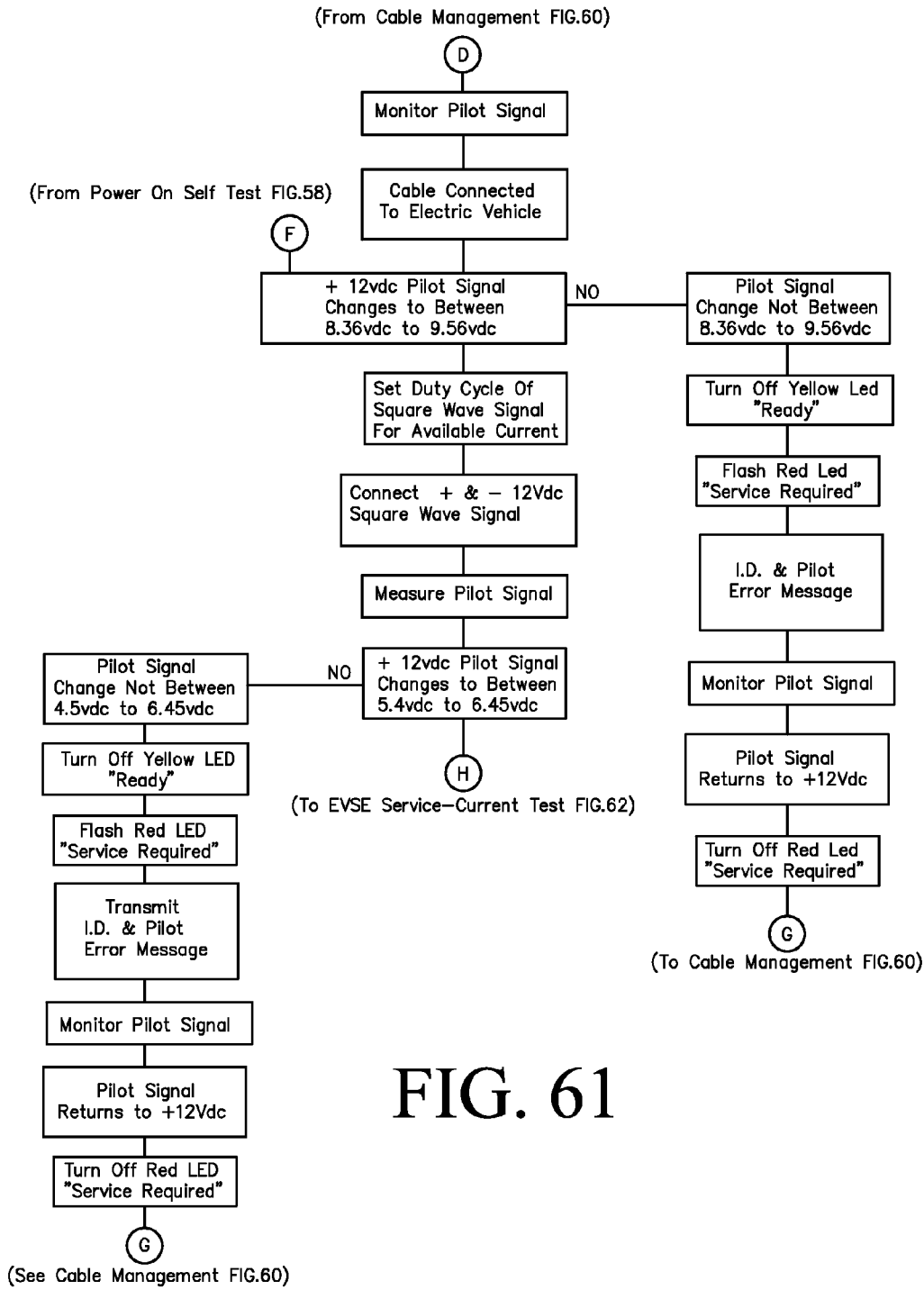

With reference to FIG. 61, a pilot test is then undertaken. If the wait time counter is within limits for the cable management, the pilot signal is monitored, and the cable is connected to the electric vehicle. If the ±12V DC pilot signal changes to between 8.36V DC to 9.5V DC, a duty cycle of a square wave signal for available current is set. The square wave signal is connected for ±12V DC and the pilot signal is measured.

If the initial pilot signal does not change to a voltage between 8.36V DC and 9.56V, then the yellow LED 2014 indicating "ready" is turned off; and the red LED 2018 is flashed to indicate "service required". The ID and a "pilot error" message are transmitted. The pilot signal is monitored. When the pilot signal returns to +12V DC, the red LED 2018 indicating "service required" is turned off, and the system cycles to the cable management operation (see FIG. 60).

Figure 62:
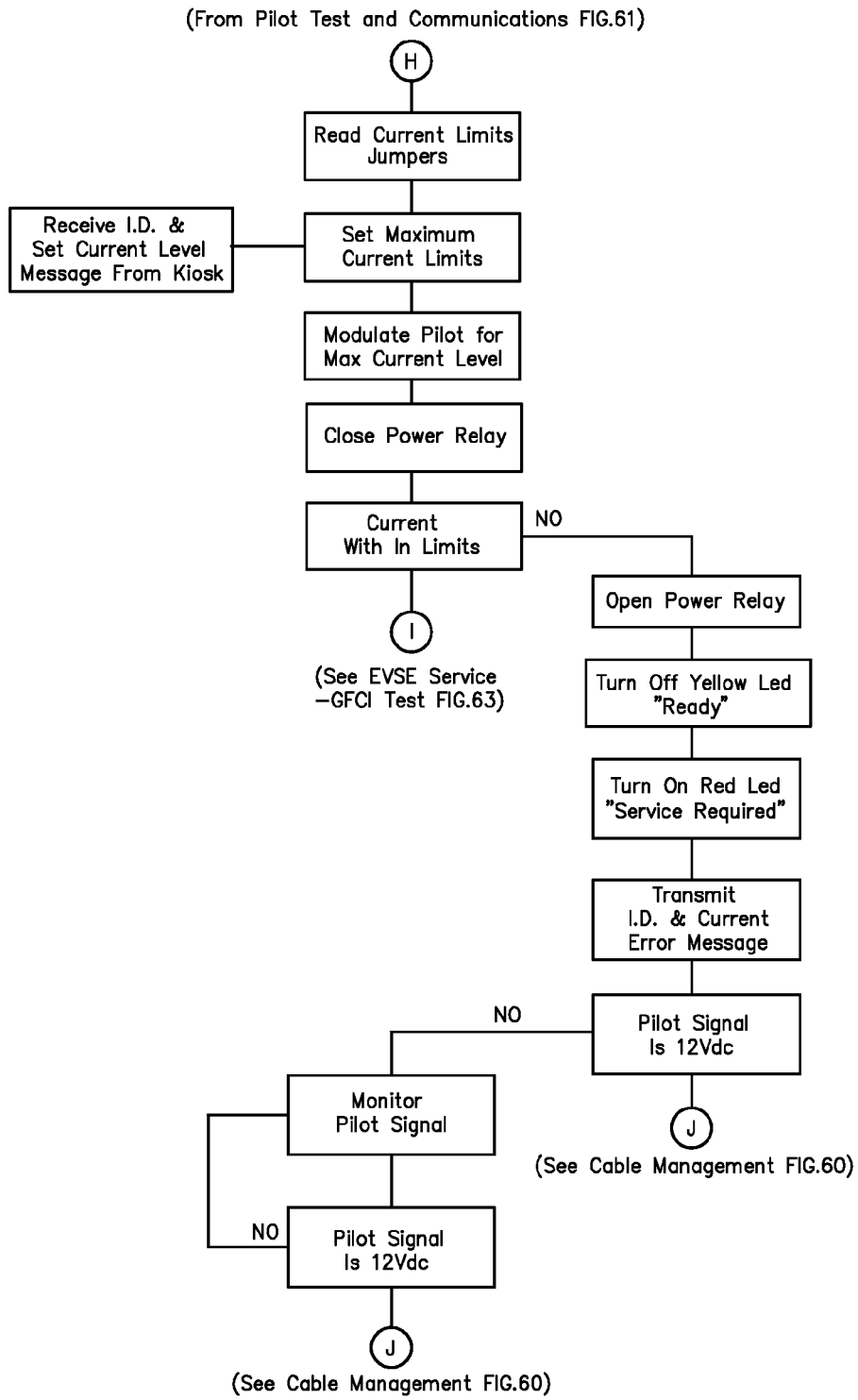

If the +12V pilot signal changes to between 5.4V and 6.5V, then the service current test is undertaken, as indicated in FIG. 62. If not, then the yellow LED 2014 indicating "ready" is turned off, the red LED 2018 indicating "service required" is flashed and the ID and "pilot error" message are transmitted. The pilot signal continues to be monitored. When the pilot signal returns to 12V direct current, the red LED 2018 indicating "service required" is turned off and the system cycles to the cable management operation as indicated in FIG. 60.

With reference to FIG. 62, after the pilot testing and communication are favorably completed as described in FIG. 61, the current limit jumpers are read. The ID and "current level" message from the kiosk are received and maximum current limits are set. The pilot for maximum current level is modulated, and the power relay is closed.

If the current is not within the limits, the power relay is opened, the yellow LED 2014 indicating "ready" is turned off, the red LED 2018 indicating "service required" is turned on, and an ID and "current error" message are transmitted. If the pilot signal is now 12V DC, the system cycles to the cable management operation described in FIG. 60.

If the pilot signal is not within 12V DC, the pilot signal is monitored. When the pilot signal reaches 12V DC, the system cycles to the cable management operation described in FIG. 60.

Figure 63:
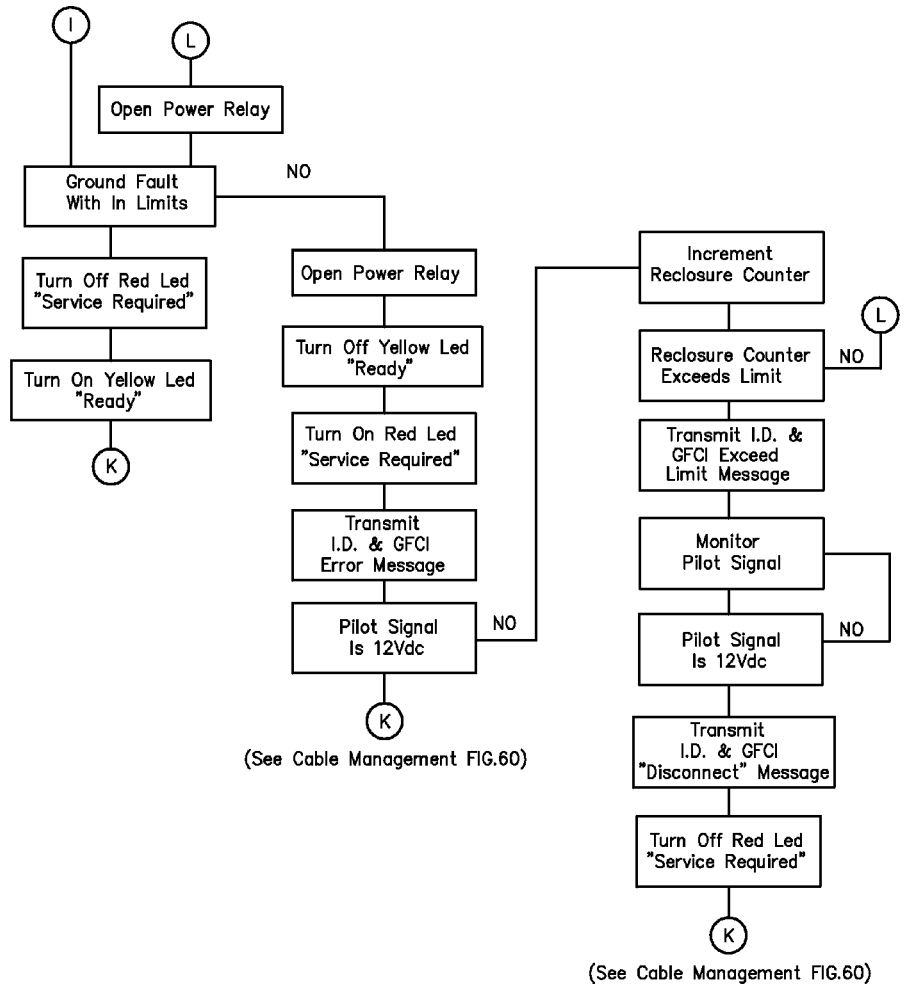

If the current is within limits, the EVSE service ground fault test as described in FIG. 63 is then undertaken. If the ground fault test is within limits, the red LED 2018 indicating "service required" is turned off, the yellow LED 2014 indicating "ready" is turned on and the system cycles to the cable management described in FIG. 60. If the ground fault is not within limits, the power relay is opened, the yellow LED 2014 indicating "ready" is turned off, the red LED 2018 indicating "service required" is turned on, and an ID and a "GFCI error" message are transmitted. If the pilot signal is 12V DC, the system cycles to the voltage test of FIG. 64.

If the pilot signal is not 12V DC, the relay closure counter is incremented. If the reclosure counter does not exceed the limit, the ground fault limit test is repeated. If the pilot signal is 12V DC, the voltage test of FIG. 64 is undertaken.

If the reclosure counter exceeds the limit, then the ID and "GFCI exceeds limit" message are transmitted. The pilot signal is monitored until the signal reaches 12V DC. An ID and a "GFCI disconnect" message are transmitted. The red LED 2018 is turned off. A voltage test is then undertaken.

Figure 64:
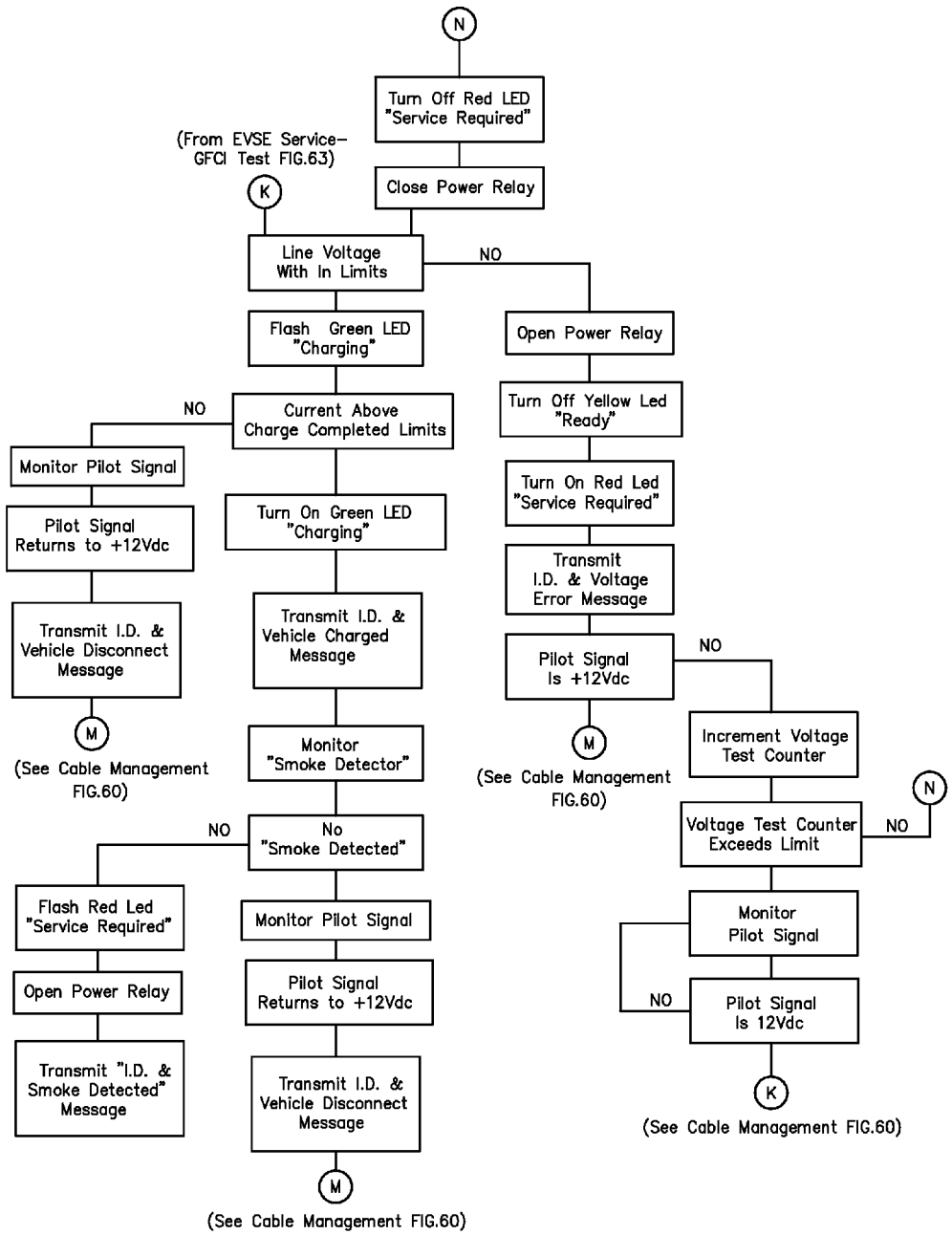

With reference to FIG. 64, if the line voltage is within the limits, the green LED 2016 charging light is flashed. If the current is above the charge completed limits, the green LED is turned to indicate "charged". An ID and a "vehicle charged" message are transmitted.

The smoke detector is continuously monitored. If smoke is detected, the red LED 2018 is flashed indicating "service required". The power relay is opened and an ID and "smoke detected" message are transmitted. If no smoke is detected, the pilot signal continues to be monitored. When the pilot signal returns to +12V DC, the ID and a "vehicle disconnect" message are transmitted to the cable management function, as described for FIG. 60.

If the line voltage is not within limits, the power relay is opened, the yellow LED 2014 "ready" signal is turned off, the red LED 2018 indicating "service required" is turned on, and the ID and a "voltage error" message are transmitted. If the pilot signal is 12V DC, the system is cycled to the cable management described in FIG. 60. If the voltage signal is not 12V DC, the voltage test counter is incremented.

If the voltage test counter exceeds a limit, the pilot signal is monitored. When the pilot signal reaches 12V DC, the system is recycled to the cable management system of FIG. 60. If the voltage test counter does not exceed the limit, the red LED 2018 is turned off. The power relay is closed and the voltage test is repeated.

The operation of the cable management system which involves local control rather than remote control from a kiosk, such as previously described for FIGS. 58-64, is illustrated in the composite flowchart of FIGS. 65-71. The principal difference in the local control operation is the absence of the transmittal of the various messages to the kiosk and/or to a remote location.

Figure 65:
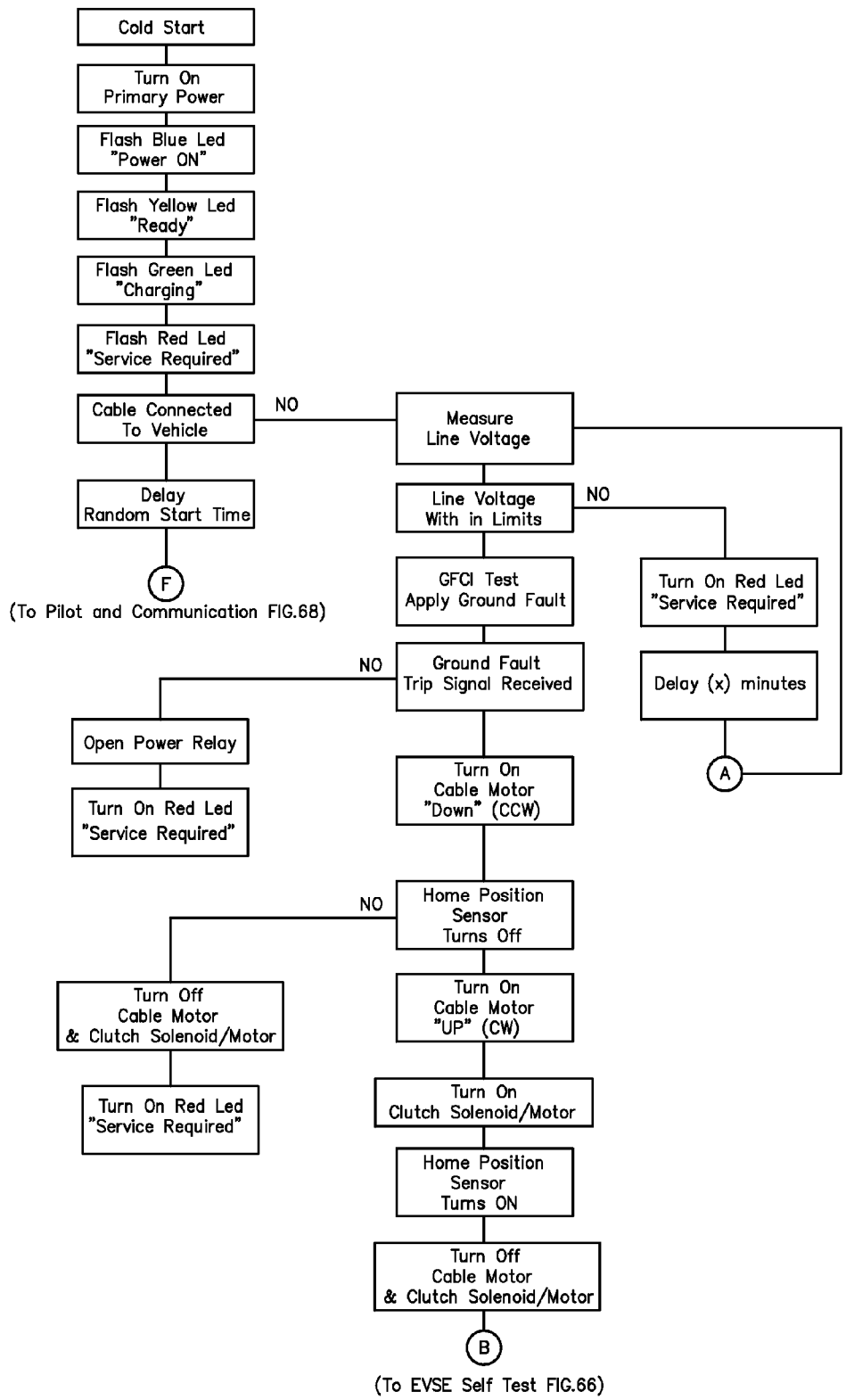

For example, in FIG. 65, there are no transmittals of the ID and "GFCI request service error" message, the ID and the "retractor service error" message and the ID and the "low-line" error message. Subject to the foregoing omissions, the operation is essentially identical to that for the kiosk control cable management system of FIG. 58.

Figure 66:
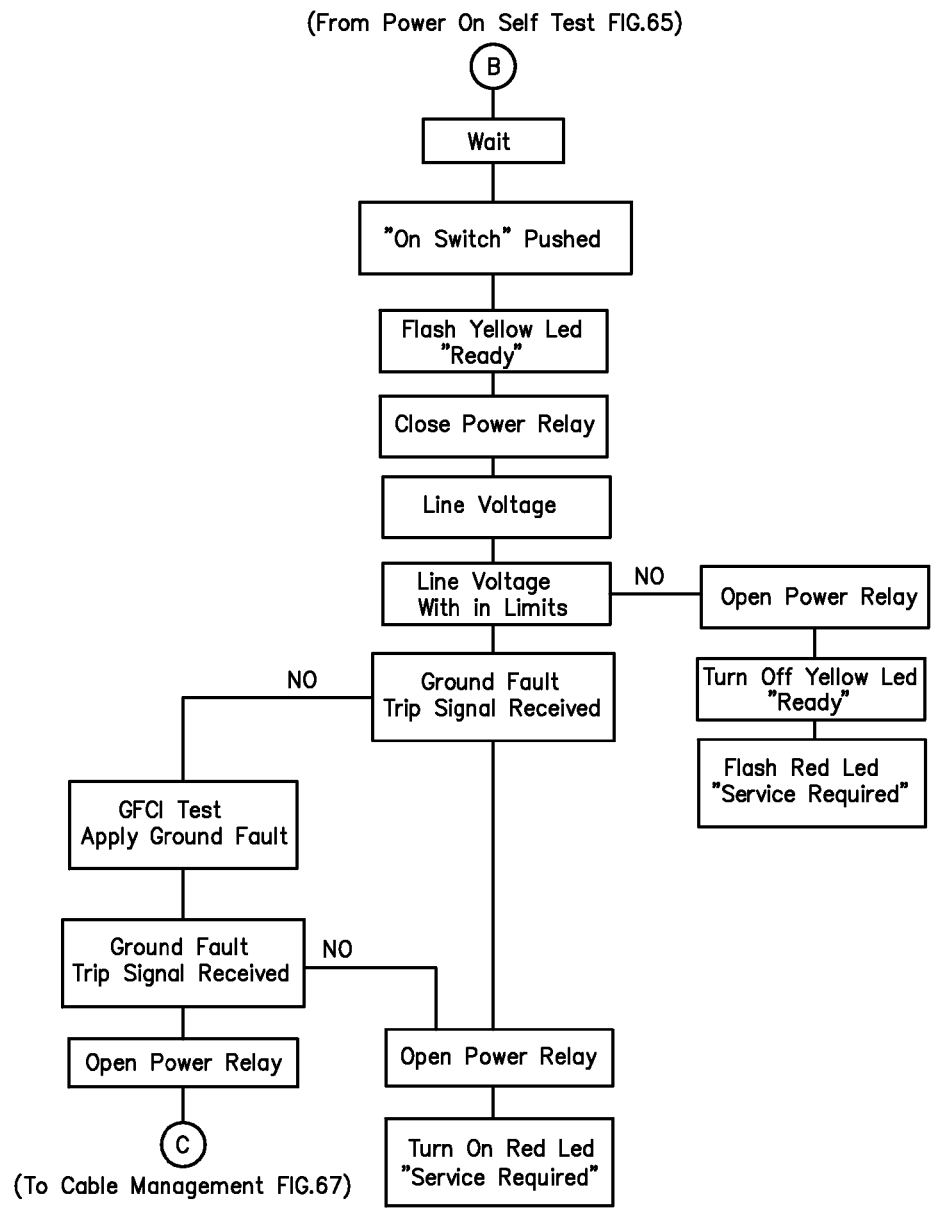

In FIG. 66, the line voltage command and test by the RF kiosk transceiver routine are completely omitted. The ID and "GFCI request service error" message and the ID and "low-line error" message are not transmitted. Subject to the noted omissions again, the self-test of FIG. 66 is substantially identical to that of FIG. 59.

Figure 67:
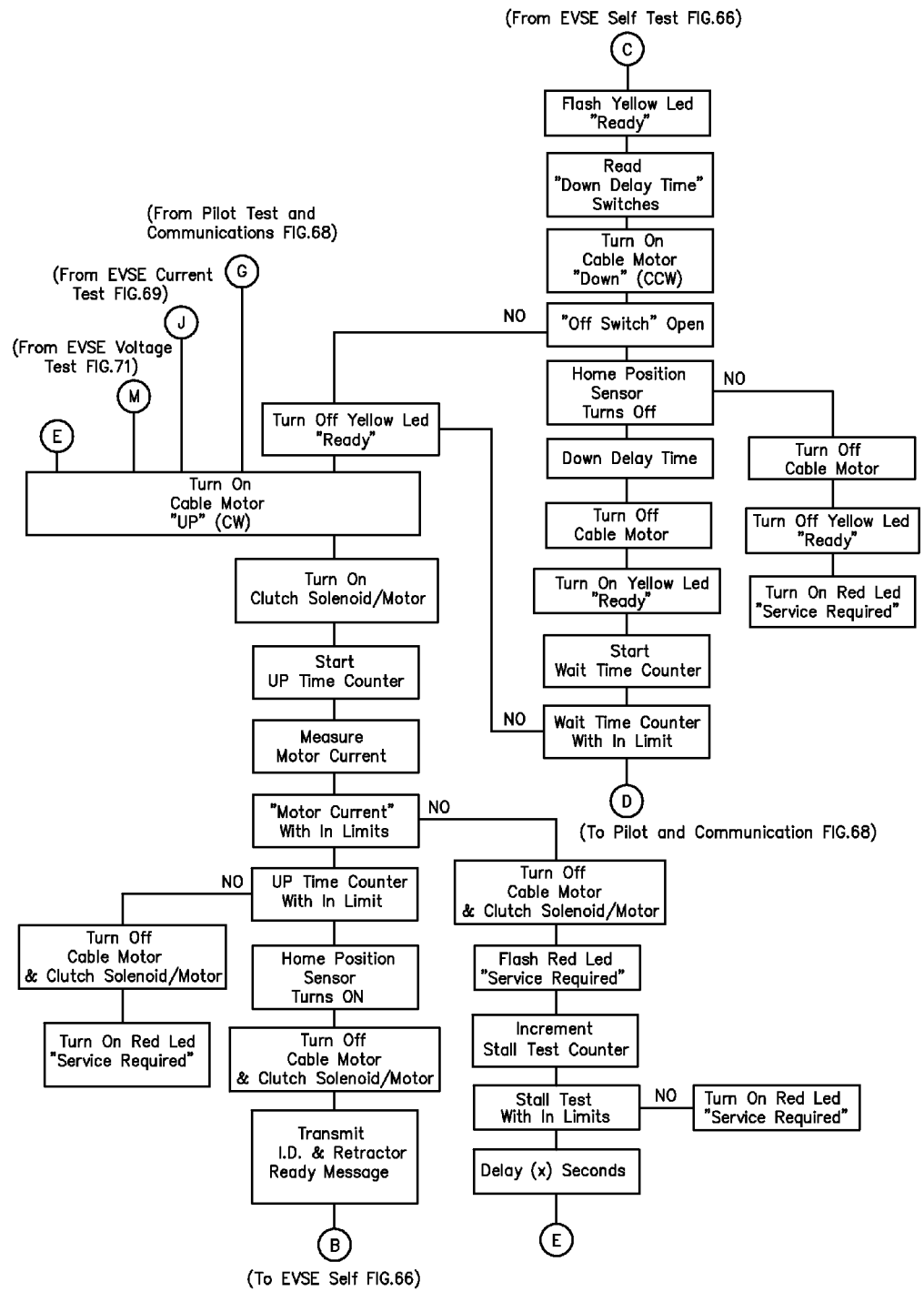

For the local control cable management diagram of FIG. 67, the ID and "retractor request service error" message are not transmitted. Subject to the foregoing omissions, the cable management operation is substantially identical to that described for FIG. 60.

Figure 68:
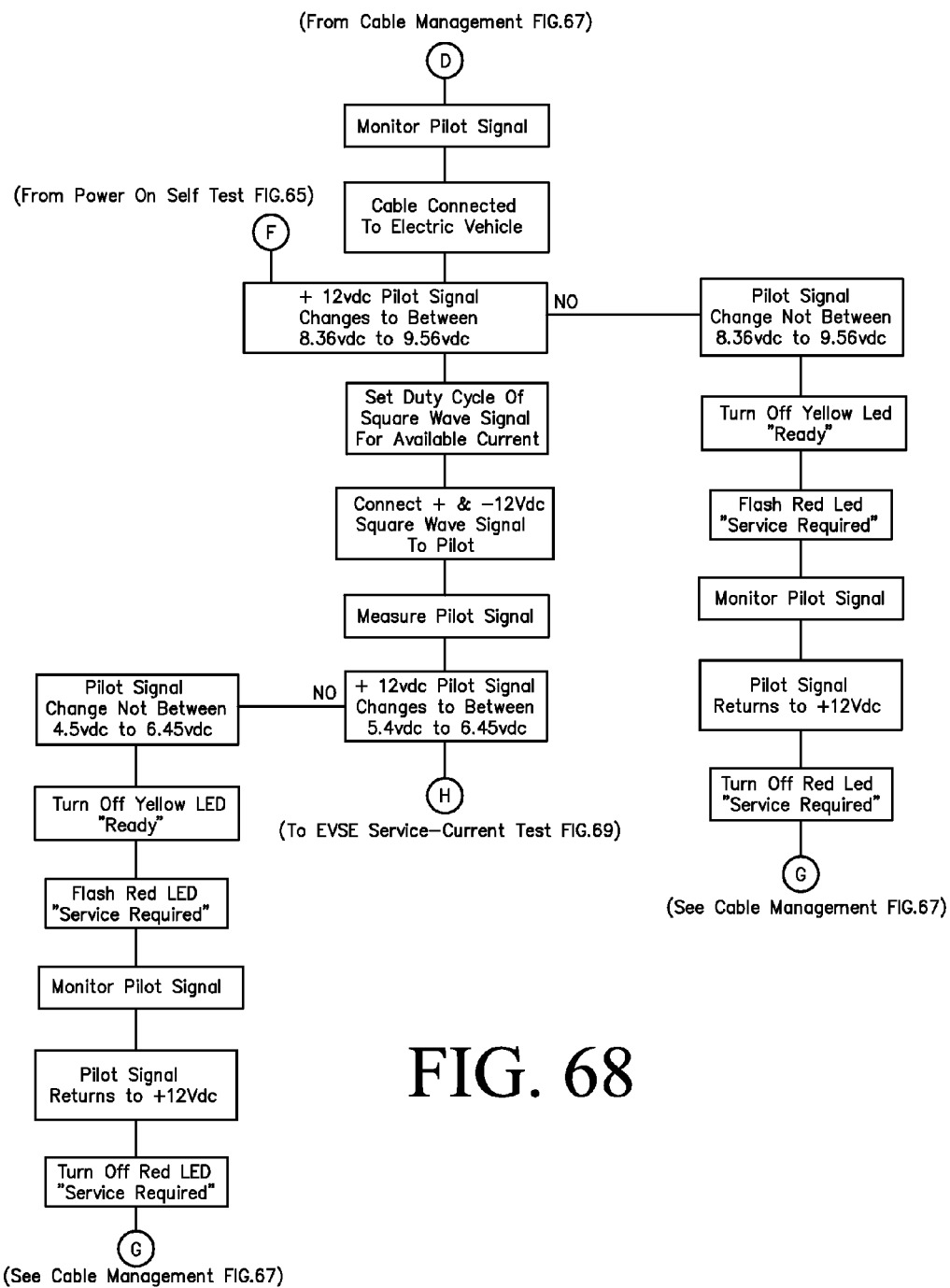

The pilot test operation of FIG. 68 does not include the transmittal of the ID and "pilot error" message of FIG. 61, but is otherwise substantially identical to the operation described for the kiosk control diagram of FIG. 61.

Figure 69:
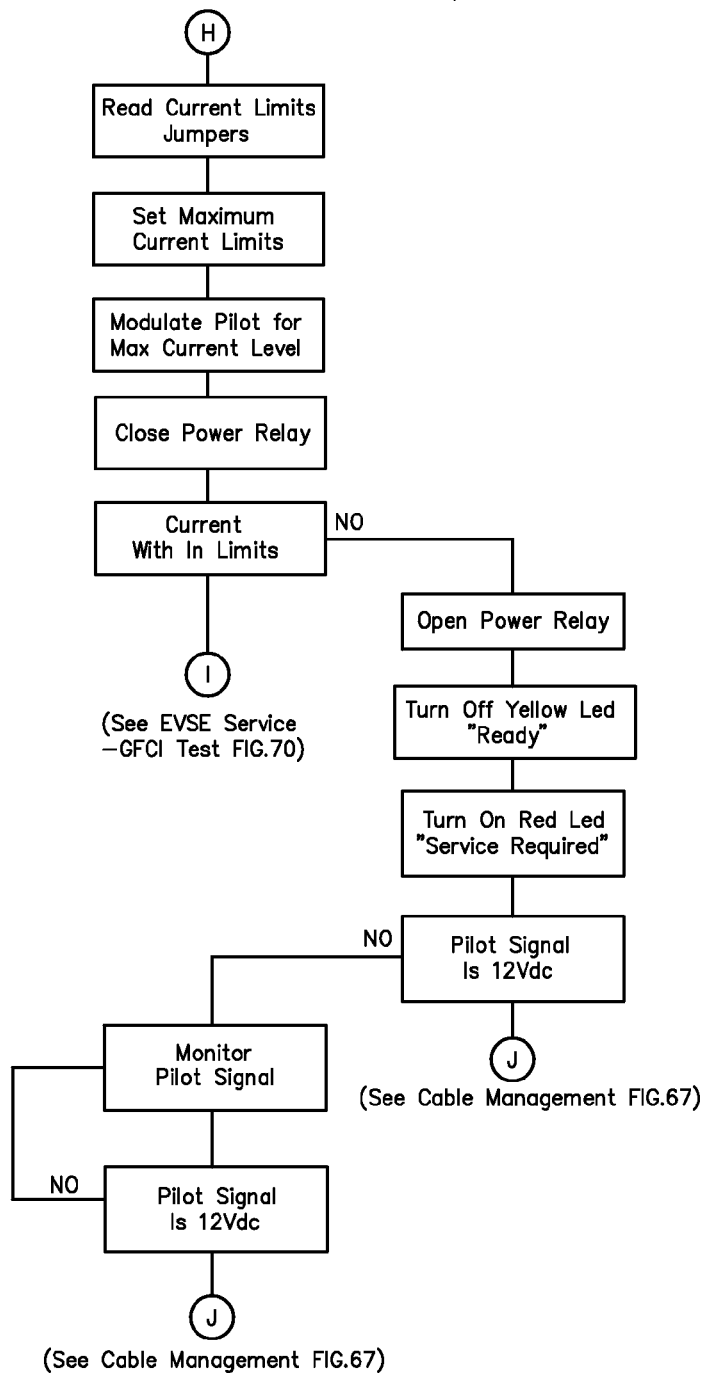

The local control operation of FIG. 69 does not employ the transmittal of the ID and "current error" message employed in the operation of the kiosk controlled management system described in FIG. 62; otherwise, the operation is substantially the same as that described for FIG. 62.

Figure 70:
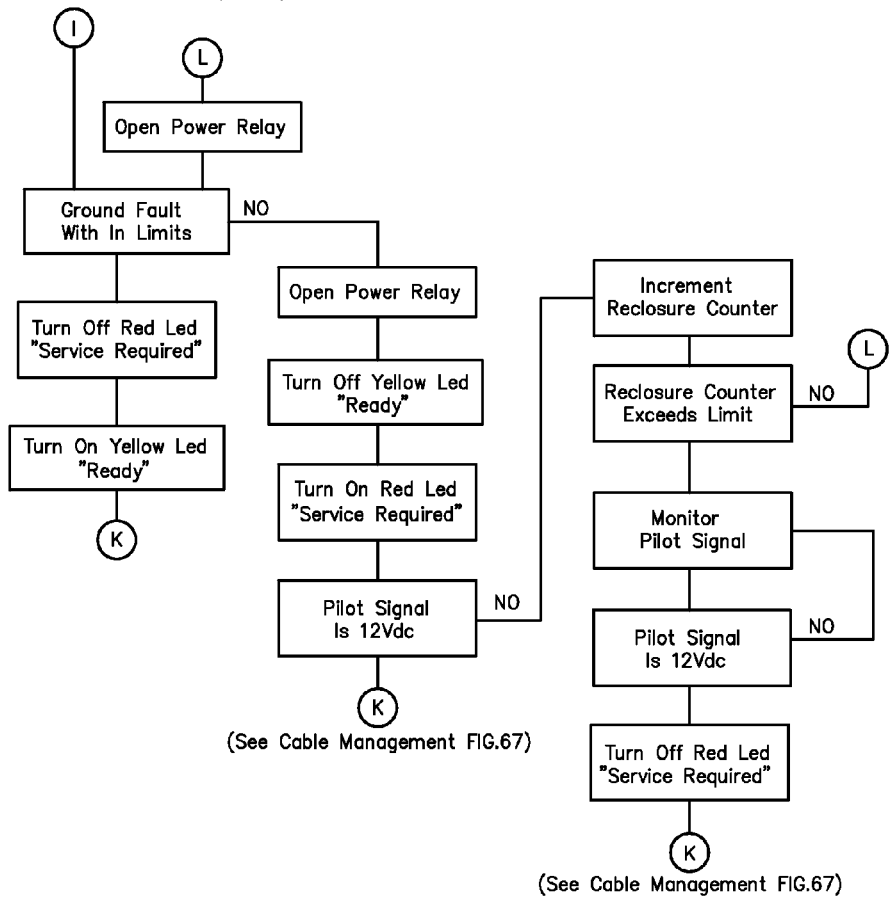

The GFCI test of FIG. 70 does not employ the transmittal of the ID and "GFCI error" message and the ID and "GFCI disconnect" message of FIG. 63, but it is otherwise substantially identical to the operation described for the kiosk controlled operation of FIG. 63.

Figure 71:
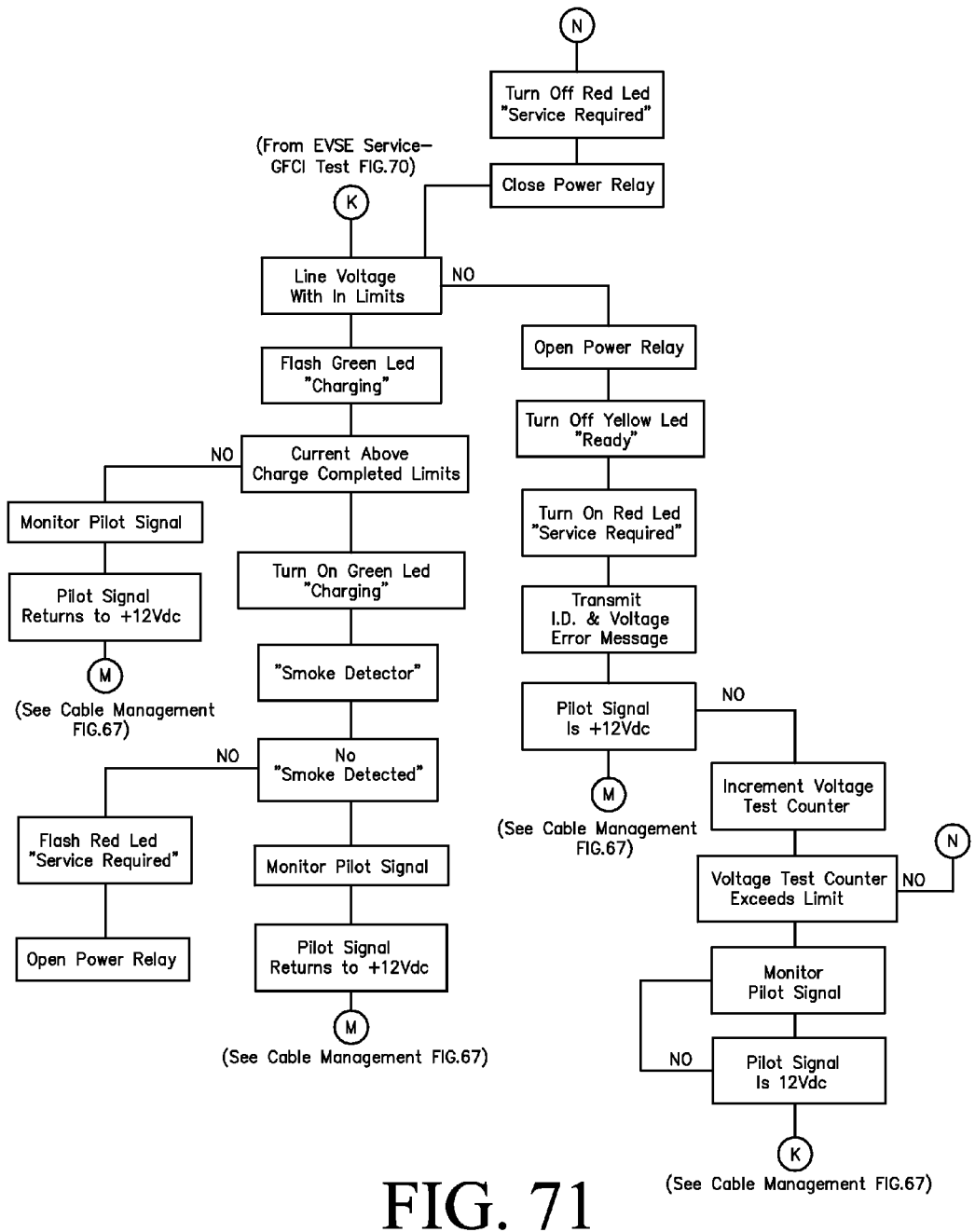

The operation described for the local control cable management system as described in FIG. 71 does not involve the ID and "vehicle disconnect" message transmittals, the ID and "smoke detected" message transmittals, the ID and "vehicle charged" message transmittals, the ID and "vehicle disconnect" message transmittals, the ID and the "voltage error" message transmittals described in FIG. 64, but is otherwise substantially identical to the operation described for FIG. 64.

While preferred embodiments of the invention have been set forth for purposes of illustration, the foregoing should not be deemed a limitation of the invention herein. Accordingly, various modifications, adaptations and alternatives may occur to one skilled in the art without departing from the spirit and the scope of the present invention.

The invention claimed is:

1. A power cable management system comprising:
   a power cable;
   a motor which drives a shaft;
   a drive pulley mounted to said shaft and receiving said power cable;
   a clutch assembly operatively engageable with said shaft and transformable between a drive mode and a release mode;
   a controller which selectively controls a mode of said clutch assembly;
   a drive wheel operatively connected to said clutch assembly;
   a continuous belt driven by said drive wheel;
   a trolley mounting an idler pulley receiving said power cable and connected to said belt wherein said trolley is positionable by said belt;
   so that said power cable is moved in either an extending or retracting direction and when said clutch assembly is in a drive mode, said drive pulley, said trolley and said idler pulley are driven wherein said trolley and said idler pulley are correspondingly displaced to maintain a substantially continuous condition of said power cable when said power cable is moved in the extending and the retracting directions, and when said clutch assembly is in a release mode, said power cable can be pulled for extension.

2. The cable management system of claim 1, wherein said clutch assembly further comprises a pair of members having axially extending, angularly spaced teeth which define recesses and which axially mesh in the drive mode.

3. The cable management system of claim 2, wherein said teeth and recesses have substantially arcuate angular widths and said teeth are received in opposing recesses and the angular widths of the recesses are larger than the angular widths of said received teeth.

4. The cable management system of claim 1, further comprising a belt drive shaft which is driven by said pulley drive shaft, when said clutch is in a drive mode.

5. The cable management system of claim 4, wherein said belt drive shaft and pulley drive shaft are parallel and said shafts are rotatably coupled by a chain sprocket assembly.

6. The cable management system of claim 1, wherein said clutch assembly comprises a solenoid having an arm which pivotally moves a lever.

7. The cable management system of claim 6, wherein said lever has an end portion which engages a drive flange mounted to the pulley drive shaft, and said lever is engageable with said flange for transforming the clutch to a release mode.

8. The cable management system of claim 1, wherein said belt movably connects between a belt drive wheel and an idler wheel.

9. The cable management system of claim 1, wherein said trolley moves in a longitudinal direction and comprises a platform supported by rollers, and said idler pulley is mounted to said platform and rotates about an axis orthogonal to said longitudinal direction, said trolley being secured to said belt.

10. The cable management system of claim 1, further comprises a magnet mounted at a selected position of said belt and further comprising a Hall effect sensor for sensing the position of said magnet and defining a home position of said power cable.

11. The cable management system of claim 10, wherein said controller generates signals to retract said power cable to the home position.

12. The cable management system of claim 1, wherein upon generation of command signals from said controller, said power cable is driven to a usage position and said clutch is transformed to a release mode to allow said cable to be manually pulled to an extended position.

13. The cable management system of claim 1, further comprising a housing enclosing at least a portion of said power cable, said pulley, said motor, said clutch assembly, said controller, said belt and said trolley.

14. The cable management system of claim 13, wherein said housing further comprises a bottom panel and further comprising a smoke detector adjacent to said bottom panel and wherein power to said power cable is terminated in the event of detection of smoke by said smoke detector.

15. A power cable management system comprising:
a housing having an opening;
a power cable at least partially enclosed in said housing and extendable through said opening;
a motor which drives a shaft;
a drive pulley mounted to said shaft and receiving said cable;
a clutch assembly operatively engageable with said shaft and transformable between a drive mode and a release mode;
a movable idler pulley operatively connected to said clutch assembly and receiving said power cable, said power cable being looped around said idler pulley;
wherein said drive pulley, clutch assembly and idler pulley are disposed in said housing and said power cable is moved in either an extending or retracting direction and when said clutch assembly is in a drive mode, said drive pulley is driven and said idler pulley is correspondingly displaced to maintain a substantially continuous slack-free portion of said power cable within said housing when said power cable is moved in both the extending and the retracting directions, and when said clutch assembly is in a release mode, said power cable can be pulled for extension.

16. The cable management system of claim 15 wherein said clutch assembly further comprises a pair of members, one member having a receiver defining a plurality of angularly spaced openings and said other member mounting a plurality of angularly spaced pins which are inserted into the openings in the drive mode.

17. The cable management system of claim 16 wherein said pins are spring biased.

18. The cable management system of claim 15 wherein said clutch assembly comprises a pivotal yoke which engages one of said members and is moveable via a motor for axially displacing said one member.

19. The cable management system of claim 15 wherein said idler pulley is mounted on a trolley which moves in said housing to compensate for the extension or retraction of said power cable.

20. The cable management system of claim 19 further comprising a drive wheel which drives a belt secured to said trolley and said drive wheel being driven by said shaft when said clutch assembly is in a drive mode.

21. The cable management system of claim 20 wherein said drive wheel is mounted to said shaft by a one-way clutch bearing.

22. The cable management system of claim 20 wherein said belt is a timing belt with a plurality of teeth and said drive wheel has a surface generally complementary with said teeth.

23. The cable management system of claim 20 further comprising a tensioner to maintain tension on said belt.

24. The cable management system of claim 19 wherein said trolley comprises a plurality of rollers and said idler pulley is rotatable about an axis orthogonal to the rotational axis of said rollers.

25. The cable management system of claim 15 wherein said drive pulley is mounted to said shaft by a one-way clutch bearing.

26. The cable management system of claim 15 wherein said clutch assembly is transformable by means of a motor which is controlled by a controller mounted in said housing.

27. The cable management system of claim 20 wherein said belt mounts a magnet and further comprising a sensor which senses the position of said magnet to thereby determine the position of said power cable.

28. A power cable management system comprising:
an elongated housing having an opening;
a power cable at least partially enclosed in said housing and extendable through said opening;
a motor selectively operable to bi-directionally drive a shaft;
a drive pulley receiving said cable and mounted to said shaft;
a clutch assembly operatively engageable with said shaft and transformable between a drive mode and a release mode;
a longitudinally movable idler pulley spaced along said power cable from said drive pulley and receiving said power cable so that said power cable loops about said idler pulley and disposed in said housing, said idler pulley being operatively connected to said clutch assembly;
wherein said drive pulley, clutch assembly and idler pulley are disposed in said housing and said power cable is moved in either an extending or retracting direction and when said clutch assembly is in a drive mode, said drive pulley is driven and said idler pulley is correspondingly displaced to maintain a substantially continuous slack-free condition of said power cable within said housing when said power cable is moved in the extending and the retracting directions, and said power cable can be pulled for extension.

29. The cable management system of claim 28, wherein said idler pulley is mounted on a trolley which moves longitudinally in said housing to compensate for the extension or retraction of said power cable.

30. The cable management system of claim 28, wherein said housing is mounted in an overhead orientation and said cable can be lowered to a first height and manually further extend from said opening.

* * * * *